United States Patent
Matos

(10) Patent No.: US 6,917,863 B2
(45) Date of Patent: Jul. 12, 2005

(54) SYSTEM FOR ASSUMING AND MAINTAINING SECURE REMOTE CONTROL OF AN AIRCRAFT

(75) Inventor: Jeffrey A. Matos, New Rochelle, NY (US)

(73) Assignee: Karl F. Milde, Jr., Mahopac, NY (US); part interest (*) Notice: Subject to any disclaimer, the term of this patent is extended or adjusted under 35 U.S.C. 154(b) by 250 days.

(21) Appl. No.: 10/328,589

(22) Filed: Dec. 23, 2002

(65) Prior Publication Data

US 2003/0130770 A1 Jul. 10, 2003

Related U.S. Application Data

(60) Provisional application No. 60/342,439, filed on Dec. 21, 2001.

(51) Int. Cl.$^7$ .............................. G06F 19/00; G06F 7/00
(52) U.S. Cl. .............................. 701/16; 701/2; 244/189; 280/270
(58) Field of Search ................................ 701/16, 17, 3, 701/11, 14, 36; 244/76 R, 189, 175, 3.11, 118.5; 280/270; 340/541, 945, 574, 540; 380/258

(56) References Cited

U.S. PATENT DOCUMENTS

| | | | | |
|---|---|---|---|---|
| 5,157,615 A | * | 10/1992 | Brodegard et al. | ......... 701/301 |
| 5,308,022 A | | 5/1994 | Cronkhite et al. | |
| 5,904,724 A | | 5/1999 | Margolin | |
| 6,477,152 B1 | * | 11/2002 | Hiett | ......................... 370/316 |
| 6,499,693 B1 | * | 12/2002 | Rogson | ................... 244/118.5 |
| 2003/0052798 A1 | * | 3/2003 | Hanson | ....................... 340/945 |
| 2003/0055540 A1 | * | 3/2003 | Hansen | .......................... 701/3 |
| 2003/0055541 A1 | * | 3/2003 | Haley | .......................... 701/11 |
| 2003/0062446 A1 | * | 4/2003 | Arias | ....................... 244/118.5 |
| 2003/0062447 A1 | * | 4/2003 | Cordina et al. | .......... 244/118.5 |
| 2003/0066929 A1 | * | 4/2003 | Valencia et al. | ......... 244/118.5 |
| 2003/0090382 A1 | * | 5/2003 | Shear | ......................... 340/574 |
| 2003/0122701 A1 | * | 7/2003 | Tran | ............................ 342/29 |
| 2003/0128122 A1 | * | 7/2003 | Reynolds | ................. 340/573.1 |
| 2003/0137444 A1 | * | 7/2003 | Stone et al. | ................... 342/30 |

FOREIGN PATENT DOCUMENTS

| | | | |
|---|---|---|---|
| GB | 2381879 | * | 5/2003 |
| JP | 409036791 A | * | 2/1997 |

* cited by examiner

*Primary Examiner*—Thomas G. Black
*Assistant Examiner*—Ronnie Mancho
(74) *Attorney, Agent, or Firm*—Milde & Hoffberg, LLP

(57) ABSTRACT

A method is disclosed for assuming and maintaining secure remote control of and aircraft in the event of an attack upon, or incapacity of the pilot of the aircraft. The method includes the following steps:

(a) providing a secure transmission link by and between first transmitting and receiving means ("first T/R means") on an aircraft to be controlled and second transmitting and receiving means ("second T/R means") at a location remote from the aircraft, thereby permitting secure communication between the aircraft and the remote location;

(b) transmitting a command between the aircraft and the remote location for interrupting pilot control of the aircraft and initiating remote control of the aircraft;

(c) transmitting flight data from the aircraft to the remote location via the transmission link;

(d) transmitting control data from the remote location to the aircraft via the transmission link; and (e) maintaining remote control of the aircraft until the need for remote control has ended or the aircraft has landed safely.

63 Claims, 32 Drawing Sheets

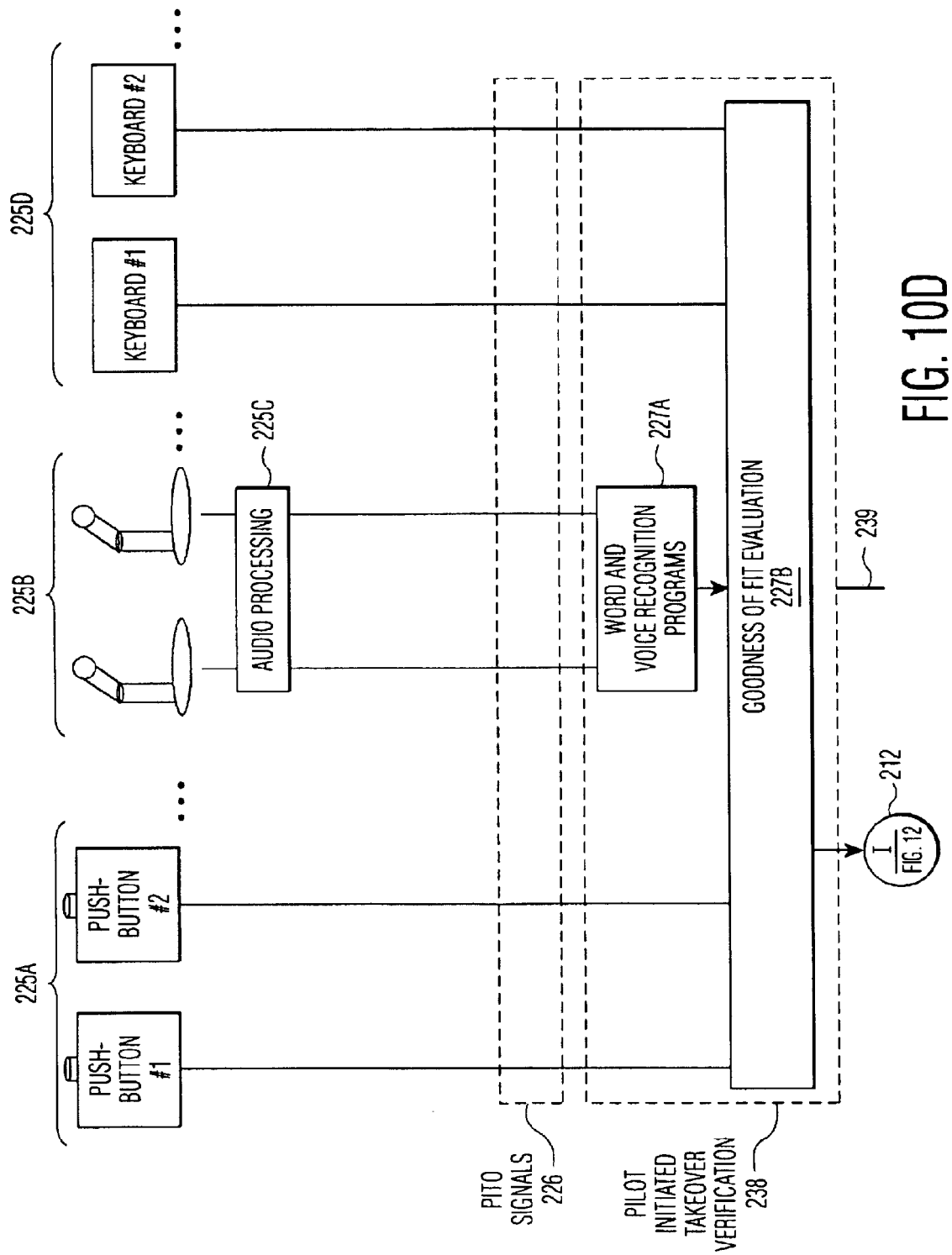

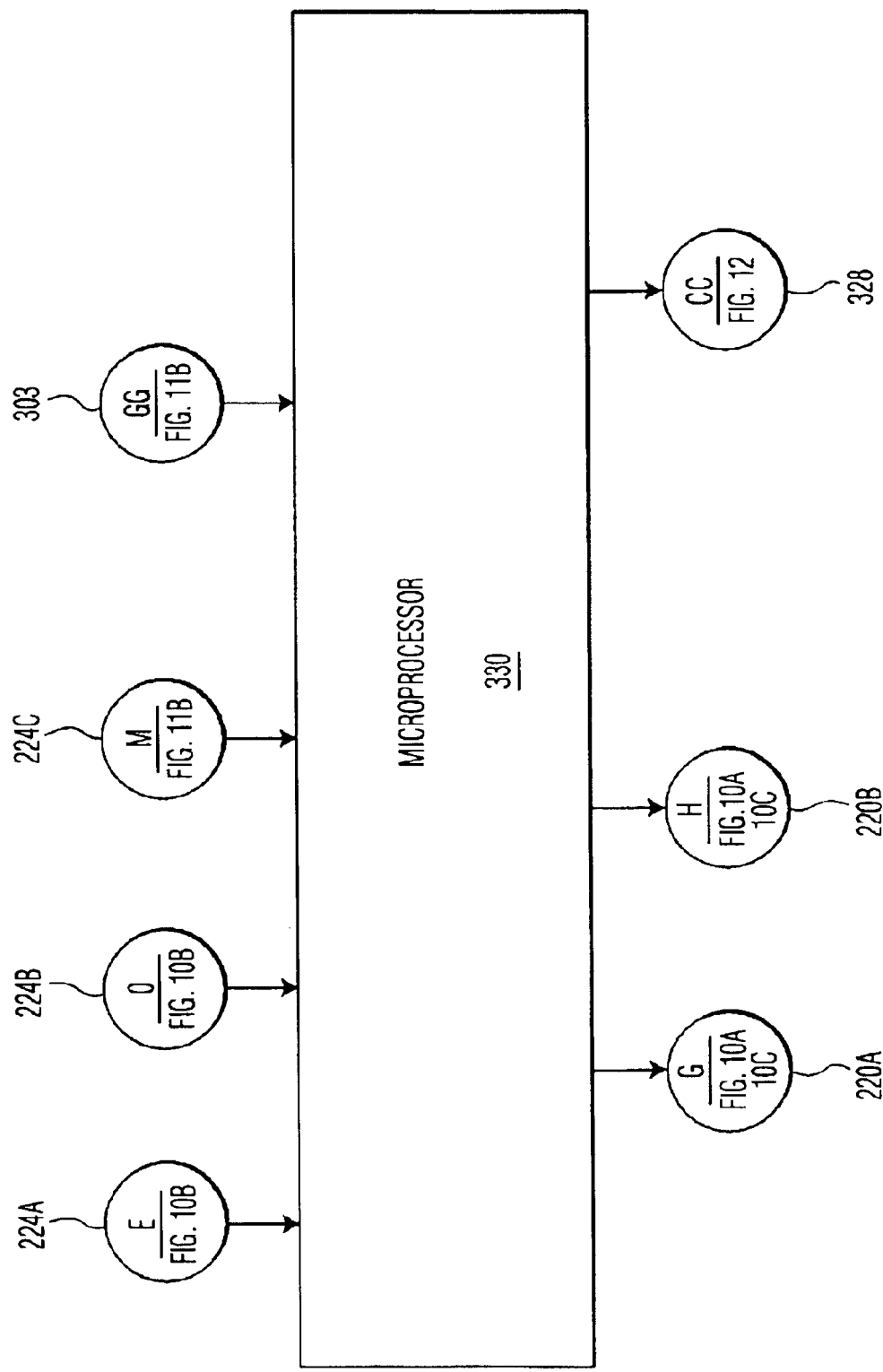

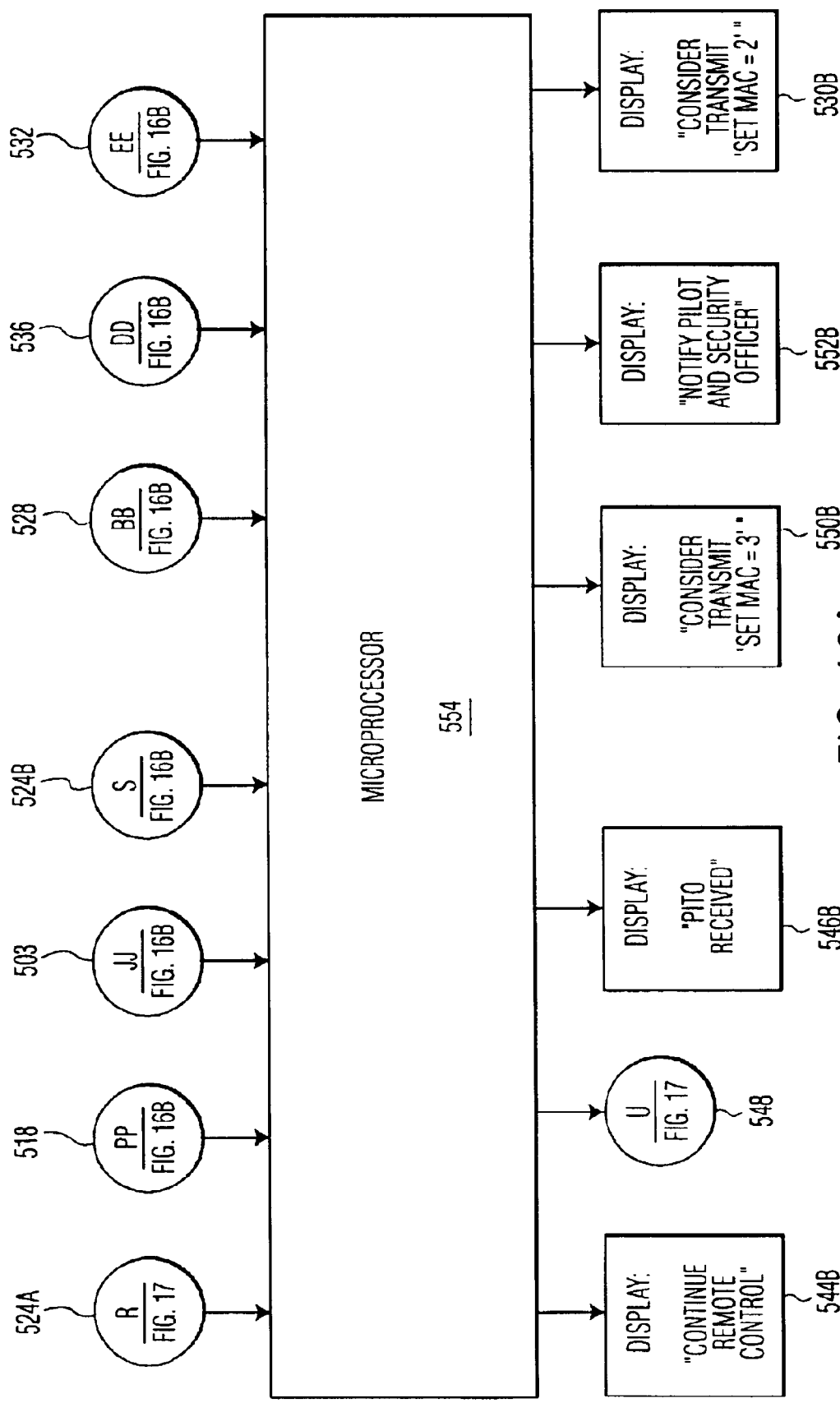

SYSTEM FOR ASSUMING AND MAINTAINING SECURE REMOTE CONTROL OF AN AIRCRAFT

CROSS-REFERENCE TO RELATED APPLICATION

This application is related to, and claims priority from, U.S. Provisional Application No. 60/342,439, filed Dec. 21, 2001, by Jeffrey A. Matos.

BACKGROUND OF THE INVENTION

The present invention relates to a method and apparatus for assuming and maintaining secure remote control of an aircraft in the event of an intended, attempted or actual attack upon, or incapacity of, the pilot(s) of the aircraft. As is well known, terrorists and hijackers sometimes attempt to assume control of an aircraft by intimidating either the passengers and/or the crew. Once the attacker (terrorist or hijacker) takes control of an aircraft, he or she may cause it to fly to an inappropriate destination or may even cause the aircraft to crash land.

Up to now, there has been no way for personnel on the ground to assist in bringing the aircraft down for a safe landing at a desired location.

SUMMARY OF THE INVENTION

It is a principal object of the present invention to provide a method and apparatus (i.e. a system) which enables personnel outside of an aircraft to assume control of the aircraft under certain specified circumstances.

It is a further object of the present invention to provide a system for controlling an aircraft from a remote location outside the aircraft which is secure and safe from interference or hacking by an unauthorized person.

These objects, as well as further objects which will become apparent from the discussion which follows, are achieved, in accordance with the present invention by a method comprising the steps of:

(a) providing a secure transmission link by and between first transmitting and receiving means ("first T/R means") on an aircraft to be controlled and second transmitting and receiving means ("second T/R means") at a location remote from the aircraft, thereby permitting secure communication between the aircraft and the remote location;

(b) transmitting a command between the aircraft and the remote location for interrupting pilot control of the aircraft and initiating remote control of the aircraft;

(c) transmitting flight data from the aircraft to the remote location via the transmission link;

(d) transmitting control data from the remote location to the aircraft via the transmission link; and (e) maintaining remote control of the aircraft until the need for remote control has ended or the aircraft has landed safely.

In a preferred embodiment of the invention an authorized person, such as the pilot, may initiate the transmission of the command by pressing a button in the cockpit, by speaking a voice command or by speaking a certain word or words, such as "Help!" In the latter case, the word(s) may be changed from time to time, for example to one or more special code words, to prevent unauthorized issuance of the command by an unauthorized person.

Advantageously the method includes the step of determining whether the voice command is actually spoken by one of the authorized persons (e.g. by known voice identification techniques) and then responding to this voice command only if it is indeed spoken by such an authorized person.

Alternatively or in addition, the pilot may initiate the transmission of the command by inputting a certain alphanumeric code by means of a cockpit input device, such as the transponder code selector. As in the case of the special word(s), the code may be changed from time to time.

Alternatively, or in addition, the command to initiate remote control of the aircraft can be sourced off-site of the aircraft. In one scenario, the transmission of the command can be initiated off-site of the aircraft (e.g. at the air traffic control) when requested by the pilot. In another scenario, the transmission of the command is initiated when air traffic control, or another monitoring unit, suspects that a pilot is unable to properly control the aircraft. For example, the command may be issued by air traffic control when the aircraft deviates from an expected or authorized flight path.

Alternatively, or in addition, audio or video in the cockpit or passenger compartment of the aircraft may be transmitted to the remote location via the first and second T/R means. In this case the transmission of the command may be initiated when such sounds or video indicate that the pilot(s) is/are unable to properly control the aircraft, for example because the aircraft has been attacked by one or more hijackers.

In another scenario a second aircraft is scrambled and caused to fly within the vicinity of the aircraft to be controlled (hereinafter "first aircraft") to investigate a suspected or perceived problem. In this case the transmission of the take-over command may be initiated when the second aircraft informs the remote location of an irregularity or could be initiated directly by the second aircraft.

In the case where a second aircraft flies in the vicinity of the first aircraft, the second aircraft may have third transmitting and receiving means (third T/R means) for communicating with the second T/R means at the remote location and fourth transmitting and receiving means (fourth T/R means) for communicating with the first T/R means on the first aircraft. This gives rise to a number of advantages:

In one embodiment of the invention, the first T/R means on the first aircraft may include means for transmitting and receiving preferentially in the direction of the second aircraft and/or the fourth T/R means on the second aircraft may include means for transmitting and receiving preferentially in the direction of the first aircraft. This enables secure communication between these two aircraft which cannot be intercepted or accessed by a receiver or transmitter on the ground.

For example, the directional transmitting and receiving means on each aircraft may include a directional antenna for RF transmission or, alternatively, laser, infra-red or even acoustic transmitters and receivers.

According to a particular feature of the present invention, the flight data transmitted to the remote location and the control data transmitted to the first aircraft are encrypted using at least one encryption key. In this case the encryption key(s) is/are preferably provided to the aircraft and to the remote location prior to each flight of the aircraft. The key(s) may be updated during each flight, if desired, by providing updated versions to both the aircraft and the remote location during the flight of the aircraft.

For maximum security one or more initial encryption key(s) is/are provided to the aircraft while at an airport prior to take-off for the flight. The key(s) may be generated at the airport and provided from there to both the aircraft and to the remote location.

Alternatively, the initial encryption key(s) may be generated on the aircraft and provided to the remote location, or generated at the remote location and provided to the aircraft.

The initial and subsequent encryption key(s) may be stored on at least one storage medium, and the storage medium provided to at least one of the aircraft and the remote location.

According to a particularly advantageous embodiment of the present invention, a satellite is located in orbit above the earth. This satellite has fifth transmitting and receiving means (fifth T/R means) for communicating with the first T/R means on the aircraft and sixth transmitting and receiving means (sixth T/R means) for communicating with the second T/R means at the remote location, and is thus able to relay communications between the aircraft and the remote location.

In the case where the flight data transmitted to the remote location and the control data transmitted to the aircraft are encrypted using at least one encryption key, the system may cause transmission of one or more encryption key(s) from the satellite (or another satellite) to the aircraft and to the remote location prior to or during the flight of the aircraft.

Advantageously, the first T/R means on the aircraft includes a directional antenna with a radiation and reception pattern directed upwardly only, with the antenna directing communication signals to and from the fifth T/R means on the satellite and not toward the ground. In addition, the second T/R means at the remote location and the sixth T/R means on the satellite may communicate with each other via a highly directional beam such as a laser beam, RF or infra-red beam. This arrangement also avoids interception of or access to any transmissions by a terrorist or other unauthorized person on the ground.

BRIEF DESCRIPTION OF THE DRAWINGS

FIG. 10D shows sources of Pilot Initiated Takeover Commands including pushbuttons, microphones and keyboards, and pilot initiated takeover command processing.

FIG. 11A shows the inputs and outputs to a second microprocessor aboard the controlled aircraft which performs encryption assessment for incoming commands.

FIG. 16A shows the inputs and outputs to a microprocessor in a remote control center which performs encryption assessment of incoming signals from a controlled aircraft.

DETAILED DESCRIPTION OF THE PREFERRED EMBODIMENTS

Contents

Figure 1A:
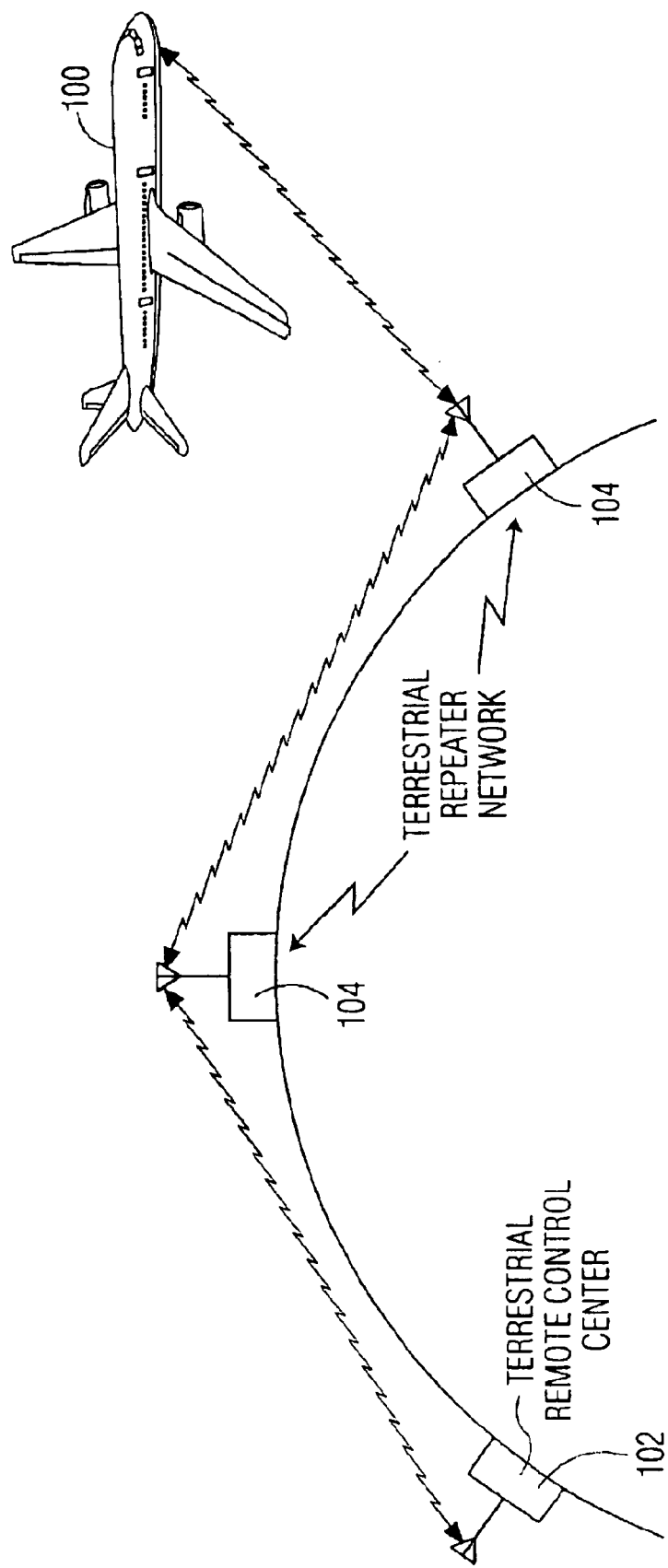
FIG. 1A is an overview of one embodiment of the system according to the invention which includes a terrestrial remote control center, a terrestrial repeater network and an aircraft.

1. System Overview
    1.1 System with Terrestrial Repeater Network
    1.2 System with Satellite Links
    1.3 Additional Features of the Invention
2. Encryption Key Loading
    2.1 Overview of Encryption Key Loading Options
    2.2 Ground-based, Freestanding Encryption Source
    2.3 Aircraft Source; Ground Transmission
    2.4 Terrestrial Remote Control Center Source; Ground Transmission
    2.5 Aircraft Source; Satellite Transmission
    2.6 Terrestrial Remote Control Center Source; Satellite Transmission
    2.7 Satellite Source
3. Additional Encryption Measures
    3.1 Two or More Different Sources/Routes for Encryption Key Transmission
    3.2 Encryption Key Changes During the Flight
        3.2.1 Nested Encryption Keys
        3.2.2 Encryption Directing Unit
4. Use of Highly Directional Transmitting and Receiving Means to Prevent Access by Unauthorized Person
    4.1 Highly Directional Means Between Controlled Aircraft and Satellite, and Between Terrestrial Remote Control Center and Satellite
    4.2 Highly Directional Means Using an Intercepting Aircraft
        4.2.1 Airborne Remote Control Center is Used to Control the Intercepted Aircraft
            4.2.1.1 Direct Link Between Intercepting and Controlled Aircraft
            4.2.1.2 Link Between Intercepting and Controlled Aircraft is via Satellite
        4.2.2 Transmission of Encryption Key to Intercepting Aircraft
        4.2.3 Terrestrial Remote Control Center is Used to Control the Intercepted Aircraft
            4.2.3.1 Direct Link Between Terrestrial Remote Control Center and Intercepting Aircraft
            4.2.3.2 Link Between Terrestrial Remote Control Center and Intercepting Aircraft is via Satellite
    4.3 Summary of In-flight Control Options
5. Source of Takeover Command for the Controlled Aircraft
    5.1 Pilot Initiated Takeover, PITO
    5.2 Remote Initiated Takeover, RITO
6. Operational and Flow Diagrams
    6.1 Master Aircraft Control
        6.1.1 MAC State Transition Rules
            6.1.1.1 Transitions from MAC State 1
                6.1.1.1.1 Pilot Initiated Takeover
                6.1.1.1.2 Remote Initiated Takeover
                6.1.1.1.3 Other Transitions from MAC State 1
            6.1.1.2 Transitions from MAC State 2
                6.1.1.2.1 Transition from MAC State 2 to MAC State 3
                6.1.1.2.2 Transition from MAC State 2 to MAC State 1, an Optional System Feature
                6.1.1.2.3 Transition from MAC State 2 to MAC State 4
            6.1.1.3 Transitions from MAC State 3
            6.1.1.4 Transitions from MAC State 4
    6.2 Source of Master Aircraft Control State-Setting Inputs
        6.2.1 State-Setting Microprocessor, Its Inputs and Its Outputs
            6.2.1.1 State Setting Microprocessor
            6.2.1.2 State Setting Microprocessor Inputs
                6.2.1.2.1 Source and Analysis of PITO Signals
            6.2.1.3 State Setting Microprocessor Outputs
        6.2.2 State-Setting Flow Diagram
            6.2.2.1 Sequence Which Results in MAC State 1
            6.2.2.2 Sequences Which Result in MAC State 2 or MAC State 3
                6.2.2.2.1 PITO
                    6.2.2.2.1.1 PITO Verification
                    6.2.2.2.1.2 Handshaking Routine, Pentagon Nomenclature, Backup Autopilot in the Event of Handshake Interruption
                    6.2.2.2.1.3 Encryption Check, Repeat Cycling Through Handshake Check and Encryption Check, Backup Autopilot in the Event of Encryption Error
                    6.2.2.2.1.4 Final Decision to "SET MAC=2" versus "SET MAC=3": The Anti-Hunting Algorithm
                6.2.2.2.2 Remote Initiated MAC State Commands
                    6.2.2.2.2.1 RITO
                    6.2.2.2.2.2 Remote Commands to Set MAC=3 or MAC=1
                6.2.2.2.3 Alternate Possible Flow Diagrams
            6.2.2.3 MAC State 4
    6.3 Controlled Aircraft Receiver and Decoder
        6.3.1 Aircraft Receiver
            6.3.1.1 Decryption and Decoding of Signals Received by the Aircraft
            6.3.1.2 Aircraft Signal Router Output
                6.3.1.2.1 Aircraft Receiver Control Signals
                6.3.1.2.2 Aircraft Transmitter Control Signals
                6.3.1.2.3 Aircraft Memory
                6.3.1.2.4 Handshake Signals
                    6.3.1.2.4.1 Handshake Routine with Communication Interruption Signal
                    6.3.1.2.4.2 Handshake Routines of Still Greater Complexity
                6.3.1.2.5 Commands to Change the MAC State
                6.3.1.2.6 Encryption Keys Obtained via the Aircraft Receiver
            6.3.1.3 Aircraft Receiver Encryption Assessment
    6.4 Controlled Aircraft Encoder and Transmitter
    6.5 Remote Control Center Receiver and Decoder 6.5.1 Remote Control Center Receiver
  6.5.1.1 Decryption and Decoding of Signals Received by the RCC
  6.5.1.2 Aircraft Signal Router Output
  6.5.1.3 Remote Control Center Receiver Data Encryption Assessment
6.6 RCC Encoder, Transmitter and Encryption Source
6.7 Flight Path Deviation Detection The preferred embodiments of the present invention will now be described with reference to FIGS. 1–20 of the drawings. Identical elements in the various figures are identified with the same reference numerals.

1. System Overview
1.1 System with Terrestrial Repeater Network

FIG. 1A shows an aircraft 100 controlled from a terrestrial remote control center or "TRCC" 102. Bi-directional flow of encrypted information occurs between the aircraft and the TRCC. The aircraft sends information such as the throttle, elevator, rudder, flap, aileron and landing gear positions, aircraft location and velocity, remaining fuel in each tank, audio and video information from both the cockpit and the cabin. Clearly, other information about the aircraft, such as that supplied to the aircraft flight recorder, may also be transmitted. The TRCC 102 receives the information, either directly or via one or more components of a terrestrial repeater network 104. Flight controlling personnel at the TRCC 102 receive the information and use it to: (a) make a decision about whether to take control over a flight; and (b) pilot the aircraft, once they have made the decision to take control. The flight controlling personnel control the aircraft 100 by sending control signals which control each of the aircraft functions that would ordinarily be controlled by the aircraft-based pilot, such as the throttles, the elevator, the rudder, the flaps, the ailerons and the landing gear. The flight controller should have the ability to control each and every aspect of the aircraft which is required for a safe flight and for a safe landing. The TRCC 102 may be located on land or at sea. The terrestrial remote control center 102 transmits the information, either directly or via one or more components of a terrestrial repeater network 104. Information may pass between TRCC 102 and the repeater network by wireless communication means, as is shown in the figure, or by direct wire linkage. Similarly, information may pass between components of the repeater network 104 by wireless means, as is shown in the figure, or by direct wire linkage. Any of the components of the terrestrial repeater network may be located on land or at sea.

1.2 System with Satellite Links

Figure 1B:
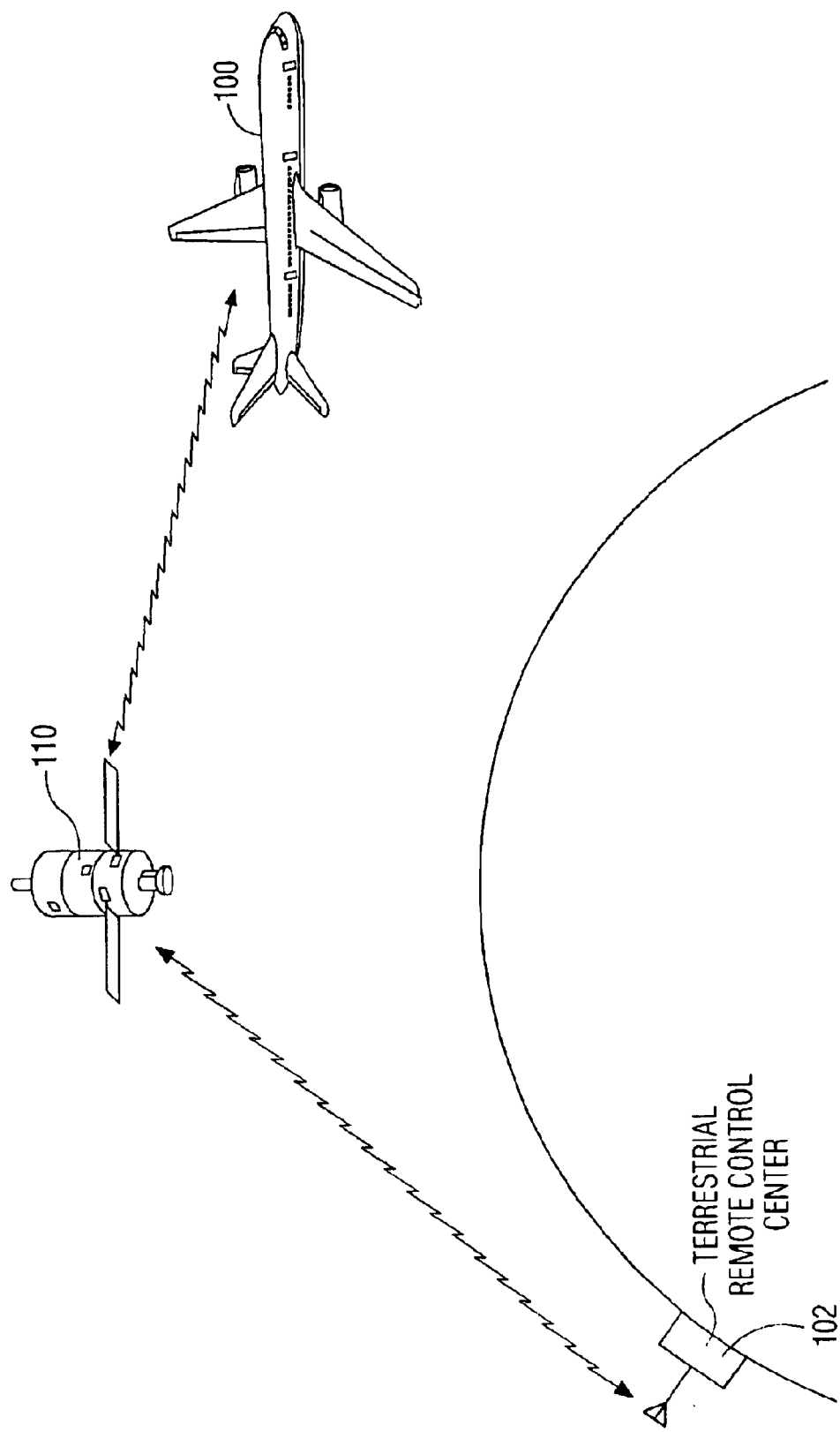
FIG. 1B is an overview of one embodiment of the system according to the invention which includes a terrestrial remote control center, a satellite-based repeater and an aircraft.

FIG. 1B shows an aircraft 100 controlled by a TRCC 102, with signals between the aircraft and the TRCC relayed by a satellite 110. Possible advantages of the satellite system shown in FIG. 1B, over the system with terrestrial repeater stations include:

(a) elimination of ground-based communications links to minimize the chance of unauthorized reception or transmission of flight related information;
(b) enhanced ability to transmit to and receive from aircraft 100, when the aircraft is not over or near land upon which a ground station is or could be located; and,
(c) possible cost savings.

Figure 8:
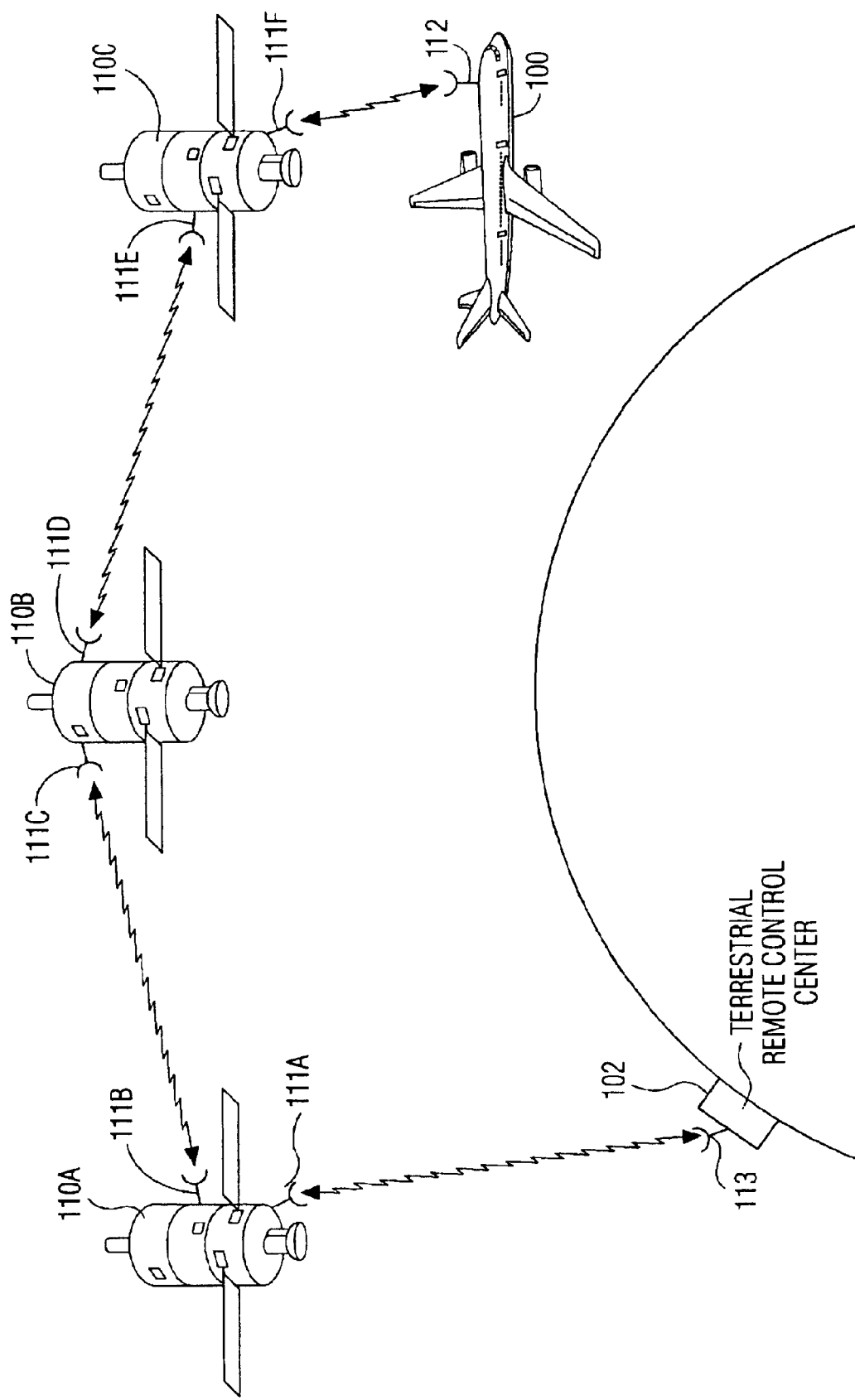
FIG. 8 is an overview of another embodiment of the system according to the invention which includes a terrestrial remote control center, a satellite repeater network and an aircraft.

Rather than a single satellite, there may be a network of satellites, as shown in FIG. 8. Furthermore, a hybrid system may contain both terrestrial repeater units (as shown in FIG. 1A) and satellite-based repeater units (as shown in FIG. 8).

1.3 Additional Features of the Invention

Additional features of the invention include:

(a) encryption of all transmitted information;
(b) multiple options for distributing the encryption key to authorized users;
(c) highly directional means of transmitting information to minimize the chance of unauthorized reception or transmission of flight related information;
(d) optional airborne remote control center or "ARCC" to minimize the chance of unauthorized reception or transmission of flight related information;
(e) two possible modes of initiation of remote control operation: (i) by the pilot, and (ii) by a person in a remote control center ("remote control center" refers to either TRRC or ARCC); and,
(f) backup autopilot/autothruster control, in the event of communication failure or interruption between the controlled aircraft and the remote control center "RCC".

These features will now be described in detail.

2. Encryption Key Loading
2.1 Overview of Encryption Key Loading Options

In order to maximize the security of communications between the TRCC 102 and the controlled aircraft 100, the information passing between them is encrypted. Various means of configuring the location of the encryption key source, and the route by which the key is conveyed to the aircraft and the TRCC are listed below in Table 1, and discussed following the Table:

TABLE 1

Encryption Key Loading Options

| Source | Sent from Source to: | FIG. |
|---|---|---|
| Ground Based, Free Standing | Aircraft, and TRCC* | 2 |
| Aircraft | TRCC via Local Ground Terminal | 3 |
| TRCC | Aircraft via Local Ground Terminal | 4 |
| Aircraft | TRCC via Satellite | 5 |
| TRCC | Aircraft via Satellite | 6 |
| Satellite | Aircraft, and TRCC | 7 |

*Transmission from Local Ground Terminal to TRCC may be via Terrestrial Network, via Satellite, or both In the text above, and in the discussion that follows, it will be assumed that what is referred to as the "encryption key" or the "key" will contain the information necessary to perform encryption of outgoing signals (i.e. signals to be transmitted) and decryption of incoming signals (i.e. signals that have been received). It will be understood, however, that the key used for decryption may be different from that used for encryption. During or after encryption key loading, the decryption key may be derived from the encryption key or the encryption key may be derived from the decryption key; or two keys, one for encryption and one for decryption, may be provided at the same time, or at different times, and in the same or in a different manner. Similarly, the terms "encryption source," "encryption key source," "encryption key generator" and "encryption key reading device" refer to sources of both encryption and decryption information.

Any other use of the words "encryption," "encrypted" or "encrypt" is intended to have the narrow and specific meaning of the word, i.e. the opposite of the words "decryption," "decrypted" and "decrypt."

2.2 Ground-based, Freestanding Encryption Source

Figure 2:
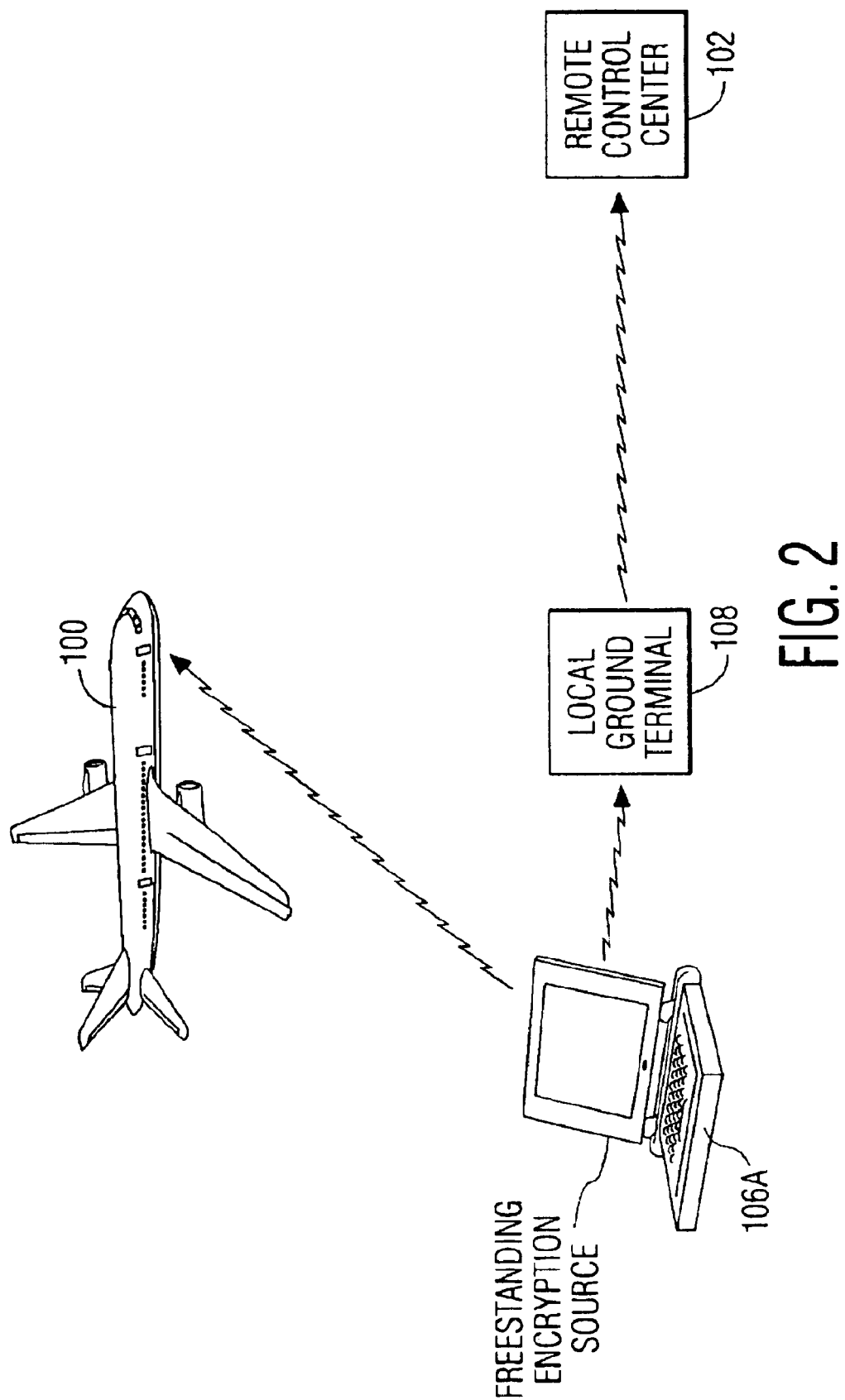
FIG. 2 shows one means sharing the encryption key, utilizing a freestanding encryption source, and transmission of the encryption key(s) to both an aircraft and to a remote control center.

One means of providing the encryption key to the TRCC 102 and aircraft 100 is shown in FIG. 2. A freestanding encryption key source 106A, not a part of either aircraft 100 or TRCC 102 generates the encryption key. Encryption key source 106A may be located near where the aircraft is parked immediately prior to its departure, or at a more distant location in or near the airport. After it is generated, the key is transferred to both the aircraft and to a local ground terminal 108. The local ground terminal 108 may be located near where the aircraft is parked immediately prior to its departure, or at a more distant location. The key is transferred from the local ground terminal to the TRCC 102. The transfer of the key from the encryption source 106A to both the aircraft 100 and terminal 108 may be either by:

(a) direct wire link;
(b) optical, infrared or ultraviolet link (e.g. via laser);
(c) a very short range radiofrequency link; or,
(d) a computer diskette, a CD, a DVD, an optical disk, zip drive or other portable data storage medium, which is erased after being read once.

The means for transfer of the key to the aircraft need not be identical to the means for transfer of the key to the local ground terminal. The transfer of the encryption key from terminal 108 to TRCC 102 may be by direct wire linkage, by wireless means, or by a hybrid system which uses both direct wire and wireless means, and may or may not include one or more repeater units.

2.3 Aircraft Source; Ground Transmission

Figure 3:
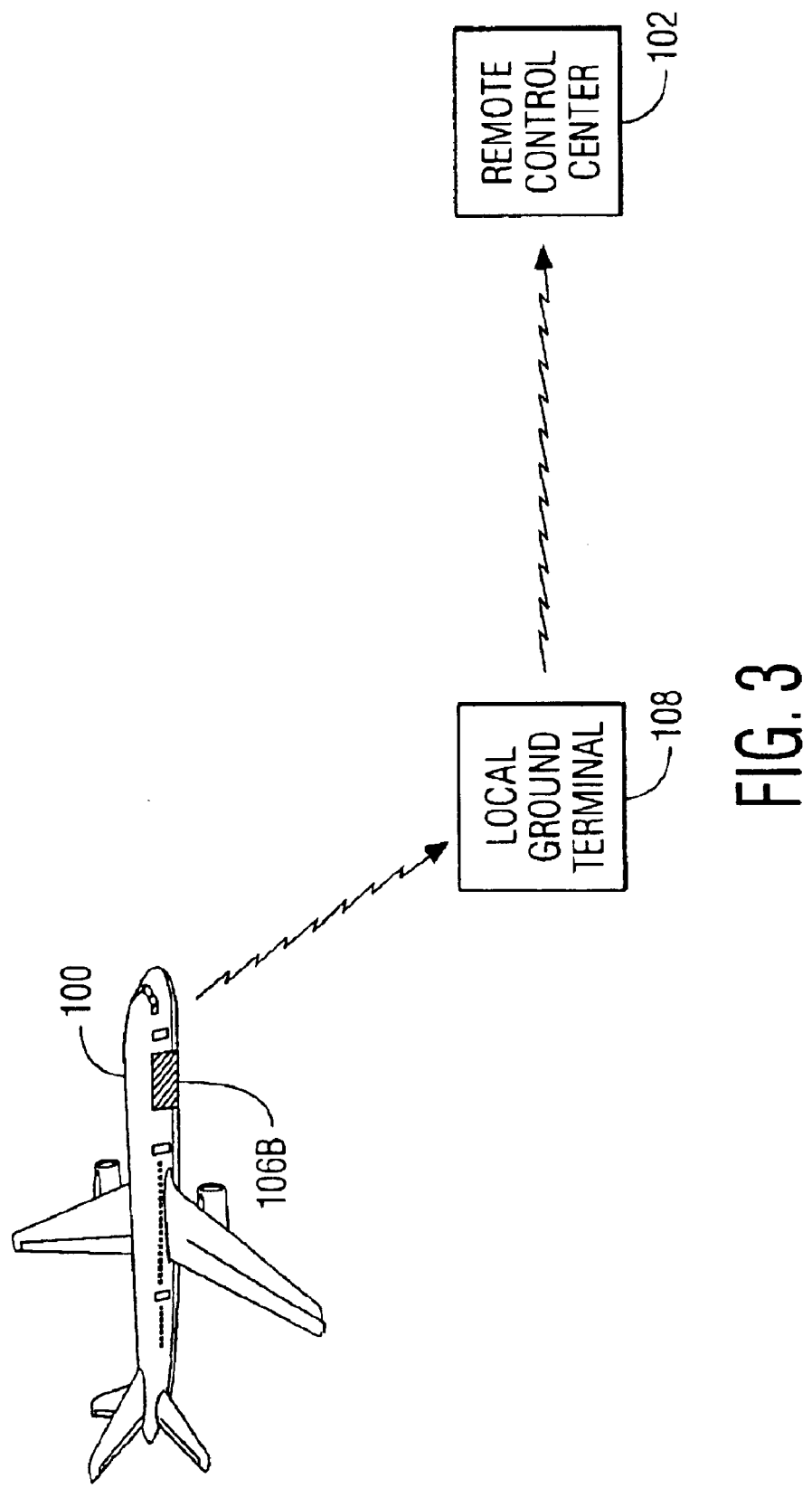
FIG. 3 shows another means of sharing the encryption key, utilizing a source aboard the aircraft, and with its transmission to a remote control center via a local ground terminal.

FIG. 3 shows a variation in the location of the source which creates the encryption key. In this case, encryption key source 106B is located on the aircraft 100. The linkage of encryption source 106B to the local ground terminal 108 may be via any of the means (a) through (d) discussed in the case of the freestanding encryption source 106A in FIG. 2. Furthermore, the link between encryption source 106B and ground terminal 108 may or may not utilize the aircraft communication system. The transfer of the encryption key from terminal 108 to TRCC 102 may be by direct wire linkage, or by wireless means, and may or may not involve repeater units.

2.4 Terrestrial Remote Control Center Source; Ground Transmission

Figure 4:
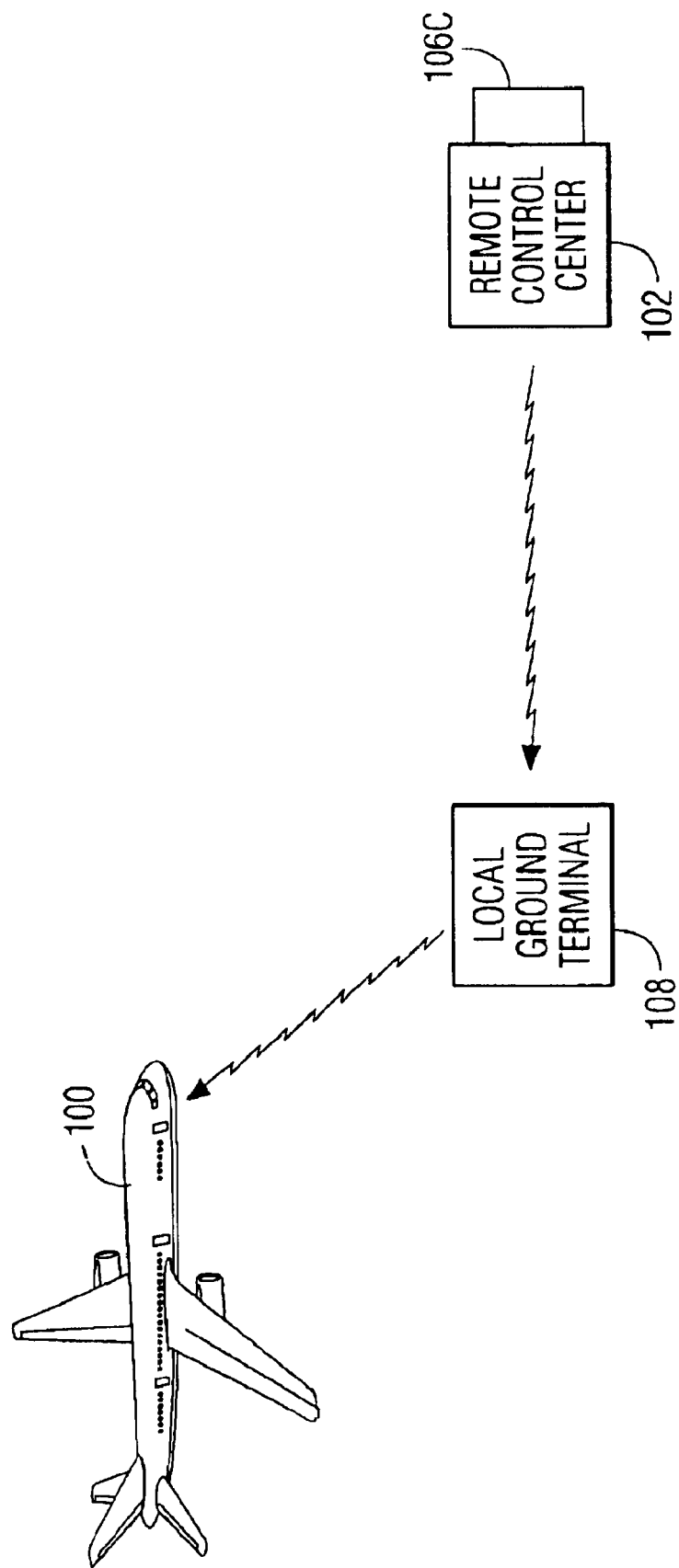
FIG. 4 shows another means of sharing the encryption key utilizing a source at the remote control center, and with its transmission to the aircraft via a local ground terminal.

FIG. 4 shows a configuration in which the encryption key source 106C is located within the TRCC 102. The key is transmitted to the local ground terminal by either a direct wire linkage, by wireless means, or by a hybrid system. The link from TRCC 102 to local ground terminal 108 may or may not involve repeater units. The key is transmitted from the local ground terminal 108 to the aircraft 100 by any of the means (a) through (d) discussed in the case of the freestanding encryption source 106A in FIG. 2.

2.5 Aircraft Source; Satellite Transmission

Figure 5:
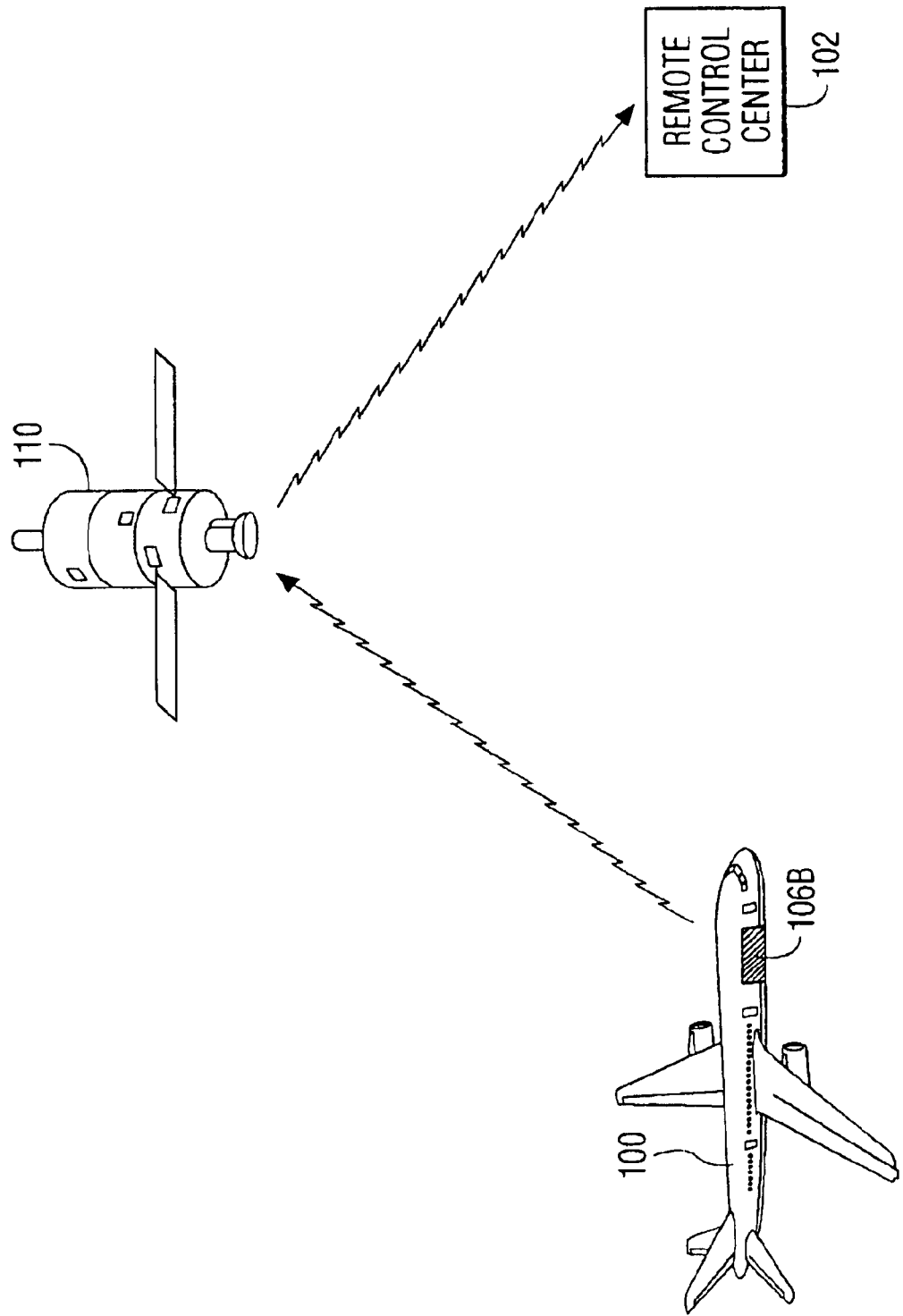
FIG. 5 shows another means of sharing the encryption key utilizing a source aboard the aircraft, and with its transmission to a remote control center via satellite.

FIG. 5 shows a configuration in which the encryption key source 106B is located aboard aircraft 100. The encryption key is transmitted from the aircraft to TRCC 102 via satellite 110. The link between aircraft 100 and the TRCC may be via a single satellite, or via a system of satellites such that a signal is relayed from one satellite to another on one or more occasions as it passes between the aircraft and TRCC 102.

It would be possible to have a more complex version of the configuration shown in FIG. 5 which includes both (a) a freestanding ground-based unit which receives signals from satellite 110 (and is separate from TRCC 102) and (b) one or more repeater units situated between the freestanding ground-based receiving unit and TRCC 102. However, the simpler configuration shown in FIG. 5 is more desirable; Because it contains no across-the-ground links, it would be more difficult for an unauthorized person to gain access to, or intercept the signal in this simpler configuration.

2.6 Terrestrial Remote Control Center Source; Satellite Transmission

Figure 6:
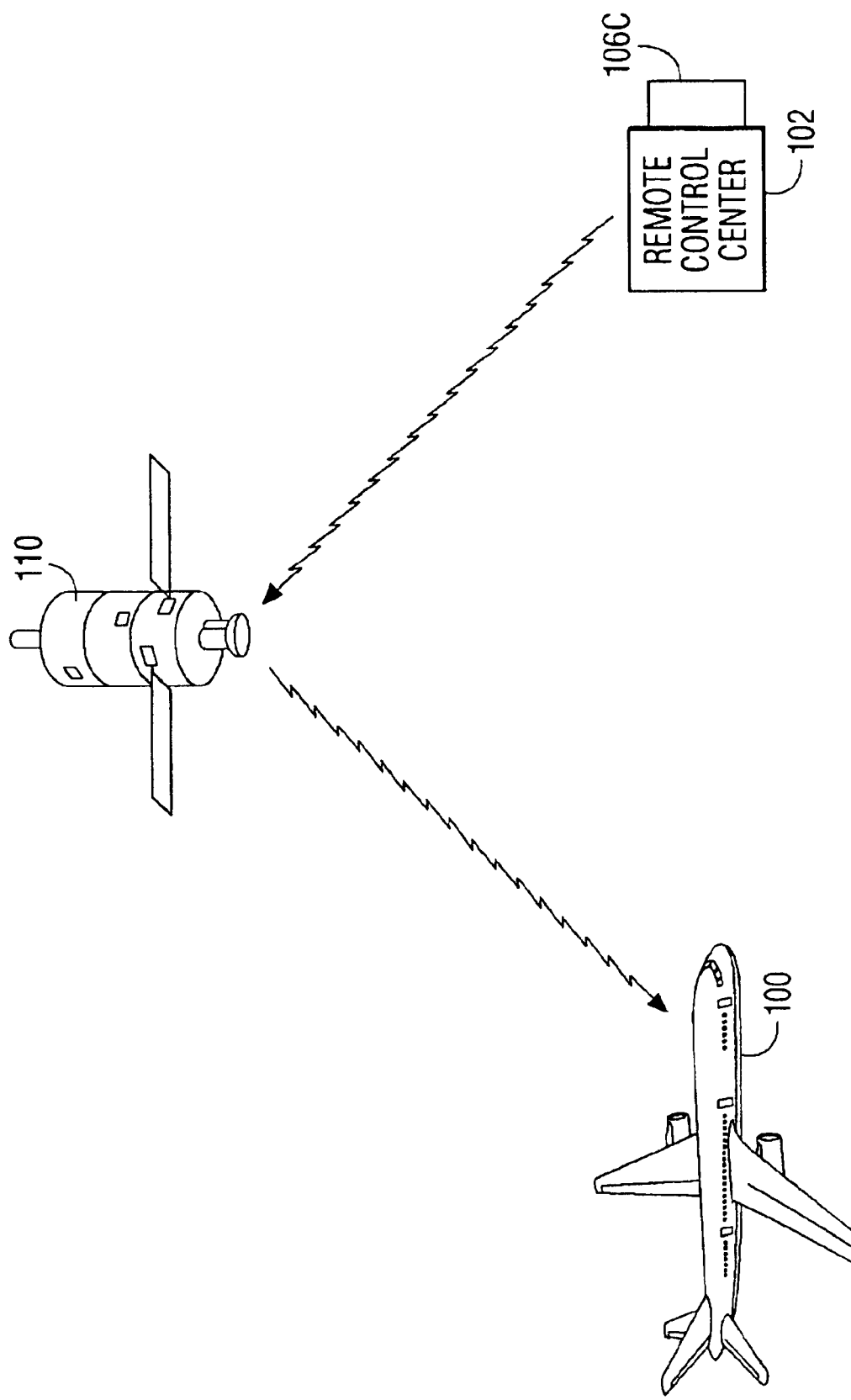
FIG. 6 shows another means of sharing the encryption key utilizing a source at the remote control center, and with its transmission to the aircraft via satellite.

FIG. 6 shows a configuration in which the encryption key source 106C is located at the terrestrial remote control center 102. The encryption key is transmitted from the TRCC 102 to aircraft 100 via satellite 110. The link between aircraft 100 and the TRCC may be via a single satellite, or via a system of satellites.

It would be possible to have a more complex version of the configuration shown in FIG. 6 which includes both (a) a freestanding ground-based unit which transmits signals to satellite 110 (and is separate from TRCC 102) and (b) one or more repeater units situated between the freestanding ground-based transmitting unit and TRCC 102. However, the simpler configuration shown in FIG. 6 is more desirable; Because it contains no across-the-ground links, it would be more difficult for an unauthorized person to gain access to, or intercept the signal in this simpler configuration.

2.7 Satellite Source

Figure 7:
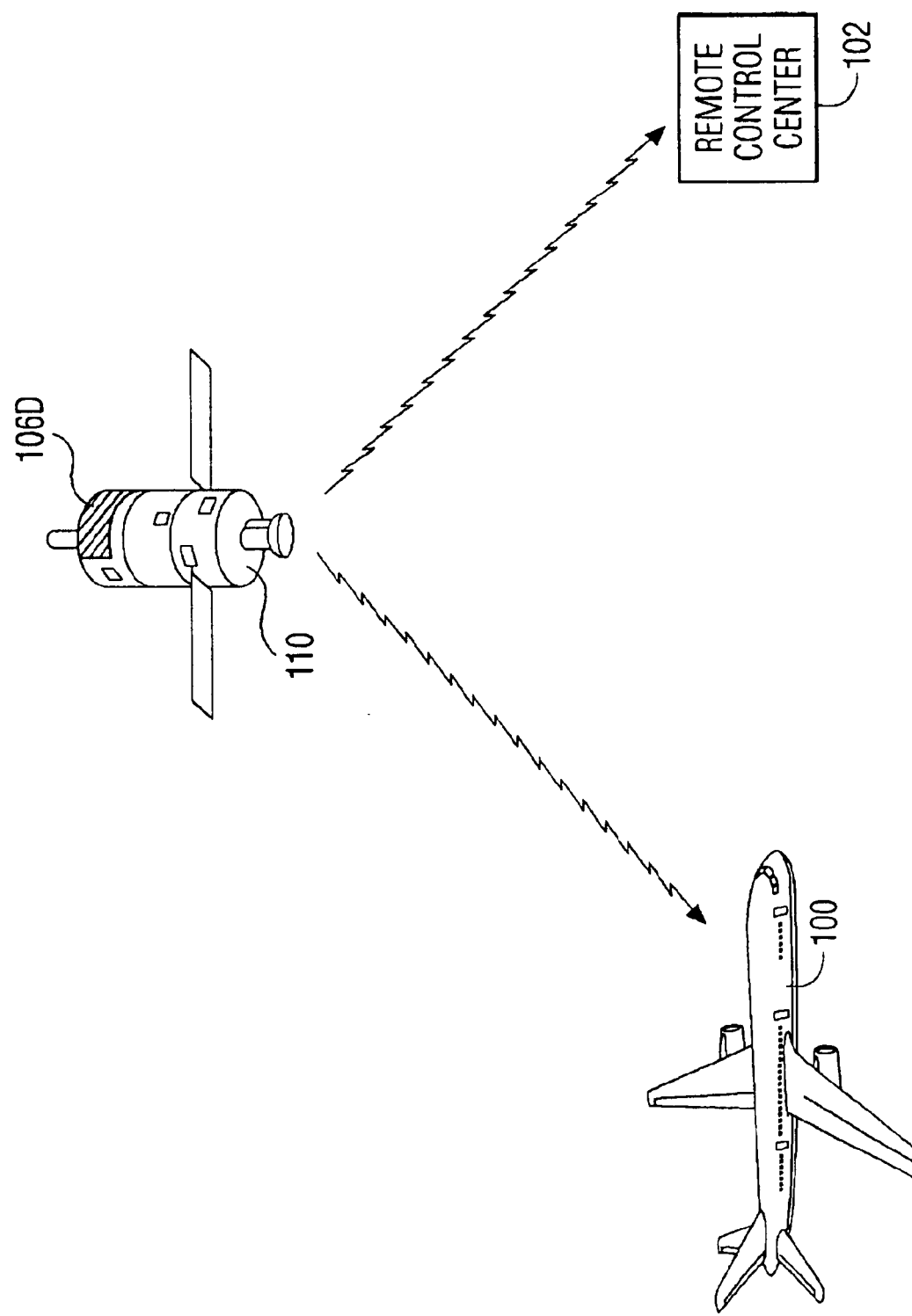
FIG. 7 shows another means of sharing the encryption key utilizing a source aboard a satellite, and with its transmission to both an aircraft and to a remote control center.

FIG. 7 shows a configuration in which the encryption key source 106D is located aboard a satellite 110. The encryption key is transmitted from the satellite to both the aircraft 100 and the TRCC 102. The link between satellite 110 and each of aircraft 100 and TRCC 102 may contain additional satellites.

As indicated in the aforementioned discussion of FIG. 5, the link between satellite 110 and TRCC 102 may contain a freestanding ground-based receiving unit and ground based repeater units. However, the simpler configuration shown in FIG. 7 is more desirable because of its greater resistance to signal interception.

3. Additional Encryption Measures 3.1 Two or More Different Sources/Routes for Encryption Key Transmission A means of further preventing an unauthorized person from obtaining the encryption key would be the use of more than one of the approaches listed in Table 1 and shown in FIGS. 2 through 7. For example: A first portion of the encryption key could be generated by the freestanding encryption key source 106A shown in FIG. 2, and could be transmitted to both the aircraft and the TRCC, as is shown in that figure. A second portion of the encryption key could be generated by the satellite based encryption key source 106D shown in FIG. 7, and could be transmitted to both the aircraft and the TRCC as is shown in that figure.

3.2 Encryption Key Changes During the Flight

Another means of preventing an unauthorized person from using the encryption key would be to change the key one or more times during the flight. The initial encryption key could be generated and transmitted according to any of the six approaches listed in Table 1. A second encryption key could be generated at a later time and transmitted according to any of the aforementioned approaches, and not necessarily the same approach as the first encryption key. The second encryption key could thus be generated from the same or a different source as the first encryption key, and its transmission path could be the same or different than the first one. The second encryption key could be generated seconds, minutes or hours after the first one.

3.2.1 Nested Encryption Keys

The second encryption key could be transmitted from its source without the key itself being encoded, or, as a further means of protection, it could be encoded using the first encryption key.

A third, fourth and additional encryption keys could later be generated, in a similar manner to the second encryption key. Hereinafter, all encryption keys after the initial one will be referred to as "follow-up encryption keys." These later keys could be transmitted without being encoded, or could be encoded using one or more of the previously used encryption keys.

3.2.2 Encryption Directing Unit

The transmission of the encryption key to the aircraft 100 and to the TRCC 102 may be controlled by a separate "encryption directing unit" which controls (a) the timing of issuance of follow-up encryption keys and/or (b) the source of the encryption key, i.e. which among elements 106A, 106B, 106C or 106D generates a particular follow-up key.

4. Use of Highly Directional Transmitting and Receiving Means to Prevent Access by Unauthorized Person

4.1 Highly Directional Means Between Controlled Aircraft and Satellite, and Between Terrestrial Remote Control Center and Satellite FIG. 8 illustrates the use of a highly directional antennae to protect against interception of or access to transmissions between TRCC 102 and aircraft 100. A highly directional antenna 112 aboard an aircraft 100, is used to communicate with satellite 110C which may also contain one or more highly directional antennae as well as omnidirectional antennae. As shown in the figure, aircraft antenna 112 communicates with satellite antenna 111F. The aircraft directional antenna 112 prevents communication with the aircraft by a ground-based unauthorized person, while the satellite directional antenna 111F limits unauthorized ground access to signals that it transmits. Each highly directional antenna should incorporate means to align the antenna (e.g. element 112) with its counterpart (e.g. element 111F).

Signals to and from satellite 110C are sent via directional antenna 111E and may be relayed to TRCC 102 directly, or via one or more additional satellites, e.g. 110A and 110B as shown in FIG. 8. Each satellite may contain one or more highly directional antennae. As shown in FIG. 8:

(a) Highly directional antenna 111E aboard satellite 110C sends signals to and receives signals from highly directional antenna 111D aboard satellite 110B;

(b) Highly directional antenna 111C aboard satellite 110B sends signals to and receives signals from highly directional antenna 111B aboard satellite 110A; and, (c) Highly directional antenna 111A aboard satellite 110A sends signals to and receives signals from highly directional antenna 113 at the TRCC 102.

Each highly directional antenna should incorporate means to align the antenna with its counterpart. Encrypted information containing the coordinate position and altitude, and possibly also the direction, speed and flight plan of aircraft 100 may be transmitted to satellite 110C and used by it to align its antenna 111F with aircraft 100. The position information may be obtained from global positioning satellite information, and/or from other instruments aboard the aircraft.

The relayed signals could contain either (a) encryption keys or (b) data from aircraft 100 and commands used to control the flight of aircraft 100. To further protect against interception of or access to transmissions between TRCC 102 and satellite 110A (or any satellite that communicates with TRCC 102), the TRCC 102 should preferably be located at a point surrounded by a large, easily monitored area such as a desert, or at sea; since an unauthorized person attempting to transmit or receive aircraft information would need to be located near the TRCC 102, because of the directional transmitting and receiving characteristics of the system.

4.2 Highly Directional Means Using an Intercepting Aircraft

Figure 9A:
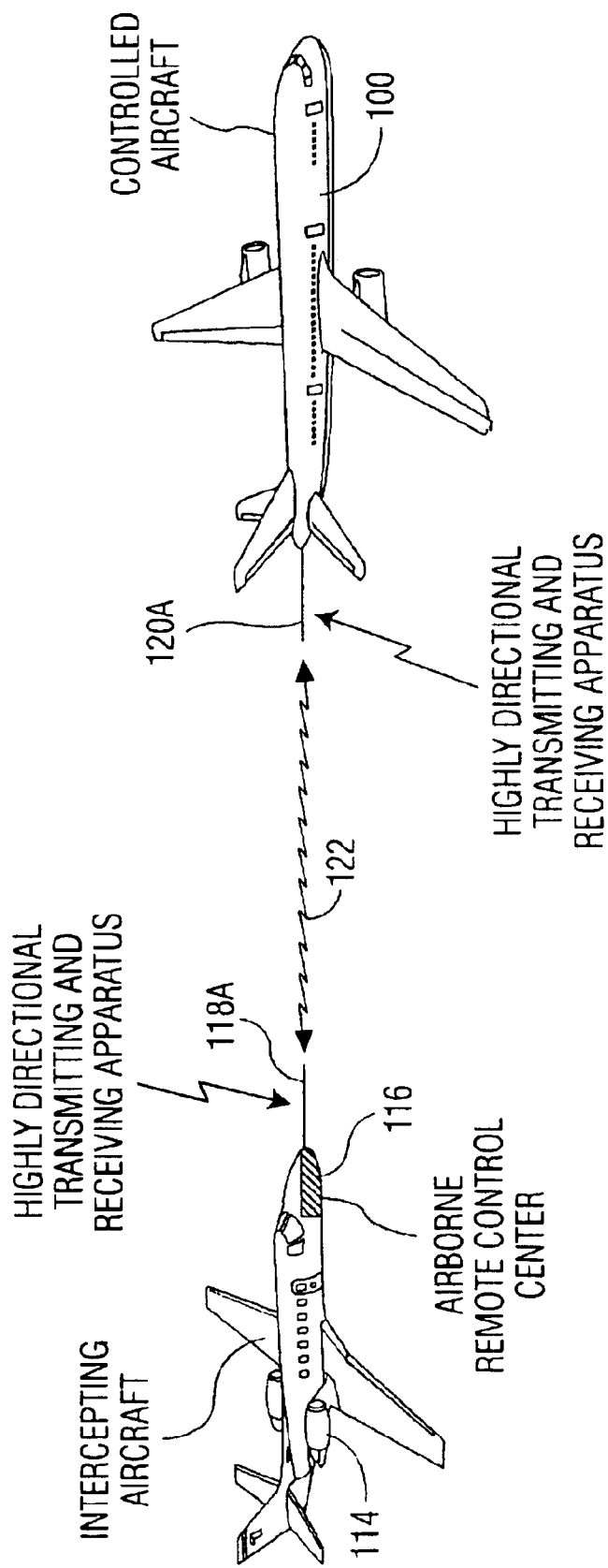
FIG. 9A is an overview of another embodiment of the system according to the invention which includes a controlled aircraft, an airborne remote control center aboard a second aircraft, and means for highly directional communication between the controlled aircraft and the second aircraft.
Figure 9B:
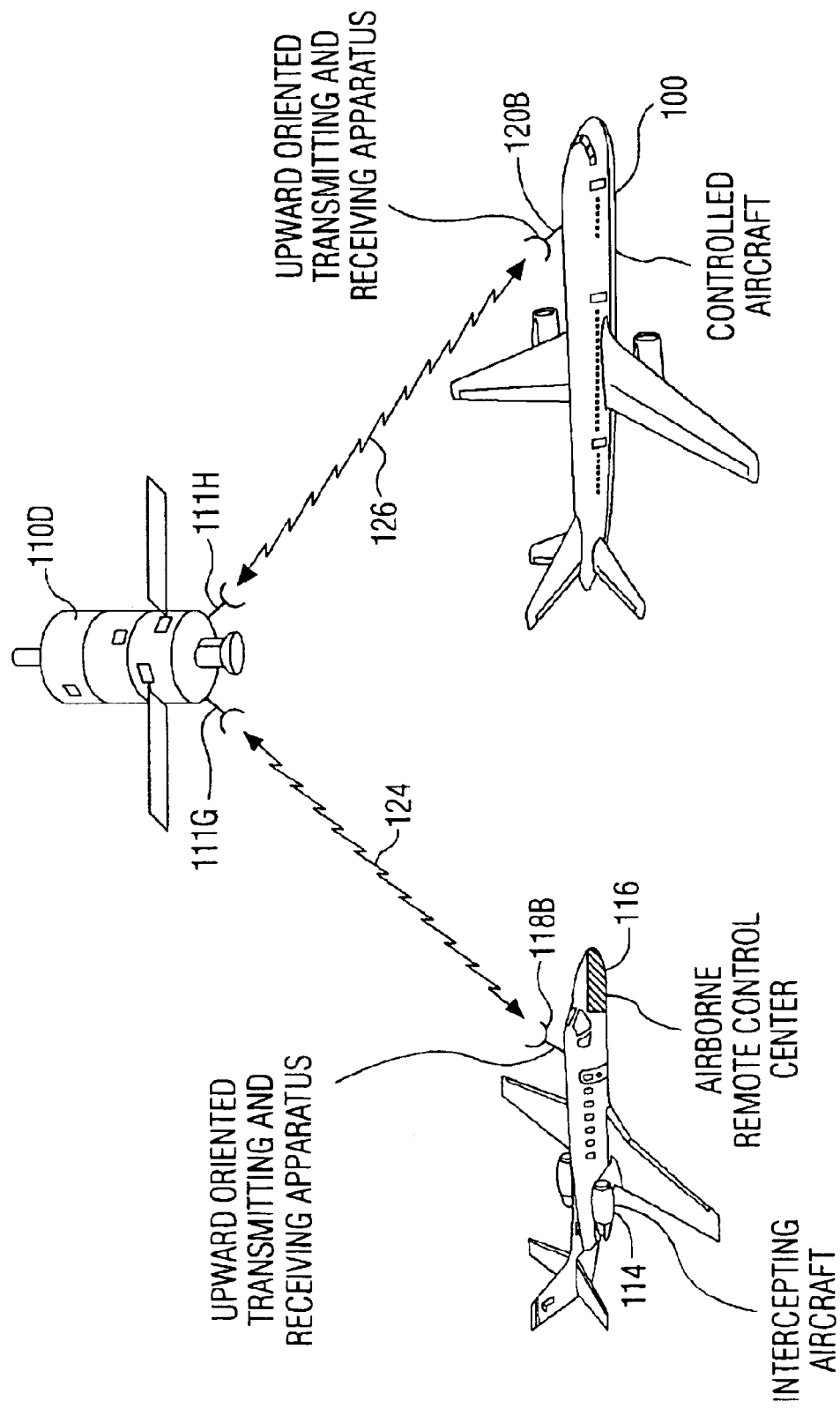
FIG. 9B is an overview of another embodiment of the system according to the invention which includes a controlled aircraft, an airborne remote control center aboard a second aircraft, a satellite which relays communication between the two aircraft, and means on both aircraft for highly directional communication between the aircraft and the satellite.
Figure 9C:
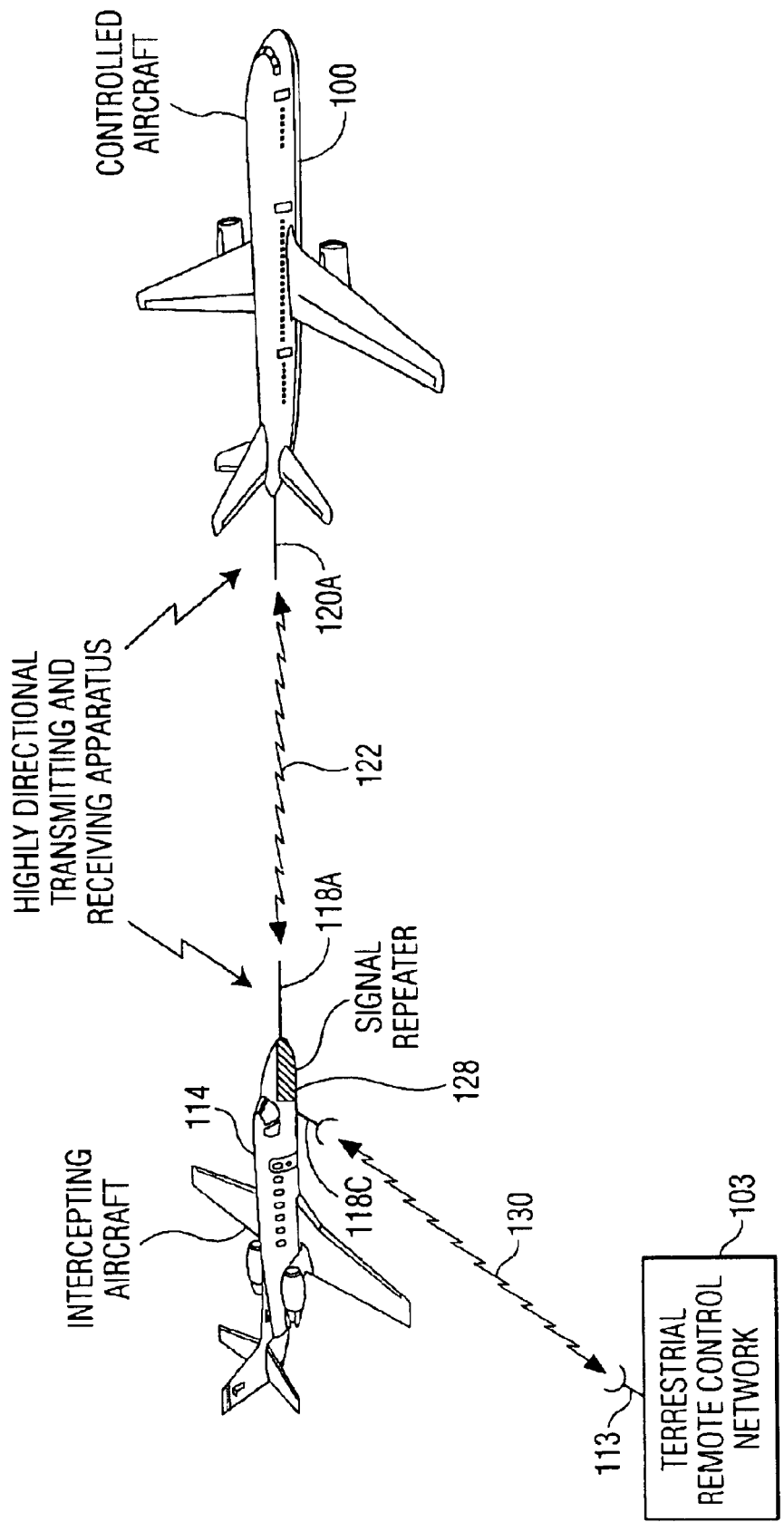
FIG. 9C is an overview of another embodiment of the system according to the invention which includes a controlled aircraft, a second aircraft with an onboard signal repeater, highly directional means for communicating between the controlled aircraft and the second aircraft, and a terrestrial remote control center with highly directional means for communication with the signal repeater aboard the second aircraft.
Figure 9D:
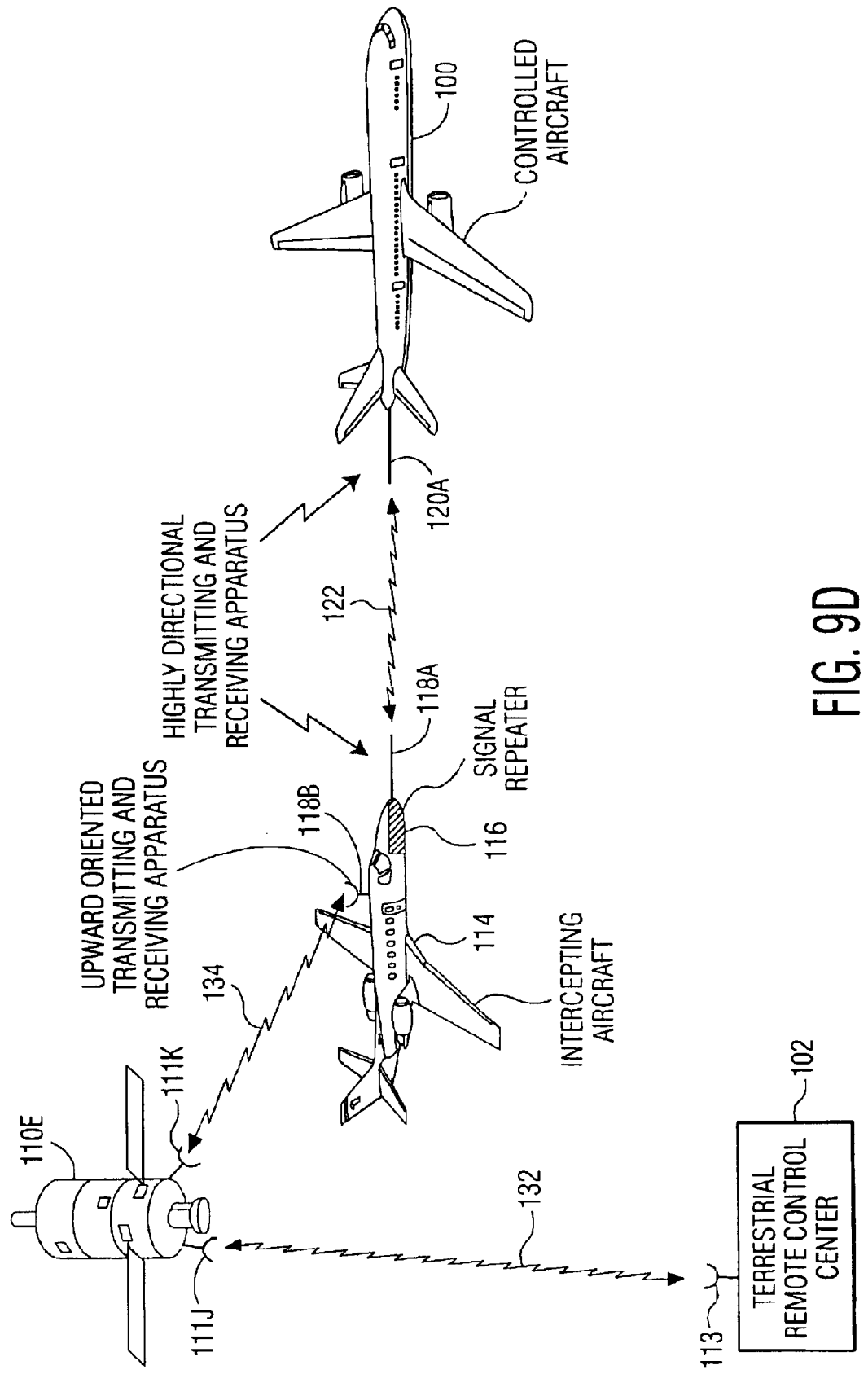
FIG. 9D is an overview of another embodiment of the system according to the invention which includes a controlled aircraft, a second aircraft with an onboard signal repeater, highly directional means for communicating between the controlled aircraft and the second aircraft, a satellite which relays communication between the second aircraft and a terrestrial remote control center, highly directional means for communication between the second aircraft and the satellite, and a terrestrial remote control center with highly directional means for communication with the satellite.

FIGS. 9A–9D illustrate the use of an intercepting aircraft 114 to (a) form a highly secure communications link with controlled aircraft 100 and (b) allow for the direct observation of aircraft 100. The intercepting aircraft 114 contains either (a) an airborne remote control center (as shown in FIGS. 9A and 9B), or (b) a signal repeating unit which is linked to a terrestrial remote control center (as shown in FIGS. 9C and 9D). Intercepting aircraft 114 also contains highly directional transmitting and receiving apparatus 118 which sends signals to and receives signals from a second highly directional transmitting and receiving apparatus 120 aboard the controlled aircraft 100, to prevent access to signals for the remote control of aircraft 100, and thereby greatly reducing the likelihood that an unauthorized person could transmit or receive such signals.

The flight plan for the controlled aircraft may be determined by personnel aboard the intercepting aircraft, and executed using airborne remote control center (ARCC) 116, as shown in FIGS. 9A and 9B. Alternatively, as shown in FIGS. 9C and 9D, the flight plan may originate at a terrestrial remote control center (TRCC) and be transmitted to the intercepting aircraft 114. In the latter case, the encrypted plan may be transmitted via a ground network (as shown in FIG. 9C), a satellite network (as shown in FIG. 9D), or both.

4.2.1 Airborne Remote Control Center is Used to Control the Intercepted Aircraft

4.2.1.1 Direct Link Between Intercepting and Controlled Aircraft

FIG. 9A shows intercepting aircraft 114 containing an ARCC 116 and highly directional transmitting and receiving apparatus 118A.

The ARCC contains equipment which performs the same function as that in the TRCC 102. It receives information from aircraft 100 such as the throttle, elevator, rudder, flap, aileron and landing gear positions, the location and velocity of aircraft 100, the remaining fuel in each tank, and audio and video information from both the cockpit and the cabin of aircraft 100. One or more flight controlling personnel at the ARCC 116 assess the aforementioned information in conjunction with other information including:

(a) visual inspection of aircraft 100 and its performance;

(b) radar information about the position of aircraft 100 and possibly the position of other aircraft;

(c) information from transponders aboard aircraft 100; and, (d) information such as news of other relevant events, e.g. a terrorist action, from terrestrial sources.

The flight controlling personnel use the information to: (a) make a decision about whether to take control over aircraft 100; and (b) pilot the aircraft 100, once they have made the decision to take control. The flight controlling personnel control the aircraft 100 by sending control signals which control each of the functions of aircraft 100 that would ordinarily be controlled by the pilot of aircraft 100, such as the throttles, the elevator, the rudder, the flaps, the ailerons and the landing gear.

Highly directional transmitting and receiving apparatus 118A communicates with the highly directional transmitting and receiving apparatus 120A aboard the controlled aircraft 100. The signals transmitted between apparatus 118A aboard the intercepting aircraft 114 and apparatus 120A aboard the controlled aircraft 100 may be radio frequency, optical, infrared, ultraviolet or the like. Two way transmission of highly directional signals is symbolized by the double arrow 122. Apparatus 118A and 120A need not necessarily point in a direction that is parallel to the line of flight of aircraft 114 and 100, but they should point towards each other. The angle between each apparatus and the aircraft on which it resides would be a controllable parameter, and means to align each highly directional apparatus would be incorporated. This would allow the altitude of aircraft 114 to be greater than or less than that of aircraft 100. Similarly, it would allow the intercepting aircraft 114 to be situated to the right or left of the controlled aircraft 100, and it would allow control of aircraft 100 when the line of flight of the two aircraft is not the same.

As aircraft 114 approaches aircraft 100, the power of the signals transmitted by aircraft 100 could be reduced, thereby making remote reception of these signals by an unauthorized person more difficult; Similarly, the sensitivity of the receiver aboard aircraft 100 could be reduced, thereby making remote transmission to aircraft 100 by an unauthorized person more difficult.

4.2.1.2 Link Between Intercepting and Controlled Aircraft is via Satellite

FIG. 9B shows a situation in which the encrypted information, which is exchanged between controlled aircraft 100 and the ARCC 116, is relayed by satellite 110D. The information is exchanged between upward oriented highly directional transmitting and receiving apparatus 118B aboard intercepting aircraft 114 and highly directional antenna 111G aboard satellite 110D, along path 124. Upward oriented transmitting and receiving apparatus 120B aboard controlled aircraft 100 allows for the exchange of signals between satellite 110D, via highly directional antenna 111H, and controlled aircraft 100 along path 126. Thus the combination of path 124, antenna 111G, satellite 110D, antenna 111H and path 126 in FIG. 9B is analogous to path 122 in FIG. 9A.

Each highly directional antenna should incorporate means to align the antenna with its counterpart. Encrypted information containing the coordinate position and altitude, and possibly also the direction, speed and flight plan of intercepting aircraft 114 may be transmitted to satellite 110D and used by it to align its antenna 111G with aircraft 114. Encrypted information containing the coordinate position and altitude, and possibly also the direction, speed and flight plan of aircraft 100 may be transmitted to satellite 110D and used by it to align its antenna 111H with aircraft 100. The position information may be obtained from global positioning satellite (G.P.S.) information, and/or from other instruments aboard the aircraft.

4.2.2 Transmission of Encryption Key to Intercepting Aircraft

The encryption key or keys could be transmitted to the intercepting aircraft 114 before or after the intercepting aircraft takes off. The encryption key could be transmitted to the intercepting aircraft:

(a) from the controlled aircraft 100, as intercepting aircraft 114 approaches controlled aircraft 100;

(b) from the controlled aircraft 100, via satellite, as shown in FIG. 9B;

(c) directly from a satellite, analogous to that shown in FIG. 7;

(d) from the terrestrial remote control center, either via terrestrial repeater network (analogous to FIG. 1A) or via one or more satellites (analogous to FIG. 1B) or via both terrestrial repeater network and satellite(s);

(e) from a freestanding encryption system, (analogous to FIG. 2, but including additional ground transmitting apparatus and, possibly, ground based and/or satellite based repeating units).

4.2.3 Terrestrial Remote Control Center is Used to Control the Intercepted Aircraft In FIGS. 9C and 9D the intercepting aircraft 114 does not contain an airborne remote control center. Aircraft 100 is controlled from the terrestrial remote control center, with data and control signals relayed via a signal repeater 116 aboard intercepting aircraft 114.

4.2.3.1 Direct Link Between Terrestrial Remote Control Center and Intercepting Aircraft FIG. 9C shows a method of controlling aircraft 100 in which:

(a) The aircraft 100 is controlled from a terrestrial remote control network 103;

(b) Information passes between aircraft 100 and terrestrial remote control network 103 via signal repeater 116 carried aboard intercepting aircraft 114;

(c) A pair of highly directional transmitting and receiving apparatus, 118A and 120A, is carried aboard intercepting aircraft 114 and controlled aircraft 100 to assure restriction of access to communications between them;

(d) Means to align each highly directional apparatus is incorporated; and (e) The power of the signal transmitted by aircraft 100 and the sensitivity of the receiver aboard aircraft 100 could be reduced as intercepting aircraft 114 approaches aircraft 100.

Terrestrial remote control network 103 includes: (a) terrestrial remote control center 102 and (b) terrestrial repeater network 104, both of which are shown in FIG. 1A. A highly directional antenna 113 linked to the terrestrial network communicates with highly directional antenna 118C aboard intercepting aircraft 114 via path 130. Means to align each highly directional antenna is incorporated. Coordinate position and altitude, and possibly also velocity and flight plan information from either of the two aircraft 100 and 114 may be used in the alignment of antennae 113 and 118C.

FIG. 9C shows a direct communications path 122 between directional apparatus 118A and 120A. Alternatively, in a manner analogous to FIG. 9B, a satellite and upwardly oriented transmitting and receiving apparatus aboard each of the aircraft for communication with a satellite, may be substituted for the direct path 122 between the two aircraft.

4.2.3.2 Link Between Terrestrial Remote Control Center and Intercepting Aircraft is via Satellite FIG. 9D shows a method of controlling aircraft 100 which is similar to that shown in 9C, except that a satellite, rather than a terrestrial repeater network, carries the communications between the TRCC and the signal repeater 116 aboard intercepting aircraft 114. Thus, the satellite 110E and its associated communication paths 132 and 134 (shown in FIG. 9D), replace communications path 130 (shown in FIG. 9C). The satellite would obviate the need for a terrestrial repeater network, and hence the terrestrial remote control network 103 of FIG. 9C is replaced by the terrestrial remote control center 102 of FIG. 9D.

Satellite 110E contains a highly directional antenna 111J for communicating with another highly directional antenna 113 at the terrestrial remote control center 102. It also contains a highly directional antenna 111K for communicating with another highly directional antenna 118B on intercepting aircraft 114. Each highly directional antenna incorporates means for properly aligning the antenna. Coordinate position and altitude, and possibly also velocity and flight plan information from either of the two aircraft 100 and 114 may be used in the alignment of antennae 111K and 118B.

Referring again to FIG. 9D, a network of satellites could be substituted for the single satellite 110E.

In an alternative configuration, a hybrid system, consisting of both terrestrial and satellite-based repeater units could be interposed between terrestrial remote control center 102 and intercepting aircraft 114.

FIG. 9D shows a direct communications path 122 between directional apparatus 118A and 120A. Alternatively, in a manner analogous to FIG. 9B, a satellite and upwardly oriented transmitting and receiving apparatus aboard each of the aircraft, may be substituted for the direct path between the two aircraft.

4.3 Summary of In-flight Control Options

Table 2, below, summarizes the options for the control of aircraft 100, and indicates which figure shows each option. In the table, the "source" refers to the center from where the aircraft is controlled, i.e. either the terrestrial (TRCC) or the airborne (ARCC) remote control center. The "route" refers to the intervening components, if any, that signals traverse between the source and the controlled aircraft.

TABLE 2

In-flight Control Options

| Source: | Route: | FIG.: |
|---|---|---|
| TRCC | Terrestrial Network | 1A |
| TRCC | Satellite | 1B, 8 |
| ARCC | Direct | 9A |
| ARCC | Satellite | 9B |
| TRCC | Interceptor Aircraft | 9C |
| TRCC | Satellite and Interceptor Aircraft | 9D |

5. Source of Takeover Command for the Controlled Aircraft

5.1 Pilot Initiated Takeover, PITO

The initiation of flight takeover may be either at the request of the pilot or other authorized personnel aboard aircraft 100. This situation is referred to as 'Pilot Initiated Takeover,' or PITO in the text which follows.

5.2 Remote Initiated Takeover, RITO

Alternatively, the initiation of flight takeover may come from a person not aboard aircraft 100, in which case it is referred to as "Remote Initiated Takeover," or RITO in the text which follows. RITO may be initiated by personnel aboard intercepting aircraft 114, or by ground based personnel. The advantage of restricting RITO to airborne personnel is that it greatly limits the ability of an unauthorized person to gain control of aircraft 100. The disadvantage of restricting RITO to airborne personnel is the delay inherent in both dispatching an intercepting aircraft, and in having it reach the aircraft to be controlled 100.

6. Operational and Flow Diagrams

6.1 Master Aircraft Control

Figure 13:
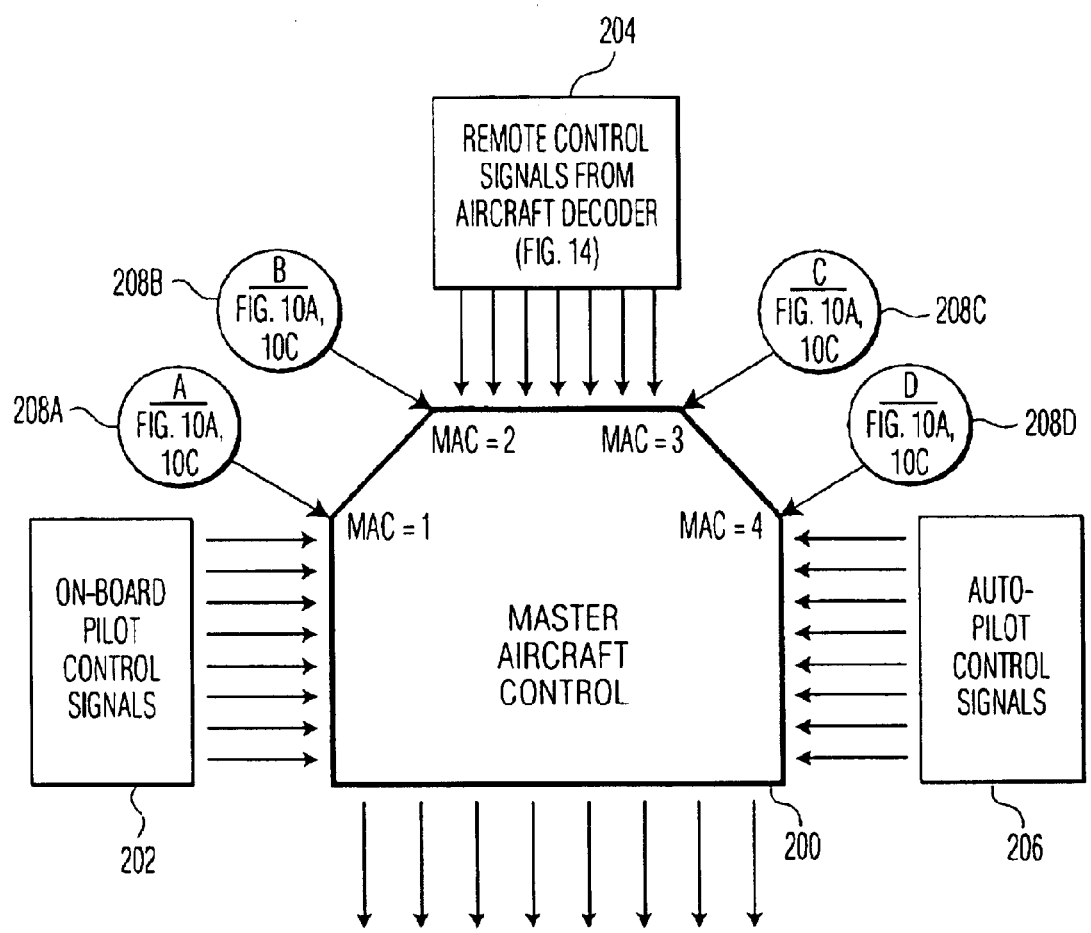
FIG. 13 is a block diagram of the Master Aircraft Control, its inputs from the pilot, from the remote control and from the autopilot, and its output to controllable items on the aircraft.

FIG. 13 shows the Master Aircraft Control System.

At all times, each controllable item, e.g. the throttles, the elevator, the rudder, the flaps, the ailerons and the landing gear may be controlled by one of three sources of control:

(a) the pilot;

(b) the terrestrial or airborne remote control center; or (c) a backup autopilot.

Alternatively (i.e. post-landing), control of an item may be restricted from all three of the aforementioned sources. Table 3, below, summarizes the four possible states of the master aircraft control 200.

TABLE 3

Master Aircraft Control States

| Master Aircraft Control State | Aircraft Status: |
|---|---|
| 1 | Aircraft controlled by pilot |
| 2 | Aircraft controlled by TRCC or ARCC |
| 3 | Aircraft controlled by autopilot |
| 4 | Post Landing: additional restrictions |

Referring again to FIG. 13, Master Aircraft Control or "MAC" 200 is essentially a four position selector switch for each of the systems which control flight of the aircraft. That is, depending on which of four states the MAC 200 is in, any particular controllable item (such as the throttles, for example) would be controlled:

(a) by signals 202 from the on-board pilot; or, (b) by signals 204 sent from a remote control center (either TRCC or ARCC); or, (c) by autopilot control signals 206; or, (d) would be locked out (e.g. the throttles placed in the closed position, post landing).

Besides the three sets of aircraft system control signals 202, 204 and 206 which input the MAC 200, there are four state-setting inputs 208A, 208B, 208C and 208D to the MAC:

(a) An input signal at 208A causes MAC 200 to enter MAC State 1.

(b) An input signal at 208B causes MAC 200 to enter MAC State 2.

(c) An input signal at 208C causes MAC 200 to enter MAC State 3.

(d) An input signal at 208D causes MAC 200 to enter MAC State 4.

The input signals at 208A–D come from the microprocessor shown in FIG. 10A and discussed below. The logic used by this microprocessor is shown in FIG. 10C and discussed below.

6.1.1 MAC State Transition Rules

The rules for transitions between MAC states are summarized below in Table 4:

TABLE 4

Rules for Transitions Between MAC States Associated with Remote Controlled Flight

| From MAC State: | To MAC State: | Transition Initiated By: |
|---|---|---|
| 1 | 2 | PITO or RITO |
| 2 | 3 | Communications Failure |
| 3 | 2 | Communications Restoration |
| 2 | 1 | Failure of Both Communications and Autopilot |
| 3 | 1 | Failure of Both Communications and Autopilot |
| Any | 4 | Aircraft Landing |
| 4 | 1 | Loading of New Encryption Codes |

6.1.1.1 Transitions from MAC State 1

The transition from MAC State 1 (on-board pilot controlled flight) to MAC State 2 (flight controlled by TRCC or ARCC) may be initiated by the on-board pilot (PITO) or by personnel in a remote control center (RITO). In highly unusual circumstances, discussed below in Section 6.1.1.2.2, there may be a transition from MAC State 2 back to MAC State 1 following a failure of both the communications system and the autopilot.

6.1.1.1.1 Pilot Initiated Takeover

If the pilot and/or any other designated on-board flight personnel become aware of an actual or an intended hijacking or terrorist action involving aircraft 100, they may initiate a PITO (Pilot Initiated Takeover) command. The act of initiating the command may entail any of the following:

(a) One or more of the on-board personnel of aircraft 100 would press one or more buttons, one or more times. Each designated button pressing person might press the same or a different button, and might press it the same or a different number of times. An alternative to button press is touching one or more touch-sensitive screens or other surfaces.

(b) One or more of the on-board personnel of aircraft 100 would speak a certain word or combination of words. The word or words for any one such person need not be the same as the word or words for any other such person. Voice recognition software (as is known in the art) running on a microprocessor would be used to distinguish the appropriate word or words and the appropriate speaker of the word or words.

(c) One or more of the on-board personnel of aircraft 100 would input an alphanumeric code by means of one or more input devices aboard the aircraft. The code and the inputting device need not be the same for each inputting person.

(d) Combinations of (a), (b) and/or (c), immediately above.

In addition, any aspect of any of the aforementioned could be changed from time to time, e.g. the button(s) to be pressed, the word(s) to be spoken, the person(s) to do the speaking, etc.

PITO-related hardware and software is discussed below in Section 6.2.1.2.1 and shown in FIG. 10D.

6.1.1.1.2 Remote Initiated Takeover

If the Air Traffic Controller, or any other designated person or persons become aware that an aircraft is or may be subject to a possible or actual hijacking or terrorist action, they may initiate a RITO (Remote Initiated Takeover Command). Such awareness may be based on:

(a) inappropriate action of the pilot or of the aircraft 100;

(b) unauthorized and/or inappropriate deviation of the aircraft from a previously-filed flight plan;

(c) a pilot not properly responding to requests (either terrestrial or air-based) to alter his flight plan;

(d) aircraft 100 over-flying a restricted airspace;

(e) the monitoring of audio from on-board aircraft 100 indicating that the pilot is not able to properly control the aircraft;

(f) the monitoring of video from on-board aircraft 100 indicating that the pilot is not able to properly control the aircraft;

(g) direct visual observation of aircraft 100 by persons aboard a nearby aircraft;

(h) the request of the pilot of the aircraft 100, or of any designated person or persons aboard the aircraft;

(i) a PITO that was issued in a manner that does not exactly meet the pre-established PITO technique, code, word or action;

(j) information from other sources of information (e.g. military information, news media, or individual persons other than the pilot and designated aircraft crew) that aircraft 100 is the subject of a hijacking or terrorist action; and/or (k) combinations of two or more of (a) through (j), immediately above.

In one embodiment of the invention, any PITO command would have to be followed by a confirmatory action by a person in the TRCC or ARCC in order to cause MAC 200 to go from MAC State 1 to MAC State 2. In this case, the decision of a TRCC or ARCC person to take control could be based on:

(a) the PITO itself (e.g. whether it was initiated in exactly the proper manner);

(b) any one or more of the RITO criteria (a) through (j), above; or (c) a combination of PITO and RITO criteria.

RITO is initiated after personnel in a terrestrial remote control center make a decision to take control over aircraft 100. These personnel send an encrypted command (see below, FIG. 17 discussion) from the TRCC causing the Master Aircraft Control 200 aboard aircraft 100 to enter MAC State 2. Alternatively, personnel in a TRCC may decide to cause an intercepting aircraft 114 containing an airborne remote control center (FIGS. 9A, 9B) to fly to the vicinity of aircraft 100. Once there, personnel in the ARCC may, if appropriate, send an encrypted command causing MAC 200 to enter MAC State 2.

6.1.1.1.3 Other Transitions from MAC State 1

There are two classes of other circumstances in which transitions from MAC State 1 may occur: (a) following entry into MAC State 2, and (b) during the course of an ordinary, non-remote controlled flight.

As discussed below, in Section 6.1.1.2.2, MAC State 1 may be entered after MAC State 2, in the highly unlikely situation of a dual failure of both the remote control communication system and the autopilot. Following restoration of the function of either one of the remote control communication system or the autopilot, a transition from MAC State 1 to either MAC State 2 (if the communication system is restored) or MAC State 3 (if the autopilot but not the communication system is restored) may occur.

During the course of an ordinary non-remote controlled flight, the pilot will normally have occasion to use the autopilot. In such a situation, a pilot-initiated transition from MAC State 1 to MAC State 3 would occur. The pilot could, at any time after this, cause the MAC 200 to return to MAC State 1. Immediately following landing of the aircraft during an ordinary flight, a transition to MAC State 4 occurs (see below, Sections 6.1.1.3 and 6.1.1.4).

6.1.1.2 Transitions from MAC State 2

Entry into MAC State 2 is generally from MAC State 1, as discussed above. It may be entered from MAC State 3, after remote control communication is re-established after an interruption. MAC State 2 may not ordinarily be entered from MAC State 4.

Once MAC State 2 is entered, there are three possible MAC State transitions.

6.1.1.2.1 Transition from MAC State 2 to MAC State 3

In the event of a failure of or interruption of the communications system(s) which supports the remote control of aircraft 100, MAC 200 would enter MAC State 3 (control of the aircraft by autopilot) in order to maintain control of the aircraft. Hereinafter and hereinbefore, autopilot refers to the control of each of the systems which controls the flight of the aircraft. If communication is interrupted and then restored, MAC 200 re-enters MAC State 2. A continuous or semi-continuous handshaking process between the communication system aboard aircraft 100 and the communication system of the TRCC or ARCC is used to detect a possible break in and restoration of communications (discussed below).

In the event of a high incidence of transitions between MAC State 2 and MAC State 3 (referred to below as "hunting"), the system may (as an optional design feature) enter MAC State 3 for a more prolonged period of time, i.e. until the intermittent communications interruption problem is better remedied. Alternatively, personnel in the RCC could, upon observing frequent breaks in the handshaking process, make the decision to send a "SET MAC STATE=3" command (See Section 6.2.2.2.2.2).

6.1.1.2.2 Transition from MAC State 2 to MAC State 1, an Optional System Feature During the course of a remote controlled flight, in the event of (a) failure of the autopilot, followed by (b) intermittent failure or interruption of the communications system (s) which supports the remote control of aircraft 100, MAC 200 could re-enter MAC State 1 upon receiving a command to do so from the remote control center. This is an optional design feature of the invention. The logic behind this MAC State transition format is that in such a situation (i.e. intermittent failure of communication with the RCC and failure of the autopilot), even though a transition to MAC State 1 might return control of an aircraft to a terrorist or hijacker, not making the transition to MAC State 1 might mean near certain crash of aircraft 100 because of inability of either the RCC or the autopilot to properly control it. Other situations in which a RCC command to change the MAC state from 2 to 1 could be appropriately issued are discussed below in Section 6.2.2.2.2.2.

Embodiments of the invention are possible in which the aforementioned dual failure does not cause a transition to MAC State 1 (see Section 6.2.2.2.3(e)). Embodiments of the invention are possible in which failure of the autopilot, accompanied by complete communications failure between the RCC and the pilot, results in an automatic transition to MAC State 1 (see Section 6.2.2.2.3(f)).

If, after a transition from MAC State 2 to MAC State 1, either the communication system or the autopilot is restored, there are a number of possible outcomes discussed hereinbelow and in Section 6.2.2.2.3(f):

(a) If the function of the communication system is completely restored, MAC State 2 could be re-entered either by command of the personnel in the remote control center (RITO), or the pilot (PITO). In an alternative embodiment, the system could automatically re-enter MAC State 2 in this circumstance.

(b) If the function of the autopilot is restored and the communication system is not operative, the pilot could cause a transition to MAC State 3 by sending a PITO command. (The algorithm shown in FIG. 10C and described below in Section 6.2.2 would operate in this manner.)

(c) If the function of the autopilot is restored and the communication system is intermittently operating, the RCC personnel may send a SET MAC=3 command.

In a preferred embodiment of the invention, once the system is in MAC State 2, it could only return to MAC State 1 (i) if both communication with the RCC and the backup autopilot failed, or (ii) post landing. However, alternative embodiments might allow a MAC State 2 to MAC State 1 transition under other circumstances initiated by either (i) the pilot/crew (upon the proper issuing of the appropriate password(s)), (ii) the RCC personnel, or (iii) both.

6.1.1.2.3 Transition from MAC State 2 to MAC State 4

Once aircraft 100 has landed, MAC 200 enters MAC State 4. Entry into this state would be caused automatically, by sensors within aircraft. Once in MAC State 4, aircraft 100 could not be flown again until the MAC system is reset; see Section 6.1.1.4, below. This restriction could be imposed by limiting or entirely stopping fuel flow to the engines once a minimal amount of post-landing taxiing is allowed for.

6.1.1.3 Transitions from MAC State 3

Transitions from MAC State 3 have already been discussed:

(a) to MAC State 1, during non-remote control aircraft operation, see Section 6.1.1.1.3; and (b) to MAC State 2 during remote control operation see Section 6.1.1.2.1.

A discussion of the circumstances and consequences of the transition from MAC State 3 to MAC State 1 parallels the discussion of the transition from MAC State 2 to MAC State 1, above, in Section 6.1.1.2.2.

During the course of a remote controlled flight, in the event of (a) intermittent failure or interruption of the communications system(s) which supports the remote control of aircraft 100, followed by (b) failure of the autopilot, MAC 200 could, as an optional design feature of the invention, re-enter MAC State 1 upon receiving a command to do so from the RCC. Other situations in which a remote control center command to change the MAC state from 3 to 1 could be appropriately issued are discussed below in Section 6.2.2.2.2.2.

Embodiments of the invention are possible in which the aforementioned dual failure does not cause a transition to MAC State 1. Embodiments of the invention are possible in which failure of the autopilot, accompanied by complete communications failure between the RCC and the pilot, results in an automatic transition to MAC State 1.

If, after a transition from MAC State 3 to MAC State 1, either the communication system or the autopilot is restored, there are a number of possible outcomes which are entirely parallel to those discussed in Section 6.1.1.2.2 above.

In a preferred embodiment of the invention, once the system is in MAC State 3, it could only return to MAC State 1 (i) if both communication with the RCC and the backup autopilot failed, or (ii) post landing. However, alternative embodiments might allow a MAC State 3 to MAC State 1 transition under other circumstances initiated by either (i) the pilot/crew (upon the proper issuing of the appropriate password(s)), (ii) the RCC personnel, or (iii) both.

If aircraft 100 lands while it is being controlled by the autopilot, the aircraft enters MAC State 4, in a manner similar to that described immediately above in Section 6.1.1.2.3.

6.1.1.4 Transitions from MAC State 4

Upon the landing of aircraft 100, MAC 200 enters MAC State 4, no matter which state MAC 200 was in prior to the landing.

Once in MAC State 4, the only transition possible is to MAC State 1, and this occurs only if and when a new encryption key or keys is/are loaded onto the aircraft. Thus, once it lands, aircraft 100 can not fly again until such new encryption keys have been loaded.

6.2 Source of Master Aircraft Control State-Setting Inputs

Figure 10A:
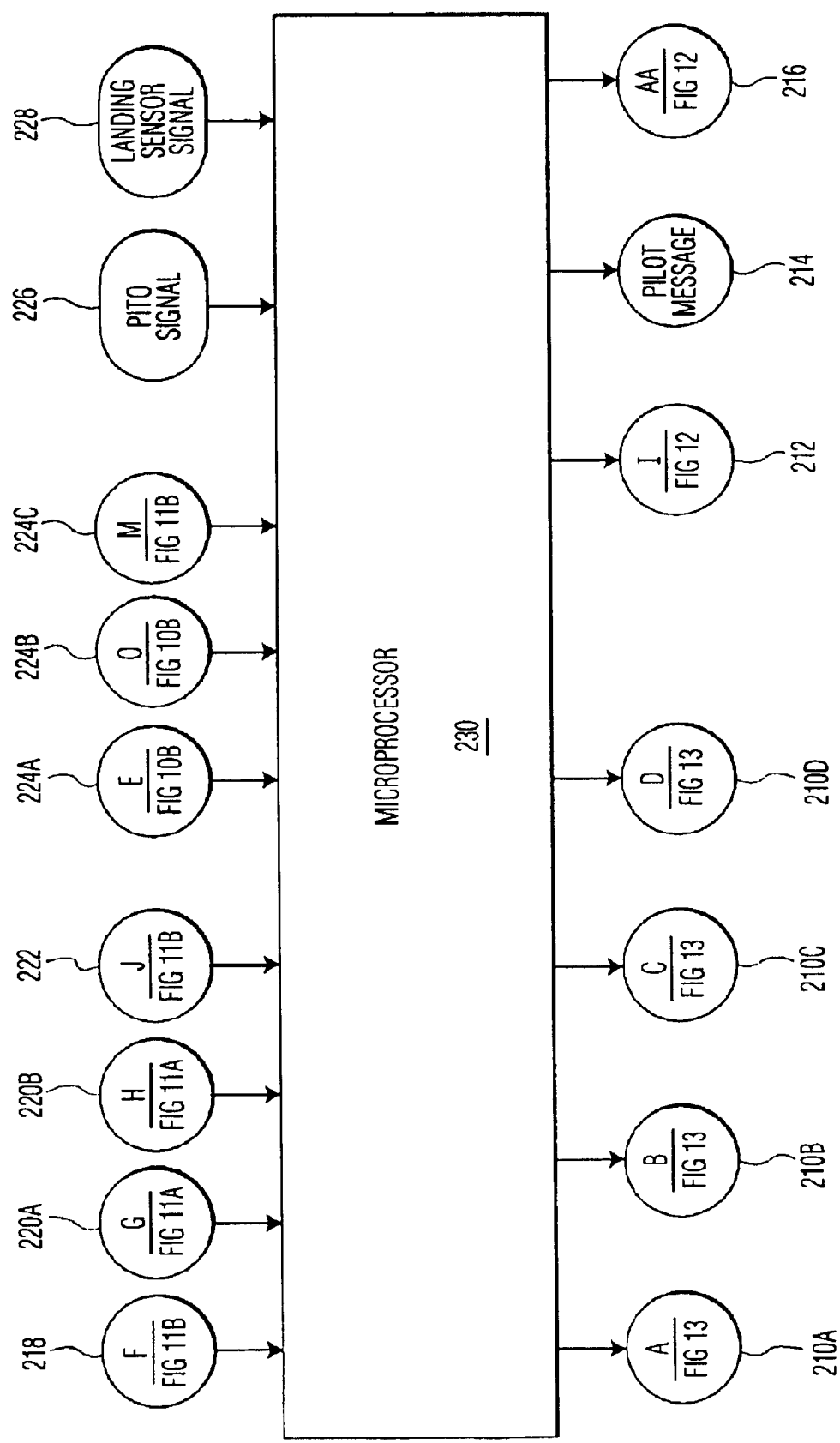
FIG. 10A shows the inputs and outputs to a microprocessor aboard the controlled aircraft which forms a part of the system according to the invention.
Figure 10B:
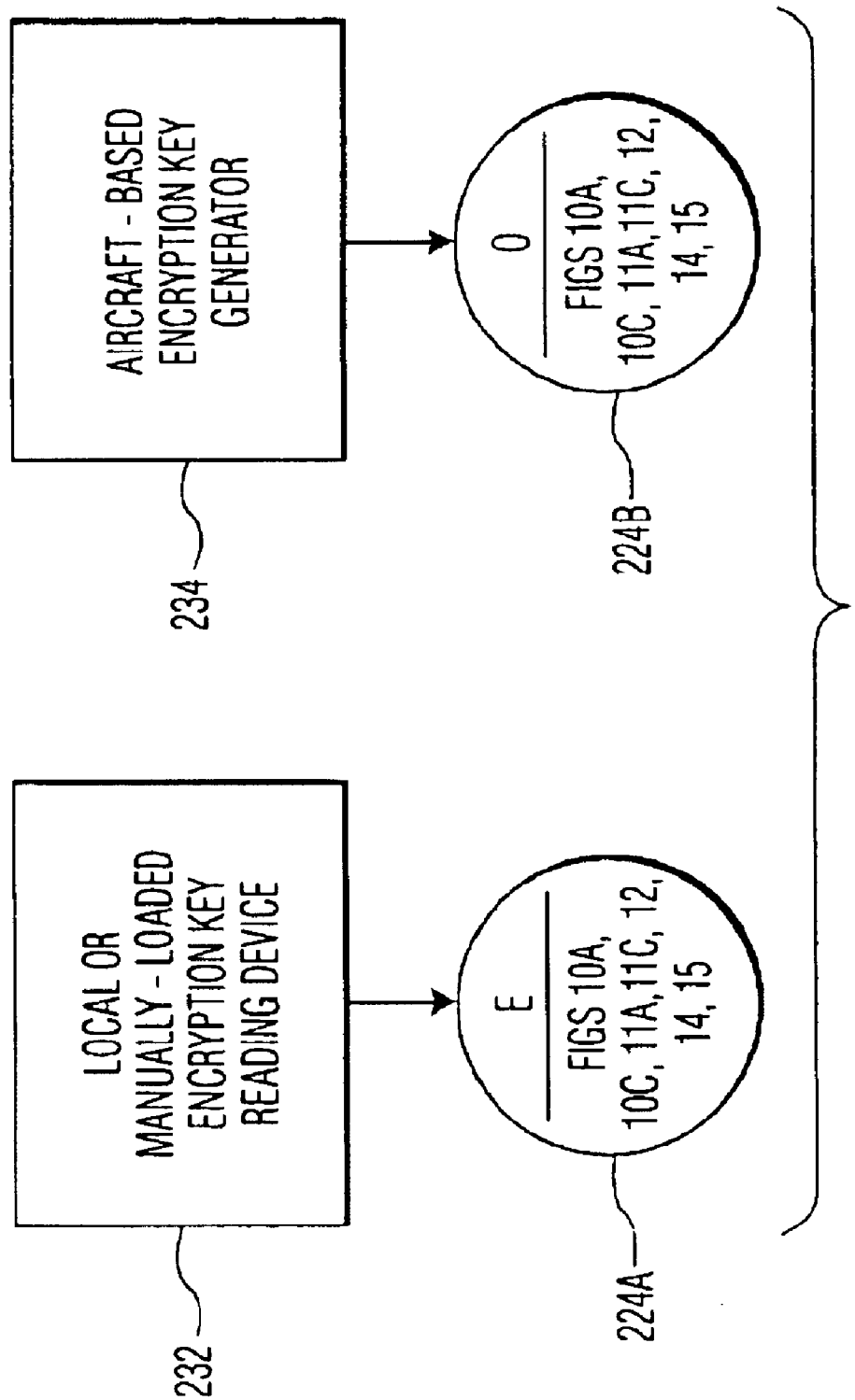
FIG. 10B shows two types of encryption key equipment aboard the controlled aircraft.
Figure 10C:
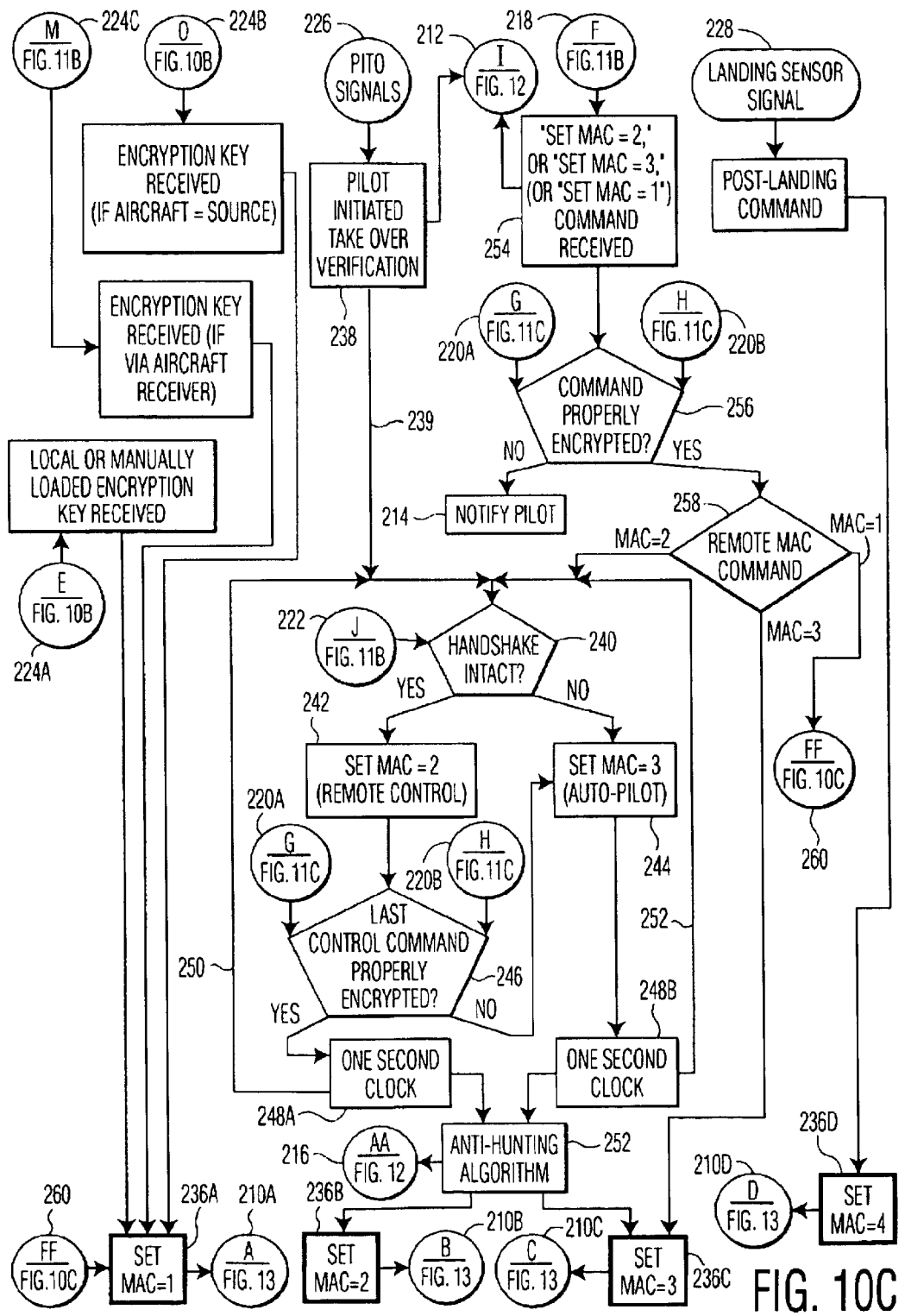
FIG. 10C is a flow diagram showing the operation of the microprocessor of FIG. 10A.

The hardware from which the MAC state-setting inputs are derived is shown in FIG. 10A (the microprocessor), FIG. 10B (encryption key related hardware on aircraft 100) and FIG. 10D (PITO-related hardware and software). FIG. 10C shows the flow diagram whose logic and operations are performed by the microprocessor shown in FIG. 10A.

6.2.1 State-Setting Microprocessor, Its Inputs and Its Outputs

6.2.1.1 State Setting Microprocessor

FIG. 10A shows the state-setting microprocessor 230. The microprocessor may be one of many types that is known in the art. It performs the following functions:

(a) It provides the four state-setting inputs (210A–D) to the Master Aircraft Control 200. The choice among these four is determined by the logic embodied in FIG. 10C, which is executed by the microprocessor.

(b) It runs PITO verification software 227A and 227B, shown in FIG. 10D and described below in Section 6.2.1.2.1.

(c) It runs the anti-hunting algorithm, described below in Section 6.2.2.2.1.4.

6.2.1.2 State Setting Microprocessor Inputs

The nine inputs to microprocessor 230 include:

(a) signal 218, derived from the aircraft remote control receiver (FIG. 11B), which carries the commands to change the MAC State, including the RITO command "SET MAC=2";

(b) signals 220A and 220B, derived from the aircraft remote control receiver (hereinafter referred to as "aircraft receiver"), which indicate that a received command either has been properly encrypted (signal 220A) or has not been properly encrypted (signal 220B). This analysis is an additional protective measure against attempted access to the system by an unauthorized transmission. In a preferred embodiment of the invention, the reception of an improperly encrypted command to change the MAC State (a) results in notification of the pilot, and (b) does not result in the command being carried out. The result of an improperly encrypted command after setting MAC State=2, results in a transition to MAC State=3

(c) signal 222, derived from the aircraft receiver, which indicates that the continuous handshaking process between the aircraft remote control transmitters and receivers, and those of the remote control center is intact.

(d) encryption key related-signals 224A–C:
  (i) In the situation (corresponding to figure when the encryption key is either locally generated or manually loaded, an encryption key reading device 232 (shown in FIG. 10B) generates signal 224A (FIGS. 10A, 10B and 10C) which is used to cause microprocessor 230 to generate a "SET MAC=1" signal at its output 210A.
  (ii) In the situation (corresponding to figure when the encryption key is generated aboard the aircraft, an encryption key generator 234 (shown in FIG. 10B) generates signal 224B (FIGS. 10A, 10B and 10C) which is used to cause microprocessor 230 to generate a "SET MAC=1" signal at its output 210A.
  (iii) In the situation (corresponding to FIG. 4) when the encryption key is generated at the terrestrial remote control center, a signal derived from the aircraft receiver generates signal 224C (FIGS. 10A, 10C and 11B) which is used to cause microprocessor 230 to generate a "SET MAC=1" signal at its output 210A.

(e) PITO signal 226. This signal is generated by the means used to generate the PITO command (shown in FIG. 10D and discussed below in Section 6.2.1.2.1) including: (i) one or more push-button presses, (ii) the voice of the pilot or authorized person(s), or (iii) a sequence of alphanumeric keys; and (f) landing sensor signal 228. This signal is generated when aircraft 100 lands.

6.2.1.2.1 Source and Analysis of PITO Signals

FIG. 10D shows one embodiment of the source and analysis of PITO signals. The figure has three components:

(a) three inputting arrangements, push-buttons 225A, microphones 225B (with their associated audio processing 225C) and keyboards 225D; One or more of these sources generate one or more PITO signals 226;

(b) PITO signals 226; and (c) Pilot Initiated Takeover Verification 238, which entails the analysis of signals 226, using software which runs on microprocessor 230. The software includes word and voice recognition programs 227A and goodness of fit evaluation 227B.

Figure 12:
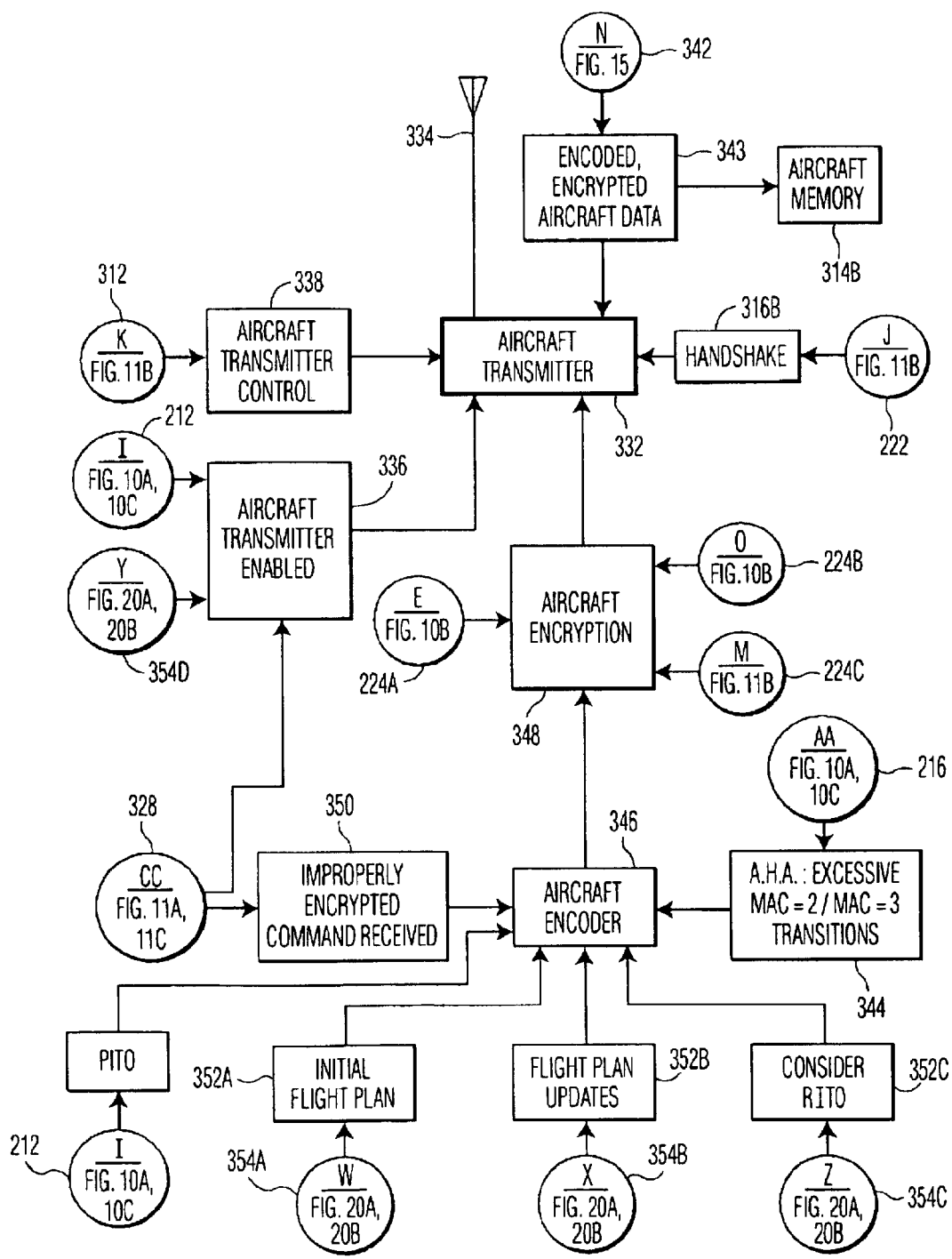
FIG. 12 is a block diagram of the controlled aircraft transmitter and its inputs.

As described in Section 6.1.1.1.1, one or more presses of push-buttons 225A by one or more designated individuals may be used to cause a verified PITO signal. A goodness of fit evaluation 227B may be used to determine how precisely the push-button routine was executed. If a single button press was required, there is no question about its proper execution. However, if multiple presses of one or more buttons are required, or if a specific timing of button presses is needed, the goodness of fit evaluation indicates how the button pressing performance compares to the ideal. This evaluation runs on microprocessor 230. Performance of the button pressing in a manner which meets the criteria of the goodness of fit algorithm results in (a) output along line 239 (which continues in FIG. 10C), and (b) signal 212, which activates the aircraft transmitter (FIG. 12).

Embodiments of the invention are possible in which one or more confirmation button presses is required. Embodiments of the invention are possible in which (a) a proper performance of the button presses results in outputs 212 and 239; (b) grossly improper performance of the button presses results in no outputs at 212 and 239; and (c) marginal, i.e. nearly correct performance of the button presses requires some other action to cause outputs at 212 and 239. This other action may include: (i) repeating the initial sequence of button presses, (ii) performing an entirely different sequence of button presses, or (iii) using one of the other inputting devices. Embodiments of the invention are possible in which similar signals are generated by transducing devices other than push-buttons, including slide switches, toggle switches, microswitches, touch sensitive screens, heat sensitive devices, charge-coupled devices and photocells, each of which is known in the art.

One or more microphones 225B may serve as the PITO input transducer(s). They would be used to detect a key spoken word or sequence of words. The word or words might have to be spoken by one or more persons, either simultaneously or at pre-arranged intervals. Audio processing equipment 225C as is known in the art would be used to amplify, filter, and digitize the signals from microphones 225B. Word and voice recognition programs 227A, as are known in the art, would provide outputs which indicate (a) how good the match is for each particular word, (b) how good the match is for the proper sequence and timing of words, and (c) how good the match is for the expected person's voice which speaks each word. These items of information concerning exactitude of audio fit, would be evaluated by goodness of fit evaluation 227B, as to overall acceptability, resulting in a yes/no decision.

Embodiments of the invention are possible in which one or more confirmation spoken words is required. Embodiments of the invention are possible in which a not-quite-correct audio input requires confirmation by either (a) a repeat, (b) the speaking of other words by either the same or by other persons, or (c) the use of another inputting device.

Embodiments of the invention in which the word and voice recognition software, and/or the goodness of fit software run on separate microprocessors from 230 are possible.

One or more keyboards, 225D may be used as the source of the PITO signal. The signal may consist of the inputting of one or more sequences of alphanumeric characters from one or more keyboards. The inputs may need to be simultaneous, sequential, or a mixture: e.g. word #1 may need to be inputted from Keyboard #1 simultaneous with the inputting of word #2 from Keyboard #2, after which word #3 may need to be inputted from Keyboard #1, after which word #4 may need to be inputted from Keyboard #2. In this case, the output signals from the keyboard(s) constitutes the PITO signals 226. The goodness of fit algorithm 227B evaluates the signals for accuracy of content and timing. Its output may utilize a yes/no format, or a yes/no/additional-confirmation-required format, as discussed previously. The additional confirmation may consist of alphanumeric input(s) or inputs from another modality. Alternatively, additional confirmation may be required even in the event of a correctly inputted sequence of characters.

Modalities other than push-button, audio and keyboard may be used as input devices. Video inputs could include an assessment of pilot action or of pilot identification, including imaging of the iris, retina or fingerprint(s). Detectors of smoke, fire or noxious vapor could also serve as an input.

Combinations of input modalities may also be utilized. For example, the PITO command could be issued when one designated person inputs a sequence of alphanumeric characters while another designated person at another location speaks a sequence of words.

6.2.1.3 State Setting Microprocessor Outputs

Referring again to FIG. 10A, the seven outputs of microprocessor 230 include four signals (210A–D) which serve as the state-setting inputs to the MAC, and three signals (PITO verification 212, pilot message 214 and anti-hunting algorithm signal 216) which indicate whether commands are reliable. These are:

(a) four signals 210A–D which serve as the state-setting inputs to the Master Aircraft Control 200 (shown in FIG. 13);

(b) PITO verification signal 212. In an embodiment of the invention, this signal may be generated after the PITO command has been verified (i.e. that (i) it is the voice of the pilot or designated person(s), or (ii) the proper sequence of buttons or alphanumeric keys has been pressed, etc.). The signal is used to enable the aircraft remote control transmitter (see discussion of FIG. 12, below).

(c) pilot message signal 214, indicating that a received command to Set the MAC equal to either 2, 3 or 4 was improperly encrypted. This might be an indication that (i) during a routine, non-remote controlled flight, an unauthorized person was attempting to take control of the flight; or (ii) during a remote controlled flight, an unauthorized person was attempting to interfere with the control by the terrestrial or airborne remote control center. The signal is used to notify the pilot.

(d) anti-hunting algorithm signal 216, from an algorithm, described above (in Section 6.1.1.2.1) and below (in Section 6.2.2.2.1.4). In a preferred embodiment of the invention, the algorithm (i) indicates the frequency of transitions (if any) between MAC State 2 and MAC State 3 and (ii) in the event of frequent transitions (which circumstance is presumed to indicate a poor communications link or an unauthorized person attempting to access the link) causes a transition to MAC State 3 until the aforementioned problem is overcome. Signal 216 is supplied to the aircraft remote control transmitter (hereinafter referred to as "aircraft transmitter") after proper processing (see discussion of FIG. 12, below).

6.2.2 State-Setting Flow Diagram

FIG. 10C shows the flow diagram whose logic determines the state-setting input to the Master Aircraft Control.

6.2.2.1 Sequence Which Results in MAC State 1.

Pre-flight encryption key loading, by any of the three previously discussed routes, results in the generation of a "SET MAC=1" command, indicated by box 236A. This command results in the MAC switching from its post-landing state, MAC State 4, to MAC State 1, in which takeoff is enabled.

The three ways in which pre-flight encryption key loading is indicated are:

(a) signal 224A, indicating a local or manually loaded pre-flight encryption key;

(b) signal 224B, indicating a pre-flight encryption key generated onboard the aircraft; and (c) signal 224C, indicating a pre-flight encryption key received via the aircraft receiver.

6.2.2.2 Sequences Which Result in MAC State 2 or MAC State 3

There are two ways that a "SET MAC=2" command may be generated. The first involves Pilot Initiated Takeover, or PITO. The second involves Remote Initiated Takeover, or RITO, in which the aircraft receiving a "SET MAC=2" command.

The are five ways in which a "SET MAC=3" command may be generated:

(a) an intentional "SET MAC=3" command, sent from the remote control center and verified;

(b) a RITO command which occurs in temporal proximity to handshake interruption (Handshake is discussed below in Section 6.2.2.2.1.2.);

(c) a PITO command which occurs in temporal proximity to handshake interruption;

(d) a PITO command which occurs in temporal proximity to a command encryption error; and (e) a pilot selection during ordinary, non-remote-controlled flight.

6.2.2.2.1 PITO

The PITO signal, intended to set the MAC to State 2, will do so if the following conditions are met:

(a) The PITO signal must be verified (Sections 6.2.1.2.1 and 6.2.2.2.1.1);

(b) A proper handshaking routine between the aircraft 100 and the RCC must be initiated and maintained (Section 6.2.2.2.1.2);

(c) Each later command (involving aircraft control) must be properly encrypted (Section 6.2.2.2.1.3); and (d) The reliability of the communications link must be confirmed (Section 6.2.2.2.1.4).

Performance failure during either of (b), (c) or (d), above, results in MAC State 3.

6.2.2.2.1.1 PITO Verification

PITO signals 226, are verified for correctness of source and content. Block 238 of FIG. 10C indicates the verification process which is performed by word and voice recognition programs 227A and goodness of fit evaluation 227B, and is discussed above in Section 6.2.1.2.1 and shown in FIG. 10D.

6.2.2.2.1.2 Handshaking Routine, Pentagon Nomenclature, Backup Autopilot in the Event of Handshake Interruption The following events occur after the PITO command has been verified.

(a) First, signal 212 is sent to the aircraft transmitter (FIG. 12) to enable its function.

Figure 11B:
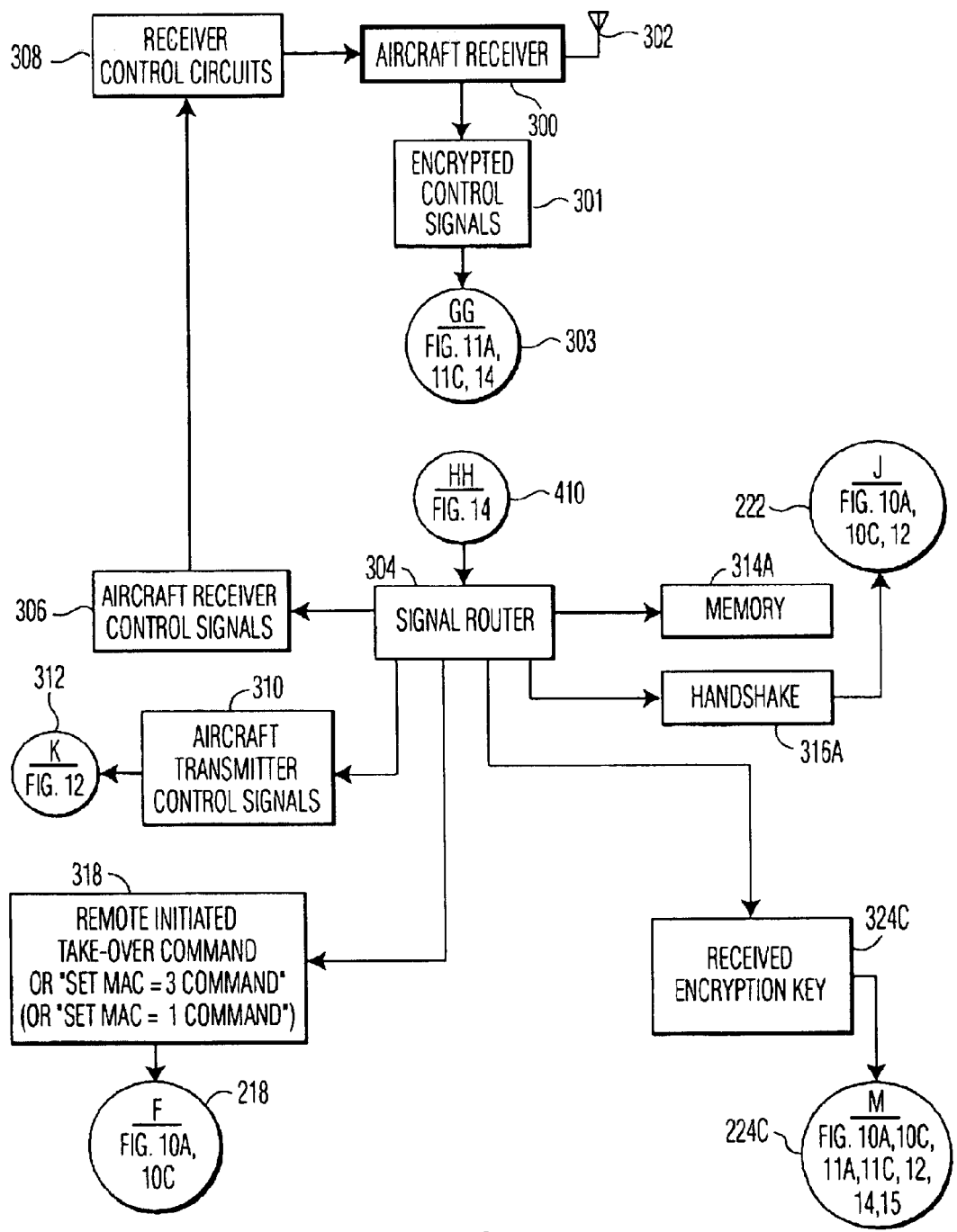
FIG. 11B is a block diagram of the controlled aircraft receiver and signal routing from the receiver.

(b) Next, a handshaking routine is initiated which involves the continuous confirmation that the aircraft transmitter signal has been received by the RCC receiver (FIG. 16) and that the RCC transmitter signal has been received by the aircraft receiver (FIG. 11B). The result is a source of repetitive handshake confirmation signals 222 supplied from the aircraft receiver (FIG. 11B) to microprocessor 230 (FIG. 10A), which continues as long as the handshaking routine between the remote control center and the controlled aircraft is uninterrupted.

(c) Pentagon 240 in FIG. 10C is a decision point. Pentagons have been used in FIGS. 10C, 11C, 16C, and 20B at decision points that involve the use of "outside information." They correspond to the statement: "After event α (corresponding to the upper middle vertex of the pentagon), go to path β (corresponding to the lower left vertex) if outside information of one type is present, but go to path γ (corresponding to the lower right vertex) if outside information of another type is present." The outside information which modulates the decision is symbolized by arrows pointing to the upper left and/or upper right vertices of the pentagon.

Thus pentagon 240, is interpreted as: After the PITO command is verified (line 239), if the aircraft-RCC handshake is intact, set MAC=2 (block 242); but if the handshake is not intact, set MAC=3 (block 244). This is how the autopilot (MAC=3) is selected as a backup during a possible break in communications between aircraft 100 and the remote control center. A break in communications would result in an interrupted handshake, which, at pentagon 240, would result in a selection of the autopilot.

The other three inputs to the top middle vertex of pentagon 240 are discussed below. Two of the three inputs provide a continuous repetition of the aforementioned handshake verification. The third input allows access to the handshake verification process in the event of RITO.

Returning to the discussion of pentagon 240, the outputs of pentagon 240, blocks 242 (labeled MAC=2) and 244 (labeled MAC=3) represent preliminary rather than final decisions about MAC=2 versus MAC=3. Two further assessments, discussed below in Sections 6.2.2.2.1.3 and 6.2.2.2.1.4 are required before the final decision between MAC=2 and MAC=3 is made.

6.2.2.2.1.3 Encryption Check, Repeat Cycling Through Handshake Check and Encryption Check, Backup Autopilot in the Event of Encryption Error In an advantageous embodiment of the invention, the third requirement for setting MAC=2 is that there is a proper encryption of the last command.

Therefore, after block 242 (indicating intact handshake), the assessment proceeds to pentagon 246, which assesses whether the last command was properly encrypted. The assessment is based on inputs 220A and 220B, from the aircraft receiver. The encryption assessment (shown in FIG. 11C) is based on the most updated version of the encryption key. Input 220A would indicate correct encryption and would result in an output from pentagon 246 to block 248A; Input 220B would indicate incorrect encryption and would result in output from pentagon 246 to block 244.

Since the first command in the activation sequence currently discussed is the already verified PITO command, it will, of necessity be properly encrypted. However, later commands involving control of the aircraft systems may or may not be properly encrypted. Thus, although the first assessment, after PITO, at pentagon 246 was trivial, later assessments are not.

Block 248A, reached when command encryption is proper, results in a short (e.g. one second) delay, after which two events occur: (a) the checking cycle begins again, with repeat performance of the handshake check (indicated by line 250 to pentagon 240), and information supporting the setting of MAC=2 is sent to anti-hunting algorithm 252, which is discussed in the next Section.

There are two inputs to block 244, the preliminary to setting MAC=3. The first, is the "NO" output of pentagon 240, indicating an interruption in or failure to establish the handshake. The second, is the "NO" output of pentagon 246, indicating improper encryption of the last command. Block 244 outputs to block 248B, which introduces a short (e.g. one second) delay after which two events occur: (a) the checking cycle begins again, with repeat performance of the handshake check (indicated by line 252 to pentagon 240), and information supporting the setting of MAC=3 is sent to anti-hunting algorithm 252.

6.2.2.2.1.4 Final Decision to "SET MAC=2" versus "SET MAC=3": The Anti-Hunting Algorithm The anti-hunting algorithm analyzes the outputs of blocks 248A and 248B, as the final step in the decision, MAC=2 versus MAC=3. If only block 248A is outputting, indicating that each handshake check reveals an intact handshake, and each encryption check reveals proper encryption, then the algorithm signals block 236B, resulting in signal output 210B to the Master Aircraft Control, resulting in MAC State 2. If, on the other hand, only block 248B is outputting, indicating either handshake problems, encryption problems, or a mixture of the two problems, then the algorithm signals block 236C, resulting in signal output 210C to the Master Aircraft Control, resulting in MAC State 3.

If there is a mixture of outputs from both blocks 248A and 248B, the anti-hunting algorithm allows for smoothing of the response. For example, the anti-hunting algorithm could be programmed to prevent momentarily switching to and from the autopilot if a communication problem between the terrestrial remote control center and the controlled aircraft results in the failure of one out of every twenty handshakes. In this circumstance, it would select MAC State 2. The algorithm could be programmed to deal with a high fraction (e.g. 50%) of handshake failures, by selecting MAC=3.

There are a limitless number of possible anti-hunting algorithms. Among the types of algorithm format are:

(a) a smoothing algorithm which involves:
  (i) looking at a moving "window" (e.g. the last 20 events) of the outputs of blocks 248A and 248B;
  (ii) assigning the value 1 to 248A events and 0 to 248B events, and averaging the last 20 events; and
  (iii) setting MAC=2 when the moving average exceeds a given value (e.g. 0.8) and otherwise setting MAC=3 (e.g. when the moving average is less than or equal to 0.8);

(b) a smoothing algorithm similar to that described in (a), above, but in which the most recent events receive greater arithmetic emphasis, in the calculation of the moving average;

(c) algorithms in which even a single input or a small number of inputs from block 248B results in a major bias to set MAC=3; e.g.,
  (i) an algorithm in which a single input or a small number of inputs from 248B sets MAC=3 until aircraft 100 is near an intercepting aircraft 114 or an airfield;

(ii) an algorithm in which a single input or a small number of inputs from 248B sets MAC=3 for a fixed period of time; and (iii) an algorithm in which a single input or a small number of inputs from 248B sets MAC=3 until a given (large) number of consecutive 248A outputs occurs.

Referring again to FIG. 10C, the anti-hunting algorithm output, besides causing SET MAC=2 and SET MAC=3 signals, also produces signal 216. Signal 216, supplied to the aircraft transmitter, provides information to the RCC about the status of the algorithm. Such information may include one or more of:

(i) the input to the algorithm, i.e. the series of 0's and 1's described in (a)(ii) above;

(ii) the moving average of the 0's and 1's of the algorithm described in (a)(iii) above; and (iii) the output of the algorithm, i.e. the series of SET MAC=2 and SET MAC=3 commands.

6.2.2.2.2 Remote Initiated MAC State Commands

A remote-initiated change of MAC State is initiated when an appropriately encoded and encrypted signal is sent from either a terrestrial or airborne remote control center. The signal is received by the aircraft receiver, FIG. 11B, and sent to microprocessor 230 as signal 218. The signal may call for setting MAC 200 to either MAC State 1, MAC State 2 or MAC State 3. The command to set the MAC to State 2, enabling remote control of the aircraft, is the RITO command.

6.2.2.2.2.1 RITO

A Remote Initiated Takeover, or RITO is initiated when an appropriately encoded and encrypted "SET MAC=2" signal is sent from either a terrestrial or airborne RCC. The signal is received by the aircraft receiver, FIG. 11B, and sent to microprocessor 230 as signal 218.

In flow diagram 10C, signal 218 leads to block 254, with two results: (a) signal 212 is sent, which enables the aircraft transmitter; and (b) pentagon 256 checks whether the RITO command was properly encrypted. As was the case with the aforementioned PITO command, signal 220A indicates that the RITO command is properly encrypted while signal 220B indicates that it is not.

If the command was not properly encrypted, it is assumed to be an indication of a possible attempt by an unauthorized person to assume control of the aircraft, and the pilot is therefore notified by output signal 214. If the command was properly encrypted, it is then routed appropriately, as indicated by block 258.

Block 258 directs the RITO command, "SET MAC=2," to pentagon 240 where the sequences of events in the above sections 6.2.2.2.1.2, 6.2.2.2.1.3 and 6.2.2.2.1.4 occur and then repeat, as was discussed.

6.2.2.2.2.2 Remote Commands to Set MAC=3 or MAC=1

There are certain situations where the personnel in the RCC may have occasion to set the Master Aircraft Control to a State other than 2.

If there are communications interruptions or problems, in which neither the anti-hunting algorithm nor the encryption verification system causes the MAC to enter State 3, or cause the MAC to enter State 3 intermittently, the RCC personnel may decide to induce a more prolonged entry to MAC State 3. Another indication for inducing MAC State 3 would be if the remote control center personnel become aware of attempts to interfere with or jam communications between the RCC and the aircraft.

The RCC personnel would accomplish this by sending a command to "SET MAC=3." The command would be initially routed along the same path as the aforementioned "SET MAC=2" command. It would leave the aircraft receiver as signal 218 and go to the microprocessor 230 (FIG. 10A), whose actions are depicted in the flow diagram of FIG. 10C. As indicated in FIG. 10, after passing block 254 and pentagon 256 (as long as there is appropriate command encryption), it would be routed by block 258 to block 236C, resulting in a "SET MAC=3" command being sent, as signal 210C, to MAC 200 (FIG. 13).

As mentioned above, there are occasions in which the RCC might elect to send a "SET MAC=1" command:

(a) if a terrorist or hijacking action was thwarted by the crew of the aircraft;

(b) if what was believed to be an appropriate RITO situation, in which a RITO command was executed, turned out not to be such a situation;

(c) if what was believed to be an appropriate PITO situation, in which a PITO command was executed, turned out not to be such a situation (Note that a PITO command can not be rescinded from aboard the aircraft.);

(d) during any short period of time when the judgment and flying skills of an on-board pilot might exceed those of remote control center personnel; and (e) if the autopilot was known to be malfunctioning, and either (i) communications between the RCC were intermittent or inadequate, or (ii) there was attempted interference with communication by an unauthorized person.

The RCC personnel would accomplish this by sending a command to "SET MAC=1." The command would be initially routed along the same path as the aforementioned "SET MAC=2" command. It would leave the aircraft receiver as signal 218 and go to the microprocessor 230 (FIG. 10A), whose actions are depicted in the flow diagram of FIG. 10C. As indicated in FIG. 10, after passing block 254 and pentagon 256 (as long as there is appropriate command encryption), it would be routed by block 258, to circle 260, to block 236A, resulting in a "SET MAC=1" command being sent, as signal 210A, to MAC 200 (FIG. 13).

A discussion of an alternate embodiment of the invention in which a SET MAC=1 command can not occur, and yet another alternate embodiment in which it can occur automatically appears below in Section 6.2.2.2.3(e) and (f).

6.2.2.2.3 Alternate Possible Flow Diagrams

The methodology described in Section 6.2.2 and its subsections reflects a number of arbitrary inclusions and exclusions of certain design features. There are also some possible variations in the conditions under which MAC State transitions may occur (i) by command from the RCC, (ii) automatically, and (iii) by command of the pilot. Operating versions of the invention might include any one or more of the following variations, as well as others:

(a) omitting the anti-hunting algorithm entirely;

(b) "relocation" of the anti-hunting algorithm so that its inputs are blocks 242 and 244, i.e. so that it smooths only handshake related fluctuations, and not fluctuations related to proper command encryption;

(c) having two different anti-hunting algorithms (with different degrees of error toleration), one that deals with handshake fluctuations and one that deals with encryption failures;

(d) omitting encryption confirmation entirely;

(e) changing the rules for allowable remote-control-center-induced transitions among MAC states. For example, FIG. 10C shows the possibility of a remote control center induced transition from MAC State 2 to MAC State 1. However, in an alternative embodiment of the invention, it would be possible to forbid such a transition; and (f) changing the conditions which automatically cause transitions among MAC states. For example:
  (i) referring to the MAC State 2 to MAC State 1 transition discussed in (e) immediately above, another alternative embodiment of the invention would be one in which this transition occurs automatically (i.e. caused by logic carried out by microprocessor 230, rather than being caused by the RCC) in the event of failure of both RCC communications and the autopilot; and
  (ii) referring to the situation discussed in (i), immediately above, if after the transition from MAC State 2 to MAC State 1, the function of the autopilot is restored but the communication system is not restored, MAC State 3 may be entered automatically.

6.2.2.3 MAC State 4

Referring again to FIG. 10C, landing sensor signal 228 triggers the issuance of a post landing command. This results in the issuance of a SET MAC=4 command at block 236D, which is sent as signal 210D to the Master Aircraft Control 200. Thereafter, the aircraft cannot take off until a new encryption key or keys is loaded, at which time MAC State 1 is re-entered.

A mechanism to allow either remote- or pilot-induced transition to MAC State 4 is not shown in FIG. 10C. Since MAC State 4 curtails fuel flow to the engines, allowing such a transition to be induced by anything but an actual landing places the aircraft in potential jeopardy of receiving an inappropriate SET MAC=4 command during flight.

6.3 Controlled Aircraft Receiver and Decoder

The aircraft communications equipment includes the receiver and its associated decryption and decoding circuitry, and the transmitter and its associated encryption and encoding circuitry. The receiver and its associated components is discussed first.

6.3.1 Aircraft Receiver

The functions of the aircraft receiver and its associated components include:

(a) receiving, decrypting and decoding control signals from the RCC and distributing them to the appropriate destination, (b) participating in a handshaking process involving the aircraft transmitter and the RCC receiver and transmitter, and (c) assessing the correctness of the encryption format for incoming commands.

As shown in FIG. 11B, incoming signals through antenna 302 reach receiver 300. There may be one or more antenna (e) for various types of signals. After appropriate signal demodulation and processing by means that are known in the art, encrypted control signals reach block 301. The signals 303 are distributed to two locations: (a) decryption and decoding circuits, shown in FIG. 14, and (b) an encryption assessment procedure, which runs on microprocessor 330 (FIG. 11A) and whose logic is indicated by the flow diagram of FIG. 11C.

6.3.1.1 Decryption and Decoding of Signals Received by the Aircraft

As per the discussion in Section 2.1, "encryption key" is used, hereinabove and hereinbelow, interchangeably with "decryption key." On the other hand, the isolated words such as "encrypted" and "decryption" retain their more narrow definitions as the opposites of "decrypted" and "encryption," respectively.

Figure 14:
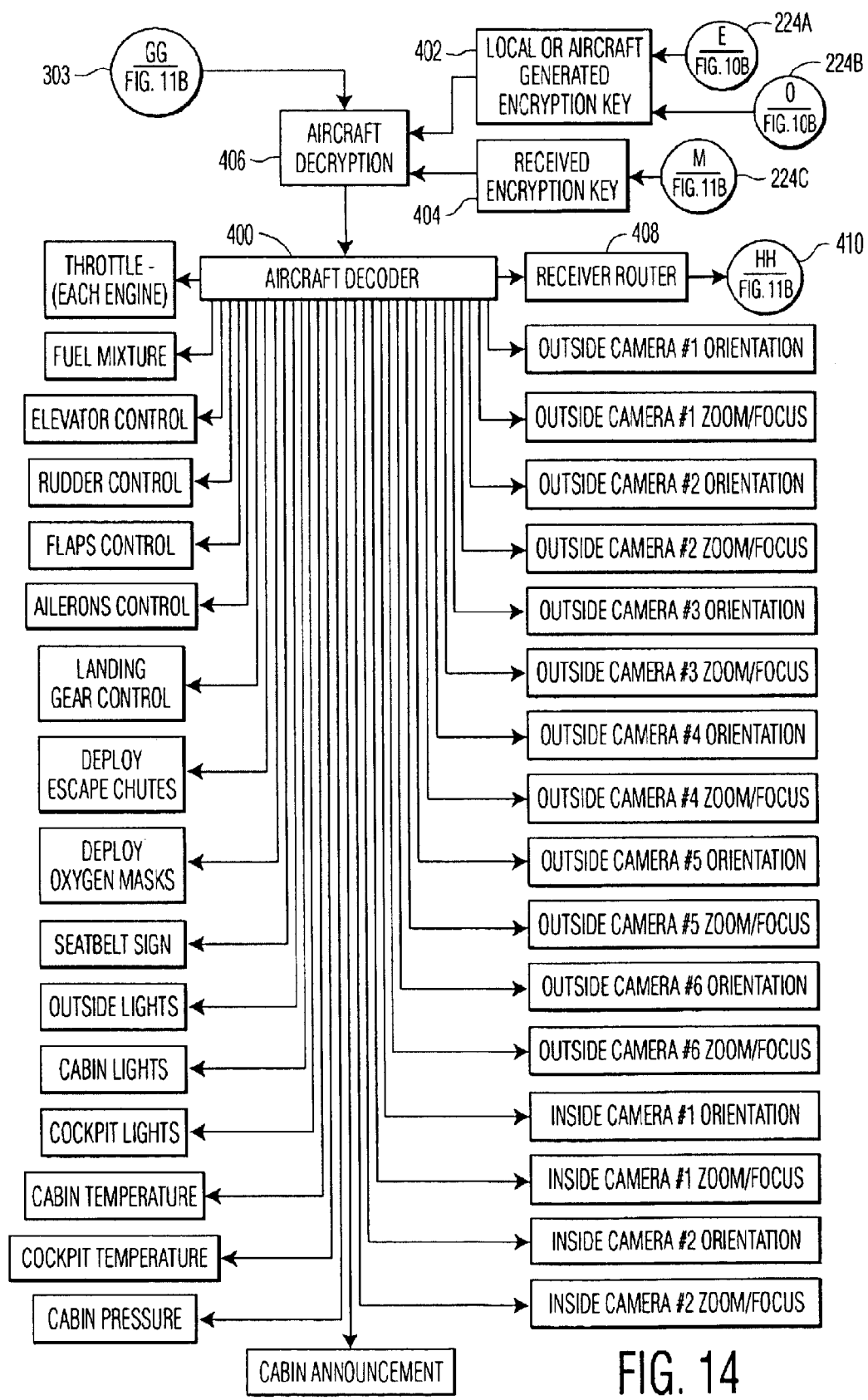
FIG. 14 is a block diagram of decryption and decoding aboard the controlled aircraft.

FIG. 14 shows encrypted control signals 303, from the aircraft receiver, undergoing decryption at block 406. The decryption key (hereinafter referred to as encryption key) is obtained from one of three sources, as previously discussed:

(a) from a locally or manually loaded key reading device 232 (FIG. 10B) which sends the encryption key as signals 224A to block 402, which supplies the necessary encryption key to decryption device 406;

(b) from an aircraft-based encryption key generator 234 (FIG. 10B) which sends the key as signals 224B to block 402, which supplies the necessary encryption key to decryption device 406; and (c) from the aircraft receiver (further discussed below) as signals 224C to block 404, which supplies the necessary encryption key to decryption device 406. In this situation, an initial encryption key must be supplied from a source other than signals 224C from the aircraft receiver, i.e. either from reading device 232 or from on-board generator 234, since the receiver must have a first encryption key before it can decrypt any signals obtained by its receiver—including those which contain an encryption key. Two alternatives are these: (a) using the encryption key from the previous flight of the aircraft, until the new encryption key is loaded via the aircraft receiver, or (b) the non-secure approach of receiving the initial encryption key via the aircraft receiver in a non-encrypted format.

The decrypted signals are supplied to decoder 400, which converts the coded signals to aircraft control signals, each with a particular destination and command.

One class of commands includes those used to control and maneuver the aircraft. These include commands which control the throttle for each engine, the fuel mixture, the elevator, the rudder, the flaps, the ailerons and the landing gear. The commands contain information which allows precise control of and small changes in each of the controlled items. This allows a "pilot" in the remote control center to fly the aircraft and to maintain control that is as precise as it would be for an on-board pilot. (The information made available to this RCC pilot, and used to fly the aircraft, is discussed below.) These commands, and the ones discussed below are denoted in FIG. 14 by the large group of un-numbered blocks emanating from the aircraft decoder 400.

Another class of commands controls interior aspects of the aircraft, e.g. the cabin and cockpit lights and temperature, and cabin pressure.

Each block may refer to the control of more than one parameter. For example, the block labeled "deploy oxygen masks" allows control of mask deployment, control of the percentage of oxygen in the supplied gas mixture, and the flow rate of the mixture.

The blocks on the right side of FIG. 14 refer to the RCC pilot having the ability to control a series of cameras inside and outside of the aircraft. The blocks for camera orientation allow for pointing the camera so that it spans a multi-dimensional viewing area. The blocks for camera zoom/focus may also allow for the control of other camera parameters such as contrast, brightness, frame rate, image stabilization and other parameters as are known in the art. In the figure, the six outside cameras point forward, to the rear, right, left, up and down. The two inside cameras are for the cockpit and the cabin. Embodiments of the invention with other camera configurations are possible.

Embodiments of the invention with a larger or a smaller number of controlled items are possible, as long as it is possible for the RCC pilot to control the aircraft.

Another class of commands is related to control of communications between the remote control center and the aircraft. These commands are sent from the decoder 400 to receiver router block 408, and then as signals 410 to the signal router 304 of FIG. 11B.

6.3.1.2 Aircraft Signal Router Output

Referring, now, to FIG. 11B, signal router 304 distributes six groups of signals:

(a) aircraft receiver control signals,
(b) aircraft transmitter control signals,
(c) signals to be stored in memory,
(d) handshake signals,
(e) commands to change the MAC State, and
(f) one or more encryption keys obtained via the aircraft receiver.

6.3.1.2.1 Aircraft Receiver Control Signals

The aircraft receiver control signals 306, via receiver control circuits 308, select or modify features and parameters of the aircraft receiver. These may control the frequency or frequencies that the receiver is tuned to, the choice of receiver antenna and orientation of the antenna, the type of demodulation that occurs in the receiver, the gain and filtering at various points within the receiver, and other receiver parameters.

Changing frequency and modulation within the course of a flight allow further means of encryption. For example, the RCC could send an encrypted command causing the aircraft receiver to switch to a specified frequency at a specified instant. Alternatively, a timed series of frequency or other parameter changes could be loaded along with or as part of the initial or any follow-up encryption key.

Receiver control circuits also allow for RCC-based adjustments in the aircraft receiver, in the event of a failed handshake (see below), or in the event that RCC becomes aware that the RCC-to-aircraft communications link is suboptimal. Receiver control circuits 308 may also allow the selection of one or more antennae, from a larger number of available choices.

More robust communication systems, ideal for maintaining the most reliable remote controlled flight, will have one or more backup receivers, in the event the primary receiver fails. Such additional receivers may be maintained in a standby mode or may be in a fully operational mode at all times, working in parallel to the primary receiver. In such an event, the output of each receiver would flow to block 301 which would "consolidate" the respective outputs into a single group of encrypted control signals. Each receiver would have its own control circuits (analogous to block 308), controlled by individual sets of not-necessarily-identical receiver control signals flowing from block 306.

6.3.1.2.2 Aircraft Transmitter Control Signals

The aircraft transmitter control signals 312 emerge from block 310 and are supplied to aircraft transmitter control unit 338 (FIG. 12, see below). These signals control aircraft transmitter parameters such as frequency, choice of antenna, antenna orientation, power output, modulation, and gain and filtering at various points within the transmitter circuits.

Changing the transmitter frequency and/or its modulation within the course of a flight allow further means of encryption. For example, the RCC could send an encrypted command causing the aircraft transmitter to switch to a specified frequency at a specified instant. Alternatively, a timed series of frequency or other parameter changes could be loaded along with or as part of the initial or any follow-up encryption key.

Transmitter control circuits also allow for RCC-based adjustments in the aircraft transmitter, in the event of a failed handshake (see below), or in the event that RCC becomes aware that the aircraft-to-RCC communications link is suboptimal.

Transmitter control circuits 338 may also allow the selection of one or more antennae, from a larger number of available choices.

6.3.1.2.3 Aircraft Memory

Signals from the signal router 304 to memory 314A may include a record of all received signals, or only a selected subset of signals. (The aircraft transmitter memory, 314B, is discussed below.)

6.3.1.2.4 Handshake Signals

The purpose of the handshake signals is to allow both the aircraft and the RCC to become aware of a break in the communication between them immediately. In the case of the aircraft, the logic shown in FIG. 10C is such that a break in the handshake results in a switch to the autopilot. In the case of RCC, the break in handshake can be used to notify RCC personnel of the need to seek immediate communications alternatives.

The handshake block 316A and signals 222 of FIG. 11B are part of a circuit that includes, in the following sequence:

(a) aircraft transmitter handshake block 316B, FIG. 12;
(b) aircraft transmitter 332 and antenna 334, FIG. 12;
(c) RCC antenna 502 and receiver 500, FIG. 16B;
(d) encrypted RCC signal block 501 and signals 503, FIG. 16B;
(e) RCC decryption 606 and RCC decoder 600, FIG. 18
(f) RCC receiver router 608 and signals 610, FIG. 18;
(g) RCC signal router 504, RCC receiver handshake block 516A, and signals 517;
(h) RCC transmitter handshake block 516B, FIG. 17;
(i) RCC transmitter 556 and antenna 558, FIG. 17;
(j) aircraft antenna 302 and receiver 300, FIG. 11B;
(k) encrypted aircraft signal block 301 and signals 303, FIG. 11B;
(l) aircraft decryption 406 and decoder 400; FIG. 14;
(m) aircraft receiver router 408 and signals 410, FIG. 14; and
(n) aircraft signal router 304, following which the handshake "returns" to aircraft receiver handshake block 316A and the cycle repeats.

As mentioned previously, the handshake process is continuously monitored. Handshake signals 222 from the aircraft receiver, FIG. 11B, are also sent to microprocessor 230 (FIG. 10A) which runs the logic shown in FIG. 10C. This logic includes pentagon 240 which shows the monitoring of whether the handshake is intact. As shown in FIG. 10C, a break in the handshake initiates the process by which a "SET MAC=3" command 210C is sent to Master Aircraft Control 200 (FIG. 13).

6.3.1.2.4.1 Handshaking Routine with Communication Interruption Signal

The occurrence of a break in the handshake sequence of signals may be detected by an interruption in the otherwise continuous repetition of signal 222. However, more sophisticated handshake assessment approaches may be used. For example, if a handshake signal does not arrive at the expected time at aircraft receiver handshake block 316A, a "RCC HANDSHAKE NOT RECEIVED BY AIRCRAFT" signal may be sent from 316A to aircraft transmitter handshake block 316B. Such a signal is more informative to the RCC than either (a) not having the aircraft send a handshake signal (which then leaves the RCC uncertain about whether the break in communication was from RCC to aircraft or from aircraft to RCC) or (b) having the aircraft continue to send the same handshake signal that it sends when communication is intact (which would leave the RCC uninformed that any break had occurred).

Receipt of such a signal by the RCC would, therefore, indicate a break in communications in the RCC-to-aircraft component of the communications loop. Upon receipt of a "RCC HANDSHAKE NOT RECEIVED BY AIRCRAFT" signal at the RCC, RCC options would therefore include one or more of the following:

(a) increasing the power of the RCC transmission;
(b) reassessing and, if necessary, readjusting the orientation of the RCC antennae, or changing to a different antenna(e);
(c) increasing the transmission power of or adjusting the antennae of any repeater units (either satellite or terrestrial) which relay RCC transmissions to the aircraft;
(d) changing the route from RCC to aircraft (e.g. using geographically different repeater units, or switching from a satellite-based repeater unit to a terrestrial one;
(e) dispatching an airborne unit to serve as either the RCC (FIGS. 9A and 9B) or as a repeater unit (FIGS. 9C and 9D);
(f) changing the frequency of the transmission from the RCC and, if necessary, sending a signal to the controlled aircraft indicating the frequency shift (This may not be necessary, since the aircraft receivers may be "listening" to a number of frequencies simultaneously; the frequency change may involve one or more of the links from the RCC to the aircraft.);
(g) changing the modulation of the transmitted signal and sending a signal to change the demodulation at the receiving end; and
(h) sending a signal or signals to the aircraft so as to (i) increase aircraft receiver sensitivity, (ii) change filtering or other receiver parameters, (iii) change receiver antenna or antennae orientation, or (iv) change receivers. (These could only be effective after momentary re-establishment of the RCC-to-aircraft component of communications.)

Again referring to the handshaking system which uses the "RCC HANDSHAKE NOT RECEIVED BY AIRCRAFT" signal: In the event of an interruption in the handshake signals received at the RCC, i.e. a complete absence of a handshake signals, it suggests that the break in communications is in the aircraft-to-RCC component. Although this absence of handshake signal at the RCC does not rule out a two-way communication failure, simultaneous loss of both communication components is less likely than the loss of just the aircraft to RCC component. It therefore is reasonable to direct remedies at curing this fault. Such remedies include:

(a) sending an RCC signal to the aircraft to increase aircraft transmitter power;
(b) readjusting the orientation of the aircraft or the RCC antenna or changing to a different antenna at either end;
(c) increasing the transmission power of or adjusting the antennae of any repeater units (either satellite or terrestrial) which relay aircraft transmissions to the RCC;
(d) changing the route from aircraft to RCC (e.g. using geographically different repeater units, or switching from a satellite-based repeater unit to a terrestrial one);
(e) dispatching an airborne unit to serve as either the RCC or as a repeater unit;
(f) changing the frequency of the transmission from the aircraft. Alternatively, the frequency change may involve one or more of the links from the aircraft to the RCC;
(g) changing the modulation of the signal transmitted by the aircraft;
(h) changing aircraft transmitter; and
(i) adjusting RCC receiver parameters including (i) increasing receiver sensitivity, (ii) changing receiver filtering or other selectivity or noise rejection parameters.

If remedies which address an inoperative aircraft-to-RCC component fail to cure the problem, the possibility of a two-way loss is increased and remedies which address an inoperative RCC-to-aircraft component of the handshake, discussed previously, may be attempted. Alternatively, in this situation, it would be possible to simultaneously address a potential break in each of the communication components, e.g. by simultaneously increasing the transmitted RCC signal strength and increasing the RCC receiver sensitivity.

6.3.1.2.4.2 Handshaking Routines of Still Greater Complexity

Handshaking systems of greater complexity are possible. For example, upon failing to receive an RCC handshake signal, the aircraft system could be set up to start changing some of the aircraft receiver parameters. Care must be taken to avoid a situation in which aircraft based (automatic) efforts do not nullify RCC efforts. Two ways to avoid such nullification are: (a) restricting aircraft changes to parameters which are unlikely to nullify RCC efforts, and (b) having a previously agreed upon sequence of timed changes, so that, for example, as the RCC transmitter changes frequency, the aircraft receiver would switch to an identical one. The aforementioned previous agreed upon sequence could be contained in the encryption key and on one or more of the follow-up encryption keys.

Another complex handshaking feature would be the execution of a distinct handshake between each component of a multi-link repeater network, rather than having a single handshake involving only the end units. Troubleshooting between adjacent repeater units could be automatic, with a format similar to that discussed for the aircraft-RCC pair. Additional assessment of the failed link could be made from either the aircraft or the RCC end of the communication chain.

6.3.1.2.5 Commands to Change the MAC State

The Remote Initiated Takeover Command (RITO) and other commands sent from a remote control center to the aircraft to change MAC State, e.g. "SET MAC=3," or "SET MAC=1" flow from signal router 304 (FIG. 11B) through block 318 and, as signal 218, are sent to the microprocessor 230 (FIG. 10A), which, under appropriate conditions, signals MAC 200 (FIG. 13), thereby executing a change of MAC state. The conditions for the execution of the change in MAC state, are shown schematically in FIG. 10C and discussed above. These conditions include the proper encryption of the command, which is discussed below in the context of FIGS. 11A and 11C.

6.3.1.2.6 One or More Encryption Keys Obtained via the Aircraft Receiver.

As indicated above, one of three ways in which an encryption key is loaded onto the aircraft is through the aircraft receiver. As discussed in Section 6.3.1.1, certain conditions must be considered if the first encryption key of a flight is loaded via the aircraft receiver.

Figure 11C:
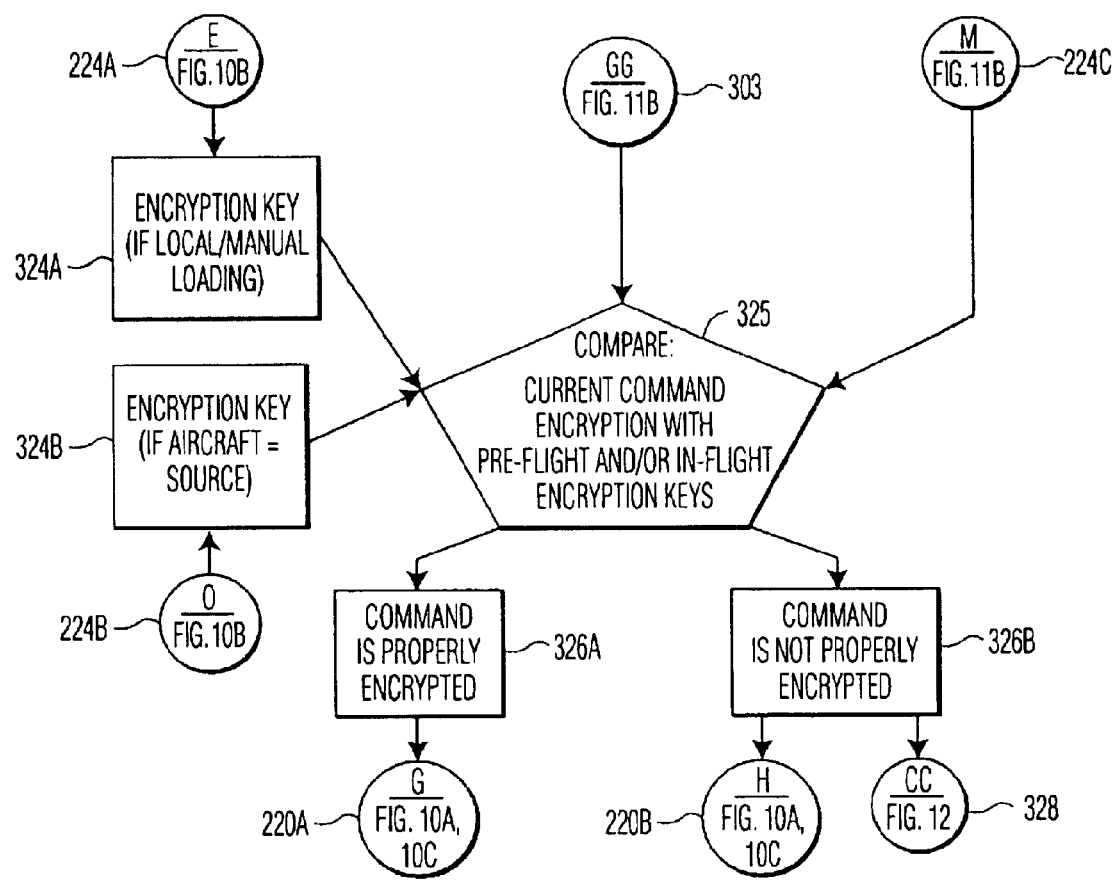
FIG. 11C is a flow diagram showing the method of encryption assessment for incoming commands to the controlled aircraft as carried out by the microprocessor of FIG. 11A.
Figure 15:
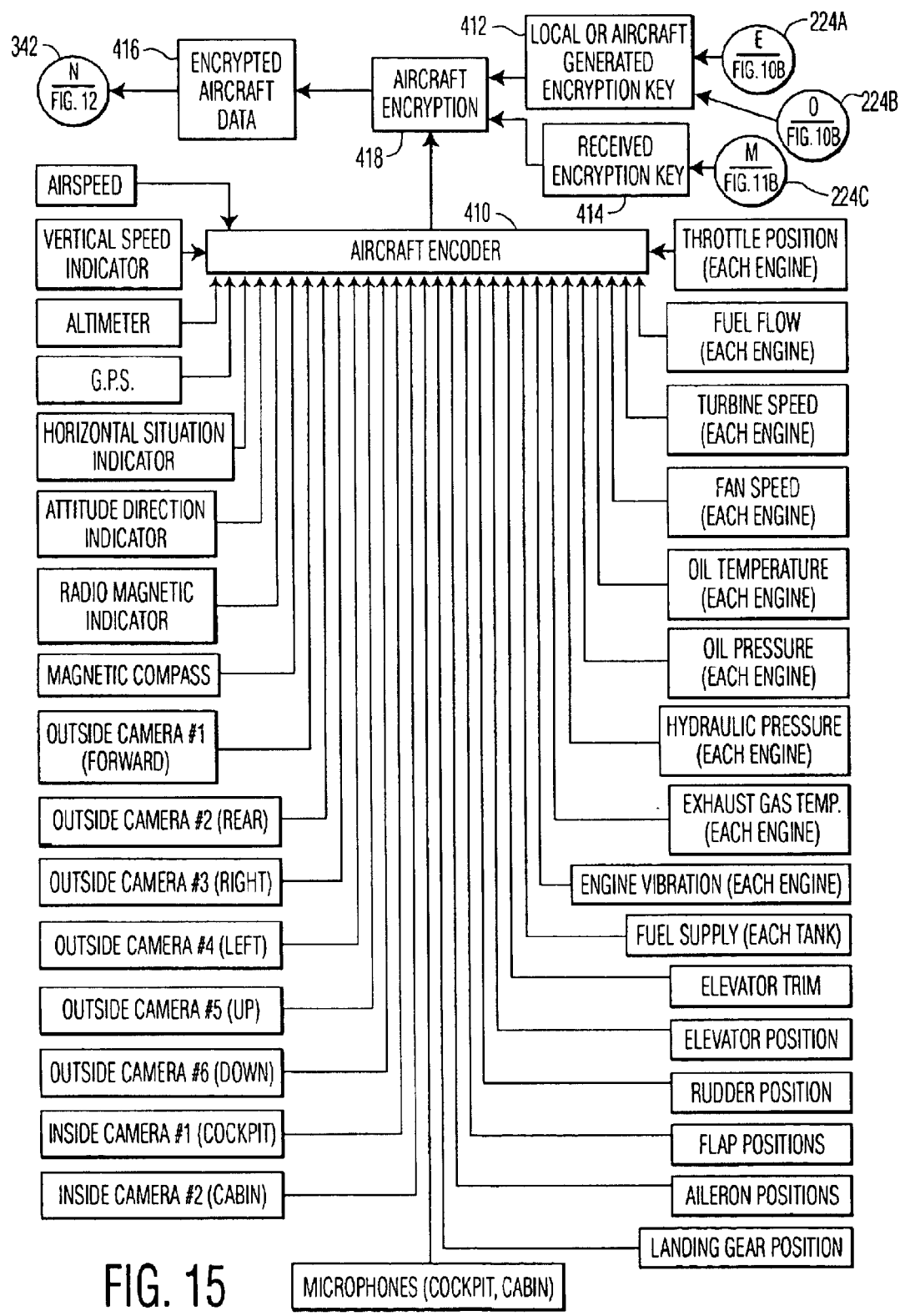
FIG. 15 is a block diagram of encryption and encoding aboard the controlled aircraft.

The received encryption key flows from signal router 304 to block 324C from where it is made available as signals 224C to:

(a) microprocessor 230 (FIG. 10A) and the MAC state-setting logic which runs on it (FIG. 10C);

(b) microprocessor 330 (FIG. 11A) and the command encryption assessment logic which runs on it (FIG. 11C);

(c) the aircraft transmitter (FIG. 12);

(d) the aircraft decryption and decoding circuits (FIG. 14); and (e) the aircraft encryption and encoding circuits (FIG. 15).

6.3.1.3 Aircraft Receiver Command Encryption Assessment

As a means of further protecting the aircraft against control by an unauthorized person, each command that it receives is "inspected" for proper encryption formatting. The flow diagram which shows the logic for this assessment is shown in FIG. 11C. The microprocessor on which it runs is shown in FIG. 11A.

The aforementioned pentagon symbol, used previously in FIG. 10C (see Section 6.2.2.2.1.2), is the format for the current assessment. Pentagon 325 of FIG. 11C makes the statement: "Using the information supplied by the encryption key(s), if the command 303 under assessment is encrypted properly, go to block 326A; but go to block 326B if the command is not properly encrypted."

Each encrypted command 303 (coming from the aircraft receiver in FIG. 11B) is sampled as described immediately above. The standard for proper command formatting is supplied by the encryption key or keys from any of the three previously discussed sources:

(a) the reading device for local or manually loaded keys 232 (FIG. 10B) whose information 224A is supplied to pentagon 325 via block 324A;

(b) the aircraft-based encryption key generator 234 (FIG. 10B) whose information 224B is supplied to pentagon 325 via block 324B; and (c) the aircraft receiver, via signal router 304 (FIG. 11B) whose information 224C is supplied to pentagon 325 via block 324C (of FIG. 11B).

A properly encrypted command leads to block 326A and signal 220A. This indicator of proper encryption format is used as an input to two pentagons in the flow diagram 10C, which determine (a) whether an RCC-based command to change MAC state (including the Remote Initiated Takeover Command) is to be accepted (pentagon 256), and (b) once the control of a flight has been taken away from the aircraft pilot, whether the ongoing stream of commands is encrypted well enough to maintain MAC State 2 with RCC control of the flight (pentagon 246). Proper encryption signal 220A results in (a) acceptance of a RCC command to change MAC state (pentagon 256), and (b) in a bias to MAC State 2 (pentagon 246).

An improperly encrypted command leads to block 326B and signal 220B. Improper encryption signal 220B results (a) in rejection of a RCC command to change MAC state, and a pilot notification signal (pentagon 256), and (b) in a bias to MAC State 3 (pentagon 246). Block 326B also causes signal 328 to (a) enable the aircraft transmitter (if it is not already enabled) and (b) transmit an "IMPROPERLY ENCRYPTED COMMAND RECEIVED" message (FIG. 12) after encoding (block 346) and encryption (block 348). The signal is received by the RCC (signal 536, FIGS. 16A, 16B and 16C) with one of two results:

(a) If the aircraft is then controlled by the aircraft pilot, the improper command is considered to indicate the possibility of an attempt by an unauthorized person to begin remote control of the aircraft. The system sends a message which would likely appear on a screen or be spoken) to Air Traffic Control, and/or the RCC personnel to notify the aircraft pilot and security personnel. In one embodiment of the invention, the RCC personnel would have the option of setting MAC=1 for a prolonged period of time, until the source of the inappropriate command could be investigated.

(b) If the aircraft is then controlled by the RCC pilot, the improper command is considered to indicate the possibility of an attempt by an unauthorized person to take control of the aircraft away from the RCC. The system would then send a message to the RCC personnel to consider transmitting a "SET MAC=3" command (autopilot control of the aircraft), in order to secure the control of the aircraft. To prevent competition between (i) an unauthorized person trying to gain access to the remote control function, and (ii) the RCC, the system would, in one embodiment of the invention allow the RCC to set MAC=3 for a prolonged period of time. Once the "SET MAC=3" command is accepted, the aircraft logic could lock out any subsequent commands until either:

(i) a fixed period of time goes by (during which the source and nature of the unauthorized signal may be investigated);

(ii) an interceptor aircraft could be scrambled, which would allow control of aircraft 100 from a very short distance (as in FIG. 9A). This would allow the use of very low gain amplification in the aircraft receiver and very highly directional means for communication between the interceptor aircraft and the controlled aircraft, both of which would increase the likelihood of rejection of signals originating far from the aircraft; or (iii) further communication security measures are taken including additional or alternate encryption means, and/or changes in one or more parameters of the communication format.

The assessment of proper encryption format could include one or more of:

(a) checking that the command length is the proper number of characters;

(b) determining if certain mathematical operations using one or more characters within a command (e.g. a checksum) yields the correct results;

(c) determining if certain obligate alphanumeric patterns appear within the commands;

(d) determining if the time interval between characters fits the expected format; and (e) other encryption verification procedures as are known in the art.

The encryption evaluation as shown in FIG. 11C and discussed above is performed by the microprocessor 330 shown in FIG. 11A. The microprocessor may be one of many types that is known in the art. Its inputs include signals 224A, 224B and 224C from each of the three possible encryption key sources, and signals 303, the encrypted commands to be assessed for proper formatting. Its outputs include signals 220A (correct encryption) and 220B (incorrect encryption), which are inputs to the MAC state-setting microprocessor 230 (FIG. 10A) and signal 328 which causes the aircraft transmitter to send a signal indicating the detection of an improperly encrypted command aboard aircraft 100.

6.4 Controlled Aircraft Encoder and Transmitter

In order for a remote pilot to properly control aircraft 100, all or as much as possible of the information available to the aircraft pilot must be made available to the remote pilot.

FIG. 15 illustrates some of the most important aircraft data to be sent, and the means for encoding and encrypting the information. The information to be sent includes:

(a) detailed information about the position and velocity of the aircraft, including G.P.S. information, altimeter reading, airspeed, vertical speed, and information about the orientation of the aircraft;

(b) video information from each of the previously discussed inside and outside cameras;

(c) information about each of the aircraft engines, including, for example, throttle position, fuel flow, turbine speed, fan speed, oil temperature and oil pressure;

(d) the amount of fuel remaining in each tank;

(e) the actual positions of key controlling elements including the elevator, the rudder, the flaps, the ailerons and the landing gear; and (f) audio information from within the cabin and the cockpit.

With the exception, perhaps, of the video information, this information is available on existing commercial aircraft and supplied on a continuous basis to the aircraft flight recorder.

The signals representing each of the aforementioned are encoded by aircraft encoder 410. The encoded signals are then encrypted by encrypting unit 418. Block 418 has inputs from both the encoder and each of the possible aforementioned encryption key sources. The manual/local loading, and the aircraft-generated sources, both shown in FIG. 10B, provide inputs 224A and 224B to block 412, which inputs the encryption key to encrypting unit 418. An encryption key received via the aircraft receiver provides input 224C to block 414, which also inputs encrypting unit 418. The output of the encrypting unit, encrypted aircraft data 416 is sent as signals 342, via block 343 which supplies the aircraft memory 314B with transmitted information, to the aircraft transmitter 332, as shown in FIG. 12.

An additional group of six inputs destined for the aircraft transmitter and related to MAC State decisions, are shown in the lower portion of FIG. 12 and include:

(a) PITO signal 212;

(b) signal 328, indicating that an improperly encrypted command was received by the aircraft (discussed above in Section 6.3.1.3);

(c) signal 216, from the anti-hunting algorithm of FIG. 10C, indicating an excessive frequency of transitions between MAC State 2 and MAC State 3; and (d) three signals 354A, 354B and 354C from an algorithm which seeks to detect unauthorized aircraft takeover by the detection of a significant deviation from either (i) the expected aircraft position based on the initially filed flight plan, or (ii) the flight plan itself (see discussion of FIGS. 20A and 20B below)

These six signals flow to a second aircraft encoder which is identical in function to (and may be a part of) encoder 410. The signals are encrypted, in a manner identical to the aircraft data signals of FIG. 15, by encryption unit 348 which is identical in function to (and may be a part of) encryption unit 418. The three sources of encryption information—key reading device 232, key generator 234 and received key source 324C, generate signals 224A, 224B and 224C, respectively—also provides input to encryption unit 348.

Signals 224A and 224B entering encryption unit 348 can also serve to disseminate either the manually loaded encryption key or the aircraft generated key. They may also be used to generate a sequence of nested encryption keys, as discussed above in Section 3.2.1 and below in Section 6.6.

The output of encryption unit 348, encrypted signals related either directly or indirectly to MAC state transitions, or consisting of encryption key(s) goes to the aircraft transmitter 332.

Three other inputs to the transmitter include:

(a) handshake signals 222, via block 316B, from the previous point in the handshake cycle, the aircraft receiver;

(b) aircraft transmitter control signals 312, via block 338, coming from the aircraft receiver; and (c) three sources of signals which converge on block 336 and enable the aircraft transmitter:

(i) signal 212, from the state-setting microprocessor 230, indicating either PITO or RITO;

(ii) signal 354D, from microprocessor 730 (see below), indicating aircraft deviation from expected position or flight plan; and (iii) signal 328, from microprocessor 330, indicating the aircraft receipt of an improperly encrypted command.

Aircraft transmitter 332 outputs to one or more antenna(e) 334.

The possible addition of backup transmitters, render the communications system more robust. (A similar role for backup receivers was discussed above in Section 6.3.1.2.1.) Such additional transmitters would most likely be maintained in a standby mode, since multiple simultaneously operating transmitters makes signal detection by an unauthorized person easier. Each transmitter would have its own control circuits (analogous to block 338), controlled by individual sets of not-necessarily-identical transmitter control signals flowing from block 310. The inputs to transmitter 332 shown in FIG. 12 would be distributed in parallel to each transmitter. The transmitters may share one or more antennae, or may each have their own antenna(e).

6.5 Remote Control Center Receiver and Decoder

The RCC communications equipment includes the receiver and its associated decryption and decoding circuitry, and the transmitter and its associated encryption and encoding circuitry. The receiver and its associated components is discussed first. Many of the items and concepts in this section parallel items and concepts in Section 6.3, the "Aircraft Receiver and Decoder." Where appropriate, the parallel is indicated and the discussion is shortened.

6.5.1 Remote Control Center Receiver

The functions of the RCC receiver and its associated components include:

(a) receiving, decrypting and decoding data signals from the controlled aircraft and distributing them to the appropriate destination, (b) participating in the handshaking process, and (c) assessing the correctness of the encryption format for incoming data.

Figure 16B:
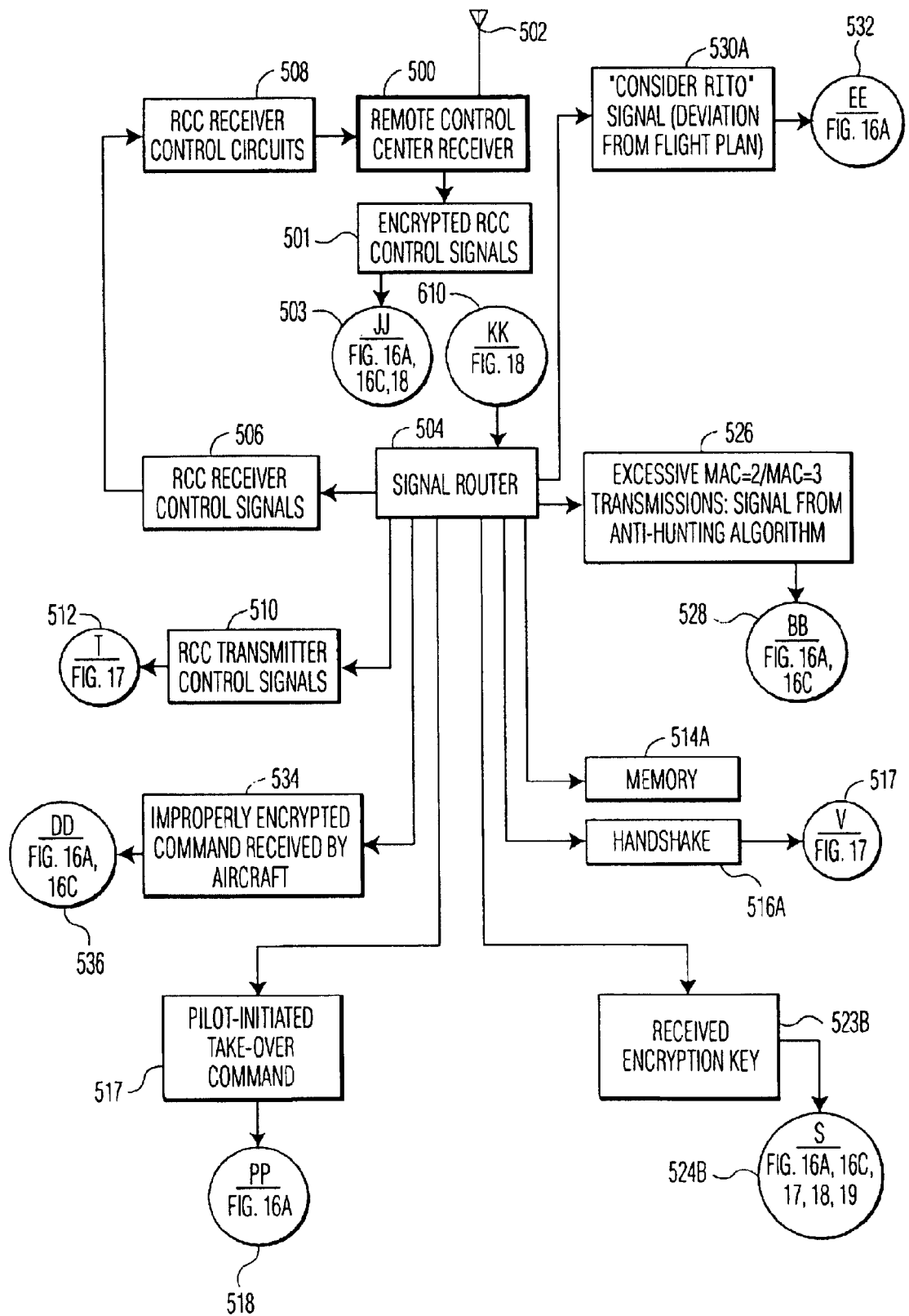
FIG. 16B is a block diagram of the remote control center receiver and signal routing from the receiver.

As shown in FIG. 16B, incoming signals through antenna 502 reach receiver 500. There may be one or more antenna for various types of signals. After appropriate signal demodulation and processing by means that are known in the art, encrypted RCC control signals reach block 501. The signals 503 are distributed to two locations: (a) decryption and decoding circuits, shown in FIG. 18, and (b) an encryption assessment procedure, which runs on microprocessor 554 (FIG. 16A) and whose logic is indicated by the flow diagram of FIG. 16C.

6.5.1.1 Decryption and Decoding of Signals Received by the RCC

Figure 18:
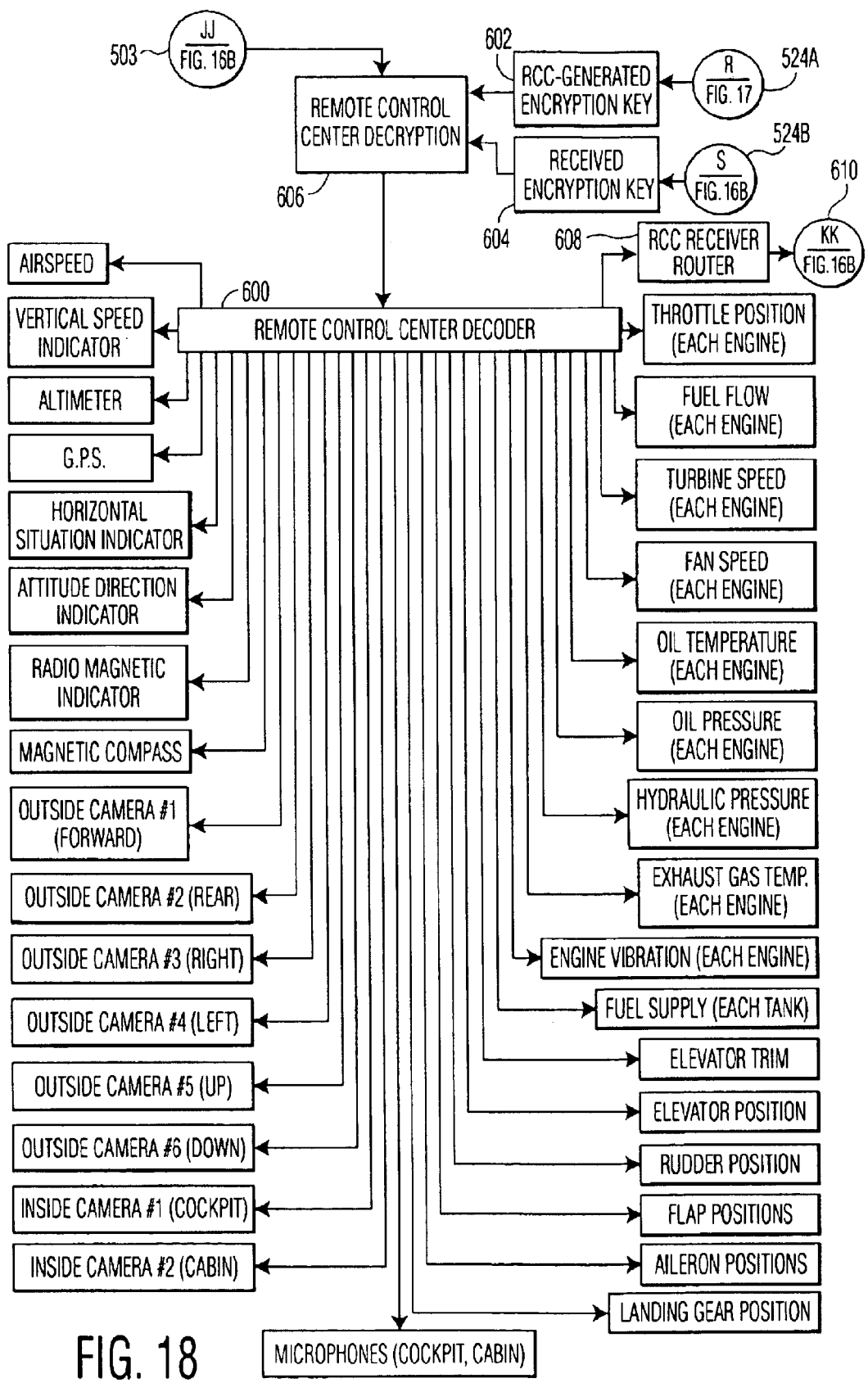
FIG. 18 is a block diagram of decryption and decoding at the remote control center.

FIG. 18 shows encrypted control signals 503, from the aircraft receiver, undergoing decryption at block 606. The encryption key is obtained from one of two sources:

(a) from a RCC-based encryption key generator 523A (FIG. 17) which sends the key as signals 524A to block 602, which supplies the necessary encryption key to decryption device 606; and (b) from the RCC receiver (discussed below) as signals 524B to block 604, which supplies the necessary encryption key to decryption device 606. As was discussed in the case of the aircraft receiver, an initial encryption key must be supplied from a source other than signals 524B from the RCC receiver, e.g. from the RCC generator 523A, since the RCC receiver must have a first encryption key before it can decrypt any signals obtained by its receiver—including those which contain an encryption key. Two alternatives are these: (a) using the encryption key from a previous flight of this aircraft, or (b) the non-secure approach of receiving the initial encryption key via the aircraft receiver in a non-encrypted format.

The decrypted signals are supplied to decoder 600, which converts the coded signals to aircraft related data signals. Each data signal corresponds to an identical one sent from the aircraft. Accordingly, each of the blocks (shown on the sides of FIG. 18) which receives an output from the RCC decoder, corresponds to an identical block among the aircraft encoder inputs (shown on the sides of FIG. 15). The information depicted in these blocks, including aircraft position, velocity and orientation, video and audio information, engine and fuel information and information about the outer controlling surfaces (e.g. the rudder) and the landing gear, is displayed by a bank of monitors in the remote control center. By viewing these, and other information, a remote control center pilot is able to fly aircraft 100.

Other information which the RCC-based pilot of aircraft 100 might observe includes information concerning the location of other nearby aircraft; weather information; the location of an intercepting aircraft, if any, and its estimated time of arrival; and video information from an intercepting aircraft, if any.

Data related to the control of communications between the remote control center and the aircraft, and the setting of the MAC state are sent from the decoder 600 to the RCC receiver router block 508, and then as signals 610 to the signal router 504 of FIG. 16B.

6.5.1.2 Aircraft Signal Router Output

Referring, now, to FIG. 16B, signal router 504 distributes nine groups of signals:

The RCC receiver control signals 506, may be used to synchronize the RCC receiver and the aircraft transmitter. This might be necessary if changes in channel or modulation scheme are part of an encryption system. It also might be necessary in the event of an interrupted handshake, which was followed by a change in aircraft transmitter frequency or modulation which originated at the aircraft. Signals 506 control RCC receiver control circuits 508, which control the RCC receiver 500. In all other situations, the RCC receiver is controlled independently by personnel in the RCC.

Figure 17:
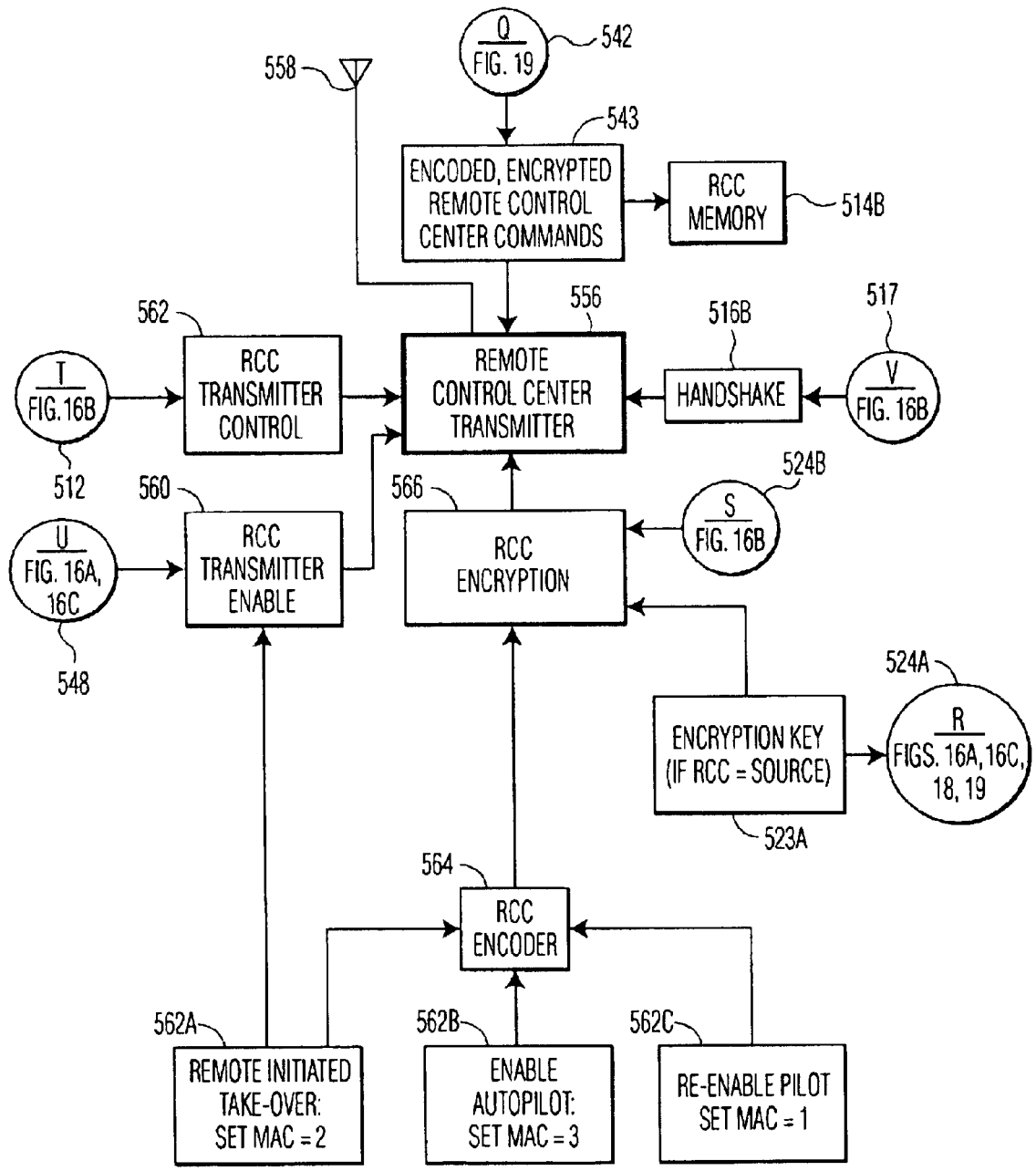
FIG. 17 is a block diagram of the remote control center transmitter and its inputs.

RCC transmitter control signals 512 flow from block 510 to the RCC transmitter control block 562 shown in FIG. 17. The RCC transmitter control signals serve essentially the same purpose as the RCC receiver control signals, i.e. (a) they may support an encryption scheme, and (b) they may be part of the mechanism for an aircraft-based repair of an interrupted handshake.

The RCC receiver memory, block 514A, archives all RCC data during a remote controlled flight.

The RCC receiver handshake block 516A sends signals 517 to the RCC transmitter handshake block, as part of the handshaking loop described in conjunction with the aircraft receiver.

Four of the outputs relate either directly or indirectly to actual or possible changes in MAC state:

(a) block 517, indicating that a PITO has occurred, results in signal 518 to microprocessor 554, which causes the RCC control panel to show a message (or to deliver it in audio format) indicating that PITO has occurred;

(b) block 526, indicating that the frequency of transitions between MAC State 2 and MAC State 3 has exceeded a critical value; This results in signal 528 to microprocessor 554 which causes the RCC control panel to show a message (or to deliver it in audio format) which says "CONSIDER TRANSMIT 'SET MAC=3'" (see earlier discussion of anti-hunting algorithm);

(c) block 530A, indicating an excessive deviation in either the expected position of the aircraft, based on a previously filed flight plan, or, an excessive deviation in the flight plan itself; This results in signal 532 to microprocessor 554 which causes the RCC control panel to show a message (or to deliver it in audio format) which says "CONSIDER TRANSMIT 'SET MAC=2'" (see below);

(d) block 534, indicating that the aircraft has received an improperly encrypted command. This scenario, discussed above in Section 6.3.1.3, results in the display (and/or the announcement) of either "SET TRANSMIT 'SET MAC=3'" or "NOTIFY PILOT AND SECURITY OFFICER."

Figure 16C:
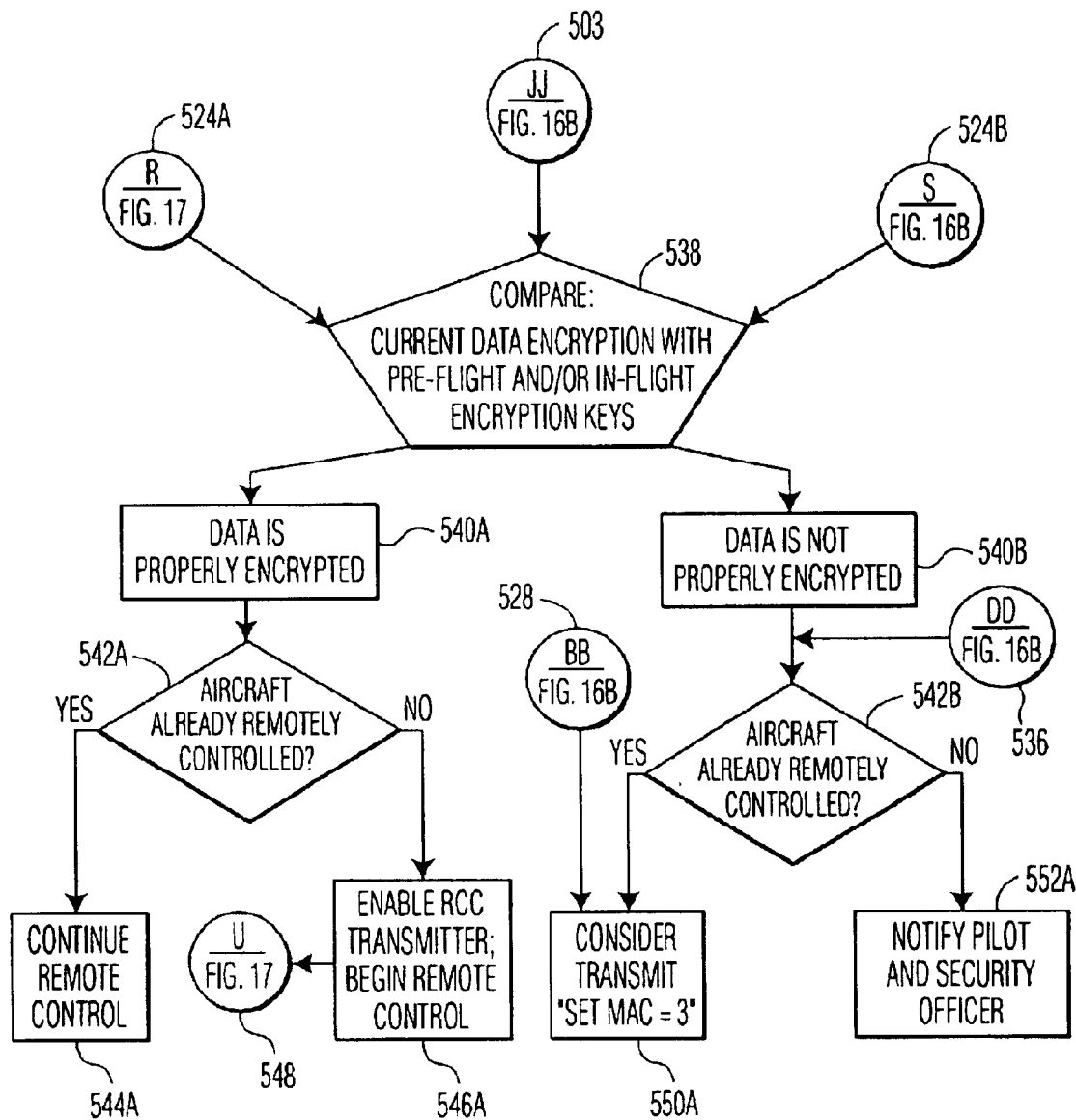
FIG. 16C is a flow diagram showing the method of encryption assessment for incoming signals from a controlled aircraft, as carried out by the microprocessor of FIG. 16A.
Figure 19:
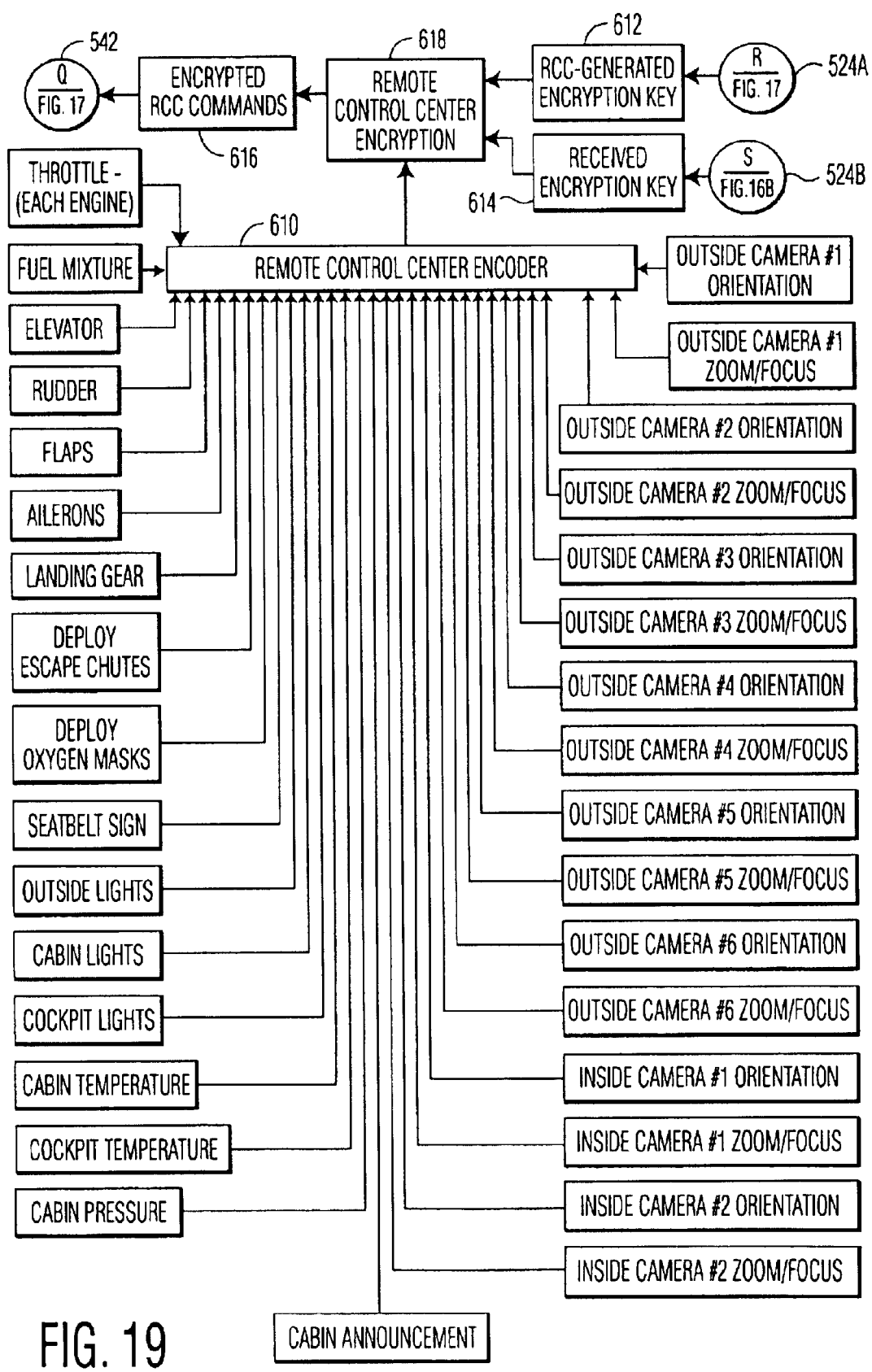
FIG. 19 is a block diagram of encryption and encoding at the remote control center.

Router 504 also leads to block 523B which may provide one or more encryption keys received via the RCC receiver. The received encryption key(s) are available as signals 524B to:

(a) microprocessor 554 (FIG. 16A) and the command encryption assessment logic which runs on it (FIG. 16C);

(b) the RCC transmitter (FIG. 17);

(c) the RCC decryption and decoding circuits (FIG. 18); and (d) the RCC encryption and encoding circuits (FIG. 19).

6.5.1.3 Remote Control Center Receiver Data Encryption Assessment

As a means of further protecting the RCC against interference by an unauthorized person, each "data packet" that it receives is inspected for proper encryption formatting. The flow diagram which shows the logic for this assessment is shown in FIG. 16C. The microprocessor on which it runs is shown in FIG. 16A. Examples of data packets would be (i) the amount of fuel remaining in the right wing tank, and (ii) the aircraft altitude.

The pentagon symbol, used in a parallel circumstance in FIG. 11C is the format for the current assessment. Pentagon 538 of FIG. 16C makes the statement: "Using the information supplied by the encryption key(s), if the data packet 503 under assessment is encrypted properly, go to block 540A; but go to block 540B if the data packet is not properly encrypted."

Each encrypted data packet 503 (coming from the RCC receiver in FIG. 16B) is sampled as described immediately above. The standard for proper command formatting is supplied. The standard for proper data packet formatting is supplied by the encryption key or keys from either of the two previously discussed sources, the RCC-based encryption source (block 523A, FIG. 17) or the RCC receiver (block 523B, FIG. 16B).

A properly encrypted command leads from block 540A to decision block 542A. If a remote controlled flight is already in progress, block 544A corresponds to the display or announcement of the message "CONTINUE REMOTE CONTROL (see FIG. 16A)," indicating that remote control communication is proceeding properly. The situation in which a data packet is received from a flight that is not already remotely controlled would be a properly encrypted Pilot Initiated Takeover Signal. This would lead to box 546A which would result in (a) signal 548 to block 560 (FIG. 17) enabling the RCC transmitter, and (b) display block 546B (FIG. 16A) indicating the display and/or announcement of the message "PITO RECEIVED."

An improperly encrypted data packet leads to block 540B. This condition has been discussed in Sections 6.3.1.3 and 6.5.1.2 above.

Microprocessor 554 shown in FIG. 16A supports the logic displayed in FIG. 16C. The inputs to the microprocessor are encryption key sources 524A and 524B, encrypted data packets 503, received PITO signal 518, received anti-hunting algorithm output 528, signal 536 indicating that the aircraft receiver has received an improperly encrypted command, and signal 532 indicating excessive deviation from expected aircraft position or flight plan. The outputs of microprocessor 554 include five messages and a signal to enable the RCC transmitter, which have already been discussed.

6.6 RCC Encoder, Transmitter and Encryption Source

Many of the items and concepts in this section parallel items and concepts in Section 6.4, as well as other sections. Where appropriate, the parallel is indicated and the discussion is shortened.

In order for a remote pilot to properly control aircraft 100, he or she must be able to control all of the critical aircraft functions which would be controlled by an on-board pilot.

FIG. 19 illustrates some of the most important aircraft commands to be sent, and the means for encoding and encrypting these commands. Each of the blocks (shown on the sides of FIG. 19) which sends an input from the RCC encoder, corresponds to an identical block among the aircraft decoder outputs (shown on the sides of FIG. 14). The commands depicted in these blocks, include the control of the throttles, flaps and other aircraft maneuvering means, the landing gear, cabin and cockpit conditions, and each of eight cameras previously discussed. By controlling these, a remote control center pilot is able to fly aircraft 100. The control panel, in the RCC, would ideally be set up to be similar in appearance and ergonomics to an actual aircraft cabin.

Control signals for the aforementioned aircraft controls are encoded by RCC encoder 610. The encoded signals are then encrypted by RCC encryption unit 618. Block 618 has inputs from both the encoder and each of the two possible RCC encryption key sources. The RCC-generated source, shown in FIG. 17, provides input 524A to block 612, which inputs the encryption key to encryption unit 618. An encryption key received via the RCC receiver provides input 524B to block 614, which also inputs encryption unit 618. The output of the encrypting unit, encrypted RCC commands 616 is sent as signals 542, via block 543 which supplies the RCC memory 514B with transmitted information, to the RCC transmitter 556, as shown in FIG. 17.

An additional group of six inputs destined for the RCC transmitter are shown in FIG. 17 and include:

(a) handshake signals 517, via block 516B, from the previous point in the handshake cycle, the RCC receiver;

(b) RCC transmitter control signals 512, via block 562, coming from the RCC receiver;

(c) two sources of signals which converge on block 560 and enable the RCC transmitter:
 (i) a signal from block 562A, indicating RITO; and
 (ii) signal 548, from microprocessor 554, indicating the RCC receipt of a PITO signal; and (d) three signals 562A, 562B and 562C which allow the RCC to change the MAC state, including the RITO signal, "SET MAC=2." These three signals flow to a second RCC encoder 564 which is identical in function to (and may be a part of) encoder 610. The signals are encrypted, in a manner identical to that of the other RCC control signals of FIG. 19, by encryption unit 566 which is identical in function to (and may be a part of) encryption unit 618. The two sources of encryption information, key generator 523A and received key source 523B generate signals 524A and 524B respectively, which provide inputs to encryption unit 566. The output of encryption unit 566, encrypted signals related either directly or indirectly to MAC state transitions, goes to the aircraft transmitter 556.

RCC transmitter 556 outputs to one or more antenna(e) 558. The possible addition of backup transmitters, as discussed in conjunction with the RCC transmitter, renders the communications system more robust.

The RCC-based encryption key source 523A shown in FIG. 17 is analogous to the aircraft-based source 234 shown in FIG. 10B. It inputs to:

(a) microprocessor 554, FIG. 16A;

(b) encryption formatting assessment flow diagram 16C;

(c) both RCC transmitter encryption units 566 (FIG. 17) and 618 (via block 612, FIG. 19); and (d) RCC decryption unit 606 (via block 602, FIG. 18).

The fact that one of the aforementioned outputs of the RCC encryption generator 524A becomes an input to RCC encryption unit 566 indicates three possible uses of the encryption key by RCC encryption unit 566:

(a) as previously indicated, for the encryption of signals 562A, 562B and 562C;

(b) for transmission of a non-encrypted version of the encryption key, generated by encryption key source 523A; and (c) for transmission of an encrypted version of the encryption key, generated by encryption key source 523A. In this case, the key used for encrypting the transmission would be a prior key (e.g. the $N^{th}$ key); the encrypted information being sent would be the newly generated key (e.g. the $[N+1]^{th}$ key).

A series of such nestings may produce a key encrypted by a prior key encrypted by an even earlier key, and so on. This methodology, nested encryption keys, is discussed in Section 3.2.1.

6.7 Flight Path Deviation Detection

Figure 20A:
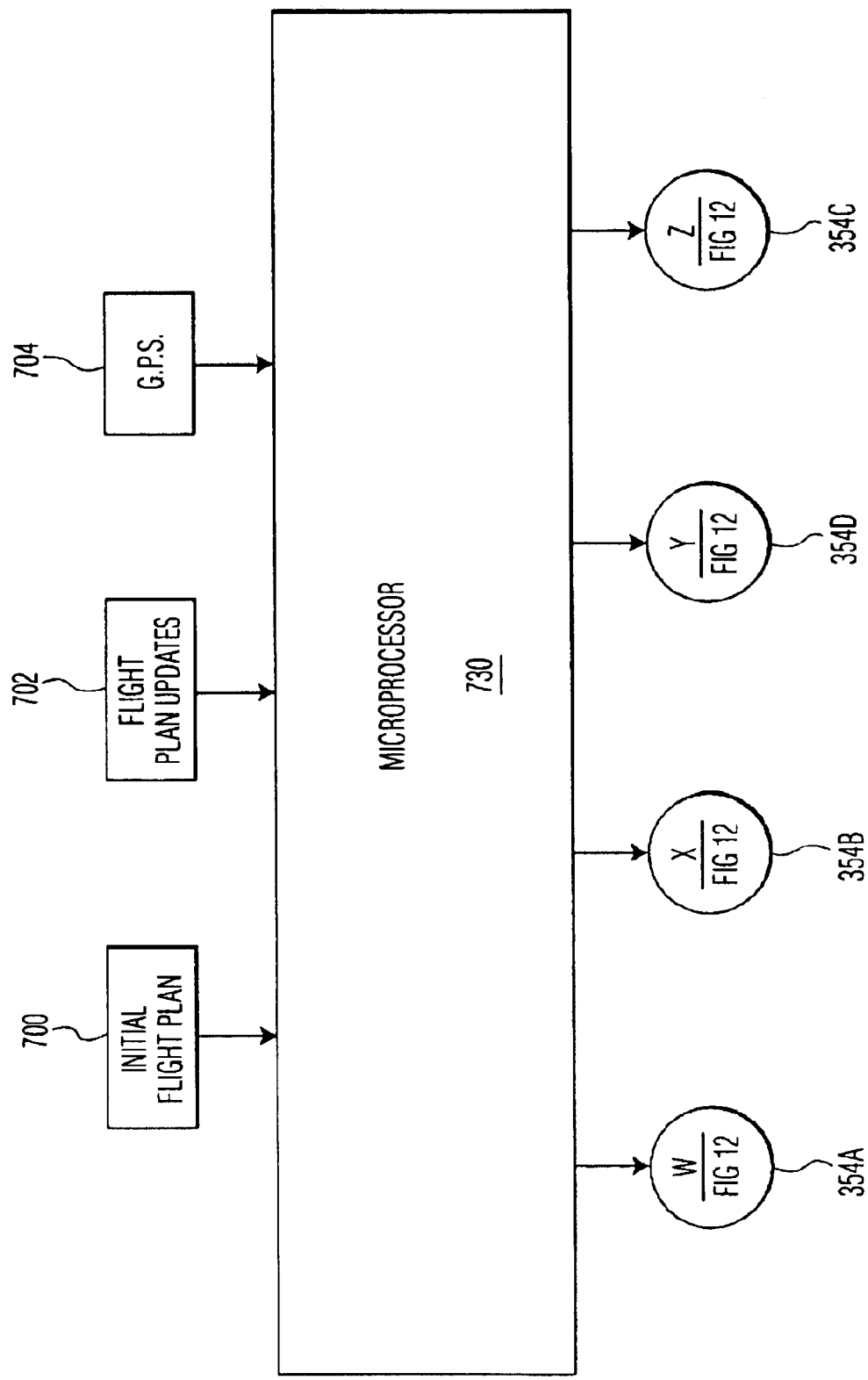
FIG. 20A is a block diagram, including a microprocessor, of a system aboard the controlled aircraft for detection of either deviation of aircraft position from that predicted based on previously filed flight plan(s) or significant deviation of an updated flight plan from previously filed flight plan(s).
Figure 20B:
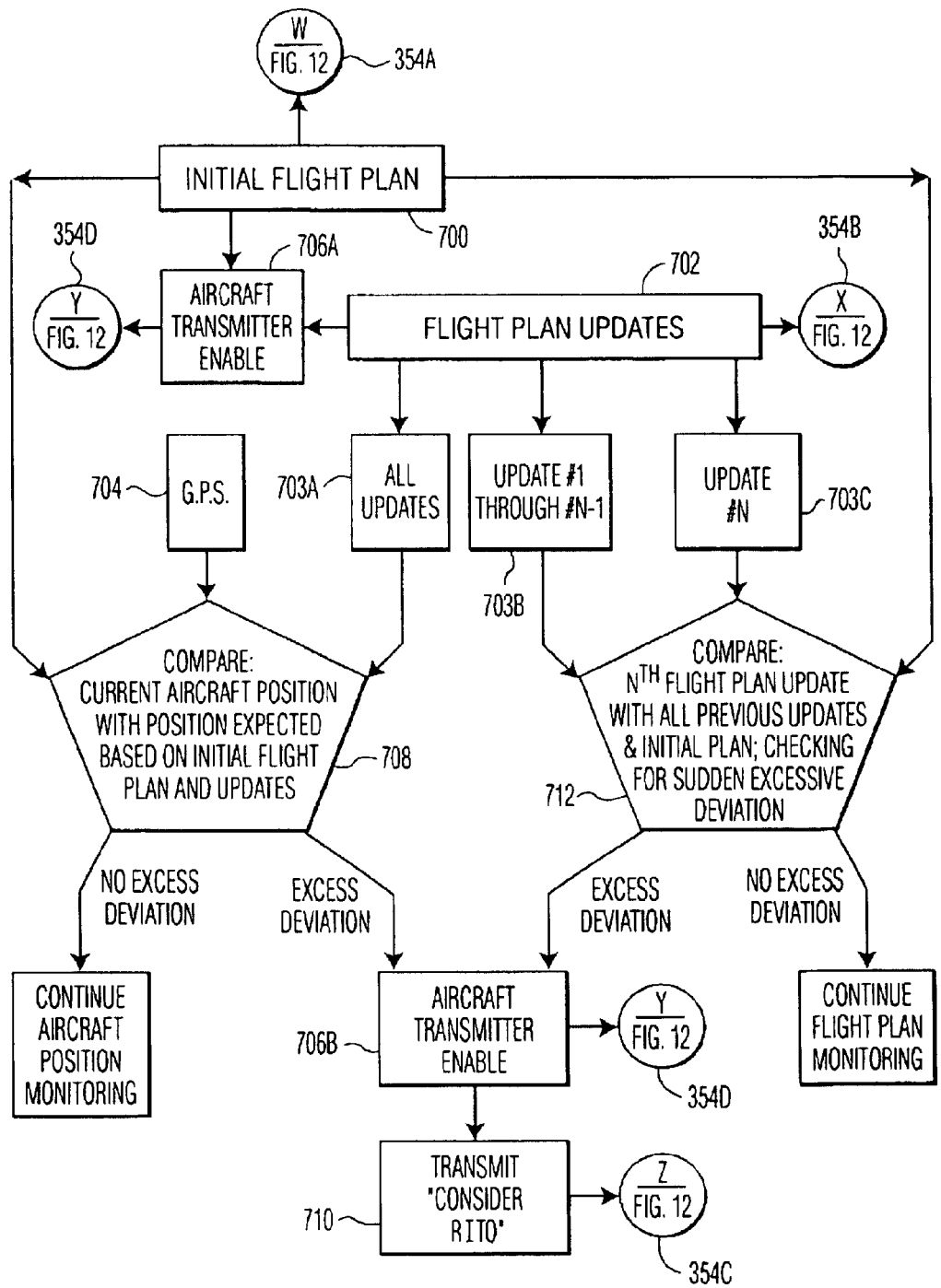
FIG. 20B is a flow diagram showing the operation of the microprocessor used in the system of FIG. 20A.

FIG. 20B shows a flow diagram for the detection of significant deviations in flight plan of aircraft 100. FIG. 20A shows the microprocessor on which the flow diagram runs, its inputs and its outputs.

There are two algorithms which run in parallel. The first one looks at where an aircraft should be based on its initial flight plan 700 and all of the updates to the flight plan 703A, and compares this to where the aircraft actually is, based on G.P.S. readings 704. This comparison is carried out in FIG. 20B by pentagon 708. Its format is similar to the pentagon format previously discussed in conjunction with FIGS. 10C, 11C and 16C. If the actual aircraft position has not excessively deviated from the expected position, the left lower output of pentagon 708 indicates that there is no action taken other than to continue running the algorithm. In the event of excess deviation, indicated by the right lower output of pentagon 708 to block 706B, the aircraft transmitter is enabled by signal 354D, and block 710 indicates the generation of a "CONSIDER RITO" signal 354C which is transmitted to the RCC.

The second algorithm looks for a sudden, excessive deviation in the flight plan. To do this it compares any update to the flight plan (update #N, block 703C) with both: (a) the initial flight plan 700, and (b) each previous update (update #1 through #N−1, block 703B). Pentagon 712 performs this evaluation. If there is no sudden deviation, the lower right output of the pentagon, monitoring continues without any specific action. If there is sudden deviation, the lower left output of the pentagon signals block 706B, the aircraft transmitter is enabled by signal 354D, and block 710 indicates the generation of a "CONSIDER RITO" signal 354C which is transmitted to the RCC.

The filing of the initial flight plan 700 or an update 702 leads to block 706A which enables the aircraft transmitter with signal 354D. The initial flight plan is transmitted to the RCC as signal 354A, updates as signal 354B.

FIG. 20A shows the microprocessor 730 which runs the algorithm. Its inputs are the flight plans and the G.P.S. signals. Its outputs for passing along the flight plans (signals 354A and 354B), a signal 354D for enabling the aircraft transmitter, and a signal 354C for transmitting a CONSIDER RITO message.

An alternate embodiment of the invention would place the microprocessor which runs this algorithm in the RCC instead of on the controlled aircraft.

There has thus been shown and described a novel system for assuming and maintaining secure remote control of an aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of assuming and maintaining secure control of an aircraft in the event of an attack upon, or incapacity of, a pilot of the aircraft, said method comprising the steps of:
    (a) providing a secure transmission link by and between first transmitting and receiving means ("first T/R means") on a first aircraft and second transmitting and receiving means ("second T/R means") at a location remote from the first aircraft, thereby permitting secure communication between said first aircraft and said remote location;
    (b) initiating and executing a command to prevent on-board control of the flight of said first aircraft by any personnel on said first aircraft and transmitting said command from one of said first aircraft and said remote location to the other;
    (c) transmitting flight data from said first aircraft to said remote location via said transmission link;
    (d) transmitting flight control data from said remote location to said first aircraft via said transmission link; and
    (e) manually piloting said first aircraft by remote control from said remote location to actuate aerodynamic control surfaces of said first aircraft in substantially real time to control the flight of the first aircraft without guidance of an autopilot, until the need for said remote pilot control has ended or until said first aircraft has landed safely.

2. The method defined in claim 1, wherein said command is initiated by pressing a button in a cockpit of said first aircraft.

3. The method defined in claim 1, wherein said command is initiated by speaking a voice word.

4. The method defined in claim 3, further comprising the step of determining whether the voice word is spoken by an authorized person and initiating said command only if it is spoken by said authorized person.

5. The method defined in claim 3, further comprising the step of determining whether a certain word is spoken, and initiating said command only if said word is spoken.

6. The method defined in claim 5, wherein said word is changed from time to time.

7. The method defined in claim 1, wherein said command is initiated by inputting a certain alphanumeric code by means of an input device in the first aircraft.

8. The method defined in claim 7, wherein said code is changed from time to time.

9. The method defined in claim 1, wherein said command is initiated off-site of said first aircraft.

10. The method defined in claim 9, wherein said command is initiated off-site of said first aircraft when requested by an authorized person.

11. The method defined in claim 9, wherein said command is initiated when Air Traffic Control suspects that said pilot is unable to properly control the first aircraft.

12. The method defined in claim 9, wherein said command is initiated when the first aircraft deviates from an expected flight path.

13. The method defined in claim 9, wherein audio sounds in the first aircraft are transmitted to said remote location via said first and second T/R means and wherein said command is initiated when such sounds indicate that said pilot is unable to properly control the first aircraft.

14. The method defined in claim 9, wherein video in the first aircraft is transmitted to said remote location via said first and second T/R means and wherein said command is initiated when such video indicates that said pilot is unable to properly control the first aircraft.

15. The method defined in claim 9, wherein a second aircraft flies within the vicinity of said first aircraft and wherein said command is initiated when said second aircraft informs the remote location of an irregularity.

16. The method defined in claim 1, wherein a second aircraft flies in the vicinity of said first aircraft, said second aircraft having third transmitting and receiving means (third TIR means) for communicating with said second T/R means at said remote location and fourth transmitting and receiving means (fourth T/R means) for communicating with said first T/R means on said first aircraft,
    whereby said second aircraft serves as a repeater station for communications between the remote location and said first aircraft.

17. The method defined in claim 16, wherein said first T/R means on said first aircraft include means for transmitting and receiving preferentially in the direction of said second aircraft.

18. The method defined in claim 17, wherein said preferential direction transmitting and receiving means include a directional RF antenna.

19. The method defined in claim 17, wherein said preferential direction transmitting and receiving means include laser transmitting apparatus.

20. The method defined in claim 17, wherein said preferential direction transmitting and receiving means include acoustic transmitting apparatus.

21. The method defined in claim 16, wherein said fourth T/R means on said second aircraft include means for transmitting and receiving preferentially in the direction of said first aircraft.

22. The method defined in claim 21, wherein said preferential direction transmitting and receiving means include a directional RF antenna.

23. The method defined in claim 21, wherein said preferential direction transmitting and receiving means include laser transmitting apparatus.

24. The method defined in claim 21, wherein said preferential direction transmitting and receiving means include acoustic transmitting apparatus.

25. The method defined in claim 16, wherein a satellite is located in orbit above the earth, said satellite having seventh transmitting and receiving means (seventh T/R means) for communicating with said third T/R means on said second aircraft and eighth transmitting and receiving means (eighth T/R means) for communicating with said second T/R means at said remote location, wherein said satellite relays communications between said second aircraft and said remote location and said second aircraft relays communications between said satellite and said first aircraft.

26. The method defined in claim 16, wherein said first aircraft has means for reducing the sensitivity of receipt of signals from the second aircraft, when the first and second aircraft are in close proximity.

27. The method defined in claim 1, wherein a second aircraft flies in the vicinity of said first aircraft, said second aircraft incorporating the remote location for control of said first aircraft and having said second T/R means for communicating with said first T/R means on said first aircraft.

28. The method defined in claim 27, wherein said second aircraft comprises a flight control station to enable a substitute pilot aboard said second aircraft to control said first aircraft.

29. The method defined in claim 27, wherein said first T/R means on said first aircraft include means for transmitting and receiving preferentially in the direction of said second aircraft.

30. The method defined in claim 29, wherein said preferential direction transmitting and receiving means include a directional RF antenna.

31. The method defined in claim 29, wherein said preferential direction transmitting and receiving means include acoustic transmitting apparatus.

32. The method defined in claim 29, wherein said preferential direction transmitting and receiving means include laser transmitting apparatus.

33. The method defined in claim 27, wherein said second T/R means on said second aircraft include means for transmitting and receiving preferentially in the direction of said first aircraft.

34. The method defined in claim 33, wherein said preferential direction transmitting and receiving means include a directional RF antenna.

35. The method defined in claim 33, wherein said preferential direction transmitting and receiving means include laser transmitting apparatus.

36. The method defined in claim 33, wherein said preferential direction transmitting and receiving means include acoustic transmitting apparatus.

37. The method defined in claim 1, wherein the flight data transmitted to said remote location and the control data transmitted to said first aircraft are encrypted using at least one encryption key, and further comprising the step of providing said at least one encryption key to said first aircraft and to said remote location.

38. The method defined in claim 37, wherein said at least one encryption key is provided to said first aircraft while at an airport prior to take-off for the flight.

39. The method defined in claim 38, further comprising the step of providing an updated encryption key to said first aircraft and to said remote location during the flight of said first aircraft.

40. The method defined in claim 39, wherein said updated encryption key is encrypted using at least one of the encryption keys previously provided to said first aircraft.

41. The method defined in claim 37, wherein said at least one encryption key is generated at said airport and is provided to both said first aircraft and to said remote location.

42. The method defined in claim 37, wherein said at least one encryption key is generated on said first aircraft and is provided to said remote location.

43. The method defined in claim 37, wherein said at least one key is generated at said remote location and is provided to said first aircraft.

44. The method defined in claim 37, wherein said at least one encryption key is stored on at least one storage medium and said step of providing said encryption key comprises the step of supplying said storage medium to at least one of said first aircraft and said remote location, whereby said storage medium is the means by which the key is provided to said at least one of said first aircraft and said remote location.

45. The method defined in claim 37, further comprising the step of alerting at least one of an onboard pilot and personnel at the remote location if any one of said command for preventing onboard control of said aircraft, said flight data and said control data are improperly encrypted.

46. The method defined in claim 1, wherein a satellite is located in orbit above the earth, said satellite having fifth transmitting and receiving means (fifth T/R means) for communicating with said first T/R means on said first aircraft and sixth transmitting and receiving means (sixth T/R means) for communicating with said second T/R means at said remote location, wherein said satellite relays communications between said first aircraft and said remote location.

47. The method defined in claim 46, wherein said remote location is attached to the earth.

48. The method defined in claim 46, wherein said remote location is aboard a second aircraft.

49. The method defined in claim 46, wherein the flight data transmitted to said remote location and the control data transmitted to said first aircraft are encrypted using at least one encryption key.

50. The method defined in claim 49, further comprising the step of providing said at least one encryption key from said satellite to said first aircraft and to said remote location prior to or during the flight of said first aircraft.

51. The method defined in claim 49, further comprising the step of providing said at least one encryption key from said remote location to said first aircraft via said satellite prior to or during the flight of said first aircraft.

52. The method defined in claim 49, further comprising the step of providing said at least one encryption key from said first aircraft to said remote location via said satellite prior to or during the flight of said first aircraft.

53. The method defined in claim 46, wherein first T/R means on said first aircraft includes an antenna with a radiation pattern directed upwardly only, said antenna directing communication signals to and from the fifth T/R means on said satellite and not toward the ground.

54. The method defined in claim 53, wherein said first T/R means on said first aircraft and said fifth T/R means on said satellite communicate with each other via a highly directional beam.

55. The method defined in claim 54, wherein said first aircraft transmits, and said satellite receives information about the position of said first aircraft, and said satellite includes means for orienting its antenna in the direction of said first aircraft in response to said position information.

56. The method defined in claim 54, wherein said first aircraft transmits, and said satellite receives information about the position of said first aircraft, and said first aircraft includes means for orienting its antenna in the direction of said satellite in response to said position information.

57. The method defined in claim 46, wherein said second T/R means at the remote location and said sixth T/R means on said satellite communicate with each other via a highly directional beam.

58. The method defined in claim 1, wherein the first aircraft includes an autopilot device for automatically controlling the first aircraft, said method further comprising the step of switching control to the autopilot device, after said command is initiated during any time that the remote pilot control of the first aircraft may not be safely maintained, for any reason.

59. The method defined in claim 58, wherein control is automatically switched to the autopilot device, after said command is initiated, if transmission between the first aircraft and the remote location is interrupted for a prescribed period of time.

60. The method defined in claim 58, further comprising the step of switching control back to the onboard pilot of said first aircraft if the autopilot device and the remote pilot cannot safely maintain control of the first aircraft for any reason.

61. The method defined in claim 1, wherein said first aircraft includes at least one video camera pointed in the direction of flight, and said flight data includes at least one video image of the region of space in the forward flight path of the first aircraft.

62. The method defined in claim 1, wherein said remote location comprises a flight control station to permit a pilot at said remote location to manually pilot said first aircraft.

63. The method defined in claim 1, wherein the first aircraft includes an autopilot device for automatically controlling the first aircraft, said method further comprising the step of switching control to the autopilot device, after said command is initiated, until the remote pilot control of the first aircraft may be safely maintained.

* * * * *